US009696795B2

(12) United States Patent
Marcolina et al.

(10) Patent No.: US 9,696,795 B2
(45) Date of Patent: Jul. 4, 2017

(54) SYSTEMS AND METHODS OF CREATING A REALISTIC GRAB EXPERIENCE IN VIRTUAL REALITY/AUGMENTED REALITY ENVIRONMENTS

(71) Applicant: Leap Motion, Inc., San Francisco, CA (US)

(72) Inventors: Alex Marcolina, San Francisco, CA (US); David S. Holz, San Francisco, CA (US); Paul A. Durdik, Foster City, CA (US)

(73) Assignee: Leap Motion, Inc., San Francisco, CA (US)

( * ) Notice: Subject to any disclaimer, the term of this patent is extended or adjusted under 35 U.S.C. 154(b) by 78 days.

(21) Appl. No.: 14/626,898

(22) Filed: Feb. 19, 2015

(65) Prior Publication Data
US 2016/0239080 A1    Aug. 18, 2016

Related U.S. Application Data

(60) Provisional application No. 61/116,366, filed on Feb. 13, 2015.

(51) Int. Cl.
*G06F 3/01* (2006.01)
*G06T 15/08* (2011.01)
*G06T 19/00* (2011.01)

(52) U.S. Cl.
CPC .............. *G06F 3/011* (2013.01); *G06F 3/017* (2013.01); *G06T 19/006* (2013.01); *G06T 2215/16* (2013.01)

(58) Field of Classification Search
CPC .......... G06F 3/011; G06F 3/071; G06T 15/08; G06T 19/006; G06T 2215/16
See application file for complete search history.

(56) References Cited

U.S. PATENT DOCUMENTS

| 5,659,475 | A   | * | 8/1997  | Brown  | G08G 5/0026 701/120 |
| 2010/0302015 | A1 | * | 12/2010 | Kipman | G06F 3/011 340/407.1 |
| 2013/0335318 | A1 | * | 12/2013 | Nagel  | G06F 3/017 345/156 |
| 2015/0234569 | A1 | * | 8/2015  | Hess   | G06F 3/04815 345/156 |

(Continued)

*Primary Examiner* — Larry Sternbane
(74) *Attorney, Agent, or Firm* — Haynes Beffel & Wolfeld LLP; Ernest J. Beffel, Jr.

(57) ABSTRACT

The technology disclosed relates to a method of realistic rotation of a virtual object for an interaction between a control object in a three-dimensional (3D) sensory space and the virtual object in a virtual space that the control object interacts with. In particular, it relates to detecting free-form gestures of a control object in a three-dimensional (3D) sensory space and generating for display a 3D solid control object model for the control object during the free-form gestures, including sub-components of the control object and in response to detecting a two e sub-component free-form gesture of the control object in the 3D sensory space in virtual contact with the virtual object, depicting, in the generated display, the virtual contact and resulting rotation of the virtual object by the 3D solid control object model.

26 Claims, 54 Drawing Sheets

3800

(56) References Cited

U.S. PATENT DOCUMENTS

2015/0258432 A1* 9/2015 Stafford ............... A63F 13/213
  463/32
2016/0093105 A1* 3/2016 Rimon ................ G06T 19/006
  345/633

* cited by examiner

SYSTEMS AND METHODS OF CREATING A REALISTIC GRAB EXPERIENCE IN VIRTUAL REALITY/AUGMENTED REALITY ENVIRONMENTS

PRIORITY DATA

This application claims the benefit of U.S. Provisional Patent Application No. 62/116,366, entitled, "SYSTEMS AND METHODS OF CREATING A REALISTIC GRAB EXPERIENCE IN VIRTUAL REALITY/AUGMENTED REALITY ENVIRONMENTS", filed 13 Feb. 2015. The provisional application is hereby incorporated by reference for all purposes.

INCORPORATIONS

Materials incorporated by reference in this filing include the following:

SYSTEMS AND METHODS OF CREATING A REALISTIC GRAB EXPERIENCE IN VIRTUAL REALITY/AUGMENTED REALITY ENVIRONMENTS", US Non Prov. App. filed contemporaneously, "SYSTEMS AND METHODS OF PROVIDING HAPTIC-LIKE FEEDBACK IN THREE-DIMENSIONAL (3D) SENSORY SPACE", U.S. Prov. App. No. 61/937,410, filed 7 Feb. 2014, "SYSTEMS AND METHODS OF INTERACTING WITH VIRTUAL REALITY AND AUGMENTED REALITY ENVIRONMENTS USING FREE-FORM IN-AIR GESTURES", U.S. Non Prov. application Ser. No. 14/620,183, filed 11 Feb. 2015, "SYSTEMS AND METHODS OF INTERACTING WITH A VIRTUAL GRID IN A THREE-DIMENSIONAL (3D) SENSORY SPACE", U.S. Prov. App. No. 62/007,885, filed 4 Jun. 2014, "SYSTEMS AND METHODS OF GESTURAL INTERACTION IN A PERVASIVE COMPUTING ENVIRONMENT", U.S. Prov. App. No. 62/003,298, filed 27 May 2014, "INITIALIZING ORIENTATION IN SPACE FOR PREDICTIVE INFORMATION FOR FREE SPACE GESTURE CONTROL AND COMMUNICATION", U.S. Nonprovisional. application Ser. No. 14/590,983, filed 6 Jan. 2015, "ADAPTER FOR ATTACHING A MOTION CAPTURE DEVICE TO A HEAD MOUNTED DISPLAY", U.S. Prov. App. No. 61/991,337, filed 9 May 2014, "CONTACTLESS CURSOR CONTROL USING FREE-SPACE MOTION DETECTION," U.S. Prov. App. No. 61/825,515, filed 20 May 2013, "PREDICTIVE INFORMATION FOR FREE SPACE GESTURE CONTROL AND COMMUNICATION," U.S. Prov. App. No. 61/871,790, filed 29 Aug. 2013, "PREDICTIVE INFORMATION FOR FREE-SPACE GESTURE CONTROL AND COMMUNICATION," U.S. Prov. App. No. 61/873,758, filed 4 Sep. 2013, "PREDICTIVE INFORMATION FOR FREE SPACE GESTURE CONTROL AND COMMUNICATION," U.S. Non. Prov. application Ser. No. 14/474,077, filed 29 Aug. 2014, "VELOCITY FIELD INTERACTION FOR FREE SPACE GESTURE INTERFACE AND CONTROL," U.S. Prov. App. No. 61/891,880, filed 16 Oct. 2013, "VELOCITY FIELD INTERACTION FOR FREE SPACE GESTURE INTERFACE AND CONTROL," U.S. Non. Prov. application Ser. No. 14/516,493, filed 16 Oct. 2014, "VIRTUAL INTERACTIONS FOR MACHINE CONTROL," U.S. Prov. App. No. 61/897,186, filed 29 Oct. 2013, "VIRTUAL INTERACTIONS FOR MACHINE CONTROL," U.S. Non Prov. application Ser. No. 14/527,742, filed 29 Oct. 2014, "INTERACTIONS WITH VIRTUAL OBJECTS FOR MACHINE CONTROL," U.S. Prov. App. No. 61/898,464, filed 31 Oct. 2013, "INTERACTIONS WITH VIRTUAL OBJECTS FOR MACHINE CONTROL," U.S. Non Prov. application Ser. No. 14/530,364, filed 31 Oct. 2014, "PREDICTIVE INFORMATION FOR FREE SPACE GESTURE CONTROL AND COMMUNICATION," U.S. Prov. App. No. 61/898,462, filed 31 Oct. 2013, "IMPROVING PREDICTIVE INFORMATION FOR FREE SPACE GESTURE CONTROL AND COMMUNICATION," U.S. Non Prov. application Ser. No. 14/530,690, filed 31 Oct. 2014, "INTERACTION STRENGTH USING VIRTUAL OBJECTS FOR MACHINE CONTROL," U.S. Prov. App. No. 61/905,103, filed 15 Nov. 2013, "INTERACTION STRENGTH USING VIRTUAL OBJECTS FOR MACHINE CONTROL," U.S. Non Prov. application Ser. No. 14/541,078, filed 13 Nov. 2014, "VEHICLE MOTION SENSORY CONTROL," U.S. Prov. App. No. 62/005,981, filed 30 May 2014, "FREE-SPACE USER INTERFACE AND CONTROL USING VIRTUAL CONSTRUCTS," U.S. Non. Prov. application Ser. No. 14/154,730, filed 14 Jan. 2014, "FREE-SPACE USER INTERFACE AND CONTROL USING VIRTUAL CONSTRUCTS," U.S. Prov. App. No. 61/873,351, filed 3 Sep. 2013, "FREE-SPACE USER INTERFACE AND CONTROL USING VIRTUAL CONSTRUCTS," U.S. Prov. App. No. 61/877,641, filed 13 Sep. 2013, "SYSTEMS AND METHODS FOR MACHINE CONTROL," U.S. Non. Prov. application Ser. No. 14/280,018, filed 16 May 2014, "DYNAMIC, FREE-SPACE USER INTERACTIONS FOR MACHINE CONTROL," U.S. Non. Prov. application Ser. No. 14/155,722, filed 15 Jan. 2014, "SYSTEMS AND METHODS FOR CAPTURING MOTION IN THREE-DIMENSIONAL SPACE," U.S. Prov. App. No. 61/724,091, filed 8 Nov. 2012, "MOTION CAPTURE USING CROSS-SECTIONS OF AN OBJECT," U.S. application Ser. No. 13/414,485, filed 7 Mar. 2012, "SYSTEM AND METHODS FOR CAPTURING MOTION IN THREE-DIMENSIONAL SPACE," U.S. application Ser. No. 13/742,953, filed 16 Jan. 2013, INITIALIZING PREDICTIVE INFORMATION FOR FREE SPACE GESTURE CONTROL AND COMMUNICATION," U.S. Non. Prov. application Ser. No. 14/560,923, filed 4 Dec. 2014, "SAFETY FOR WEARABLE VIRTUAL REALITY DEVICES VIA OBJECT DETECTION AND TRACKING," U.S. Prov. App. No. 61/981,162, filed 17 Apr. 2014, and "BIOMETRIC AWARE OBJECT DETECTION AND TRACKING," U.S. Prov. App. No. 61/952,843, filed 13 Mar. 2014.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Conventional motion capture approaches rely on markers or sensors worn by the subject while executing activities and/or on the strategic placement of numerous bulky and/or complex equipment in specialized and rigid environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for improved devices with greater portability and techniques for capturing the motion of objects in real time without fixed or difficult to configure sensors or markers.

BRIEF DESCRIPTION OF THE APPENDIXES

The application disclosed has been filed with three appendixes "Appendix 1", "Appendix 2" and "Appendix 3". The images in the appendixes should be relied upon based on the coloring scheming used in them at the filing, as the information in the images is not readily conveyed by line drawings.

SUMMARY

In one implementation, a method is described for manipulating virtual objects using real motions of one or more hands in a three-dimensional (3D) sensory space. The method includes capturing an image of the hands in the a three-dimensional (3D) sensory space and sensing a location of the hands, incorporating the image of the hands into a virtual reality scene, and outlining a modeled position of the location of the hands and incorporating the outline into the virtual reality scene.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as detecting motion using image information, drift cancellation, and particular implementations.

The method also includes changing an appearance of the outline upon detection of a discrepancy between the image of the hands and the outline.

The method further includes changing an appearance of the image of the hands upon detection of a discrepancy between the image of the hands and the outline.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

In another implementation, a method is described for manipulating virtual objects using real motions of at least one hand in a three-dimensional (3D) sensory space. The method includes capturing an image of at least one hand in a three-dimensional (3D) sensory space and sensing a location of a first hand, incorporating the image of the first hand into a virtual reality scene, and sensing a pinch action between a thumb and first finger of the first hand and rendering a first virtual pinch force image positioned between the thumb and the first finger while the pinch action continues.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as detecting motion using image information, drift cancellation, and particular implementations.

The method further includes sensing a pinch action between a thumb and first finger of a second hand and rendering a second virtual pinch force image positioned between the thumb and the first finger while the pinch action continues, sensing a movement of at least one of the first and second hands that increases a separation distance between the first and second hands, while sensing continuing pinching actions of both the first and second hands, and rendering a new virtual object between the first and second pinch force images, responsive to the increased separation distance, wherein at least a size of the new virtual object is responsive to the separation distance.

In one implementation, an orientation of the new virtual object is responsive to positions of the first and second hands.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

In one implementation, a method is described for manipulating virtual objects using real motions of at least one hand in a three-dimensional (3D) sensory space. The method includes capturing an image of the hands in a three-dimensional (3D) sensory space and sensing a location of a first hand, incorporating the image of the first hand into a virtual reality scene that includes a grabable virtual object, sensing a gesture of the first hand and determining whether the gesture is intended to interact with the grabable virtual object by grabbing the virtual object, the determining further including taking into account at least an angular relationship of a normal to a palm of the first hand to a proximate surface of the virtual object, fingertip separations between the fingertips of the first hand and the proximate surface, a gesture rate at which the first hand closes on the virtual object, a hand posture, whether suitable for grasping the virtual object or incompatible with grasping, and linear velocity of the palm of the first hand relative to the virtual object, and responsive to determining that a gesture of the first hand is intended to grab the virtual object, linking motion of the first hand to manipulation of the virtual object.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as detecting motion using image information, drift cancellation, and particular implementations.

The method further includes taking into account when determining whether the gesture is intended to interact with the grabable virtual object a maximum separation between any of the fingertips of the first hand and the proximate surface.

The method further includes taking into account when determining whether the gesture is intended to interact with the grabable virtual object a rotational velocity of the palm of the first hand in the 3D sensory space.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

In another implementation, a method of manipulating virtual objects using real motions of at least one hand in a three-dimensional (3D) sensory space is described. The method includes capturing an image of the hands in a three-dimensional (3D) sensory space and sensing a location of a first hand, incorporating the image of the first hand into a virtual reality scene that includes a pushable virtual object, sensing a gesture of the first hand and determining whether the gesture is intended to interact with the pushable virtual object by pushing the virtual object, the determining further including taking into account at least an angular relationship of a normal to a palm of the first hand to a proximate surface of the virtual object, fingertip separations between the fingertips of the first hand and the proximate surface, a hand posture, whether suitable for pushing the virtual object or incompatible with pushing, and linear velocity of the palm of the first hand relative to the virtual object, and responsive to determining that a gesture of the first hand is intended to push the virtual object, linking motion of the first hand to manipulation of the virtual object.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as detecting motion using image information, drift cancellation, and particular implementations.

The method further includes taking into account when determining whether the gesture is intended to interact with the pushable virtual object a gesture rate at which the first hand closes on the virtual object.

The method further includes taking into account when determining whether the gesture is intended to interact with the pushable virtual object a maximum separation between any of the fingertips of the first hand and the proximate surface.

The method further includes taking into account when determining whether the gesture is intended to interact with the pushable virtual object a rotational velocity of the palm of the first hand in the 3D sensory space.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

In yet another implementation, a method of manipulating virtual objects using real motions of one or more hands in a three-dimensional (3D) sensory space is described. The method includes capturing an image of the hands in a three-dimensional (3D) sensory space and sensing a location of the hands, incorporating at least part of the image of the hands into a virtual reality scene, outlining a modeled position of the location of the hands and incorporating the outline into the virtual reality scene, detecting that at least part of the hands is obscured by a virtual object in virtual reality scene, and rendering one of the outline and the image but not both where the hands are obscured.

The method described in this implementation and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as detecting motion using image information, drift cancellation, and particular implementations.

The method further includes changing an appearance of the outline as the part of the hands obscured changes.

The method also includes changing an appearance of the image of the hands as the part of the hands obscured changes.

This method can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, this method is described with reference to the system that carries out a method. The system is not necessarily part of the method.

Other implementations of the method described in this implementation can include a non-transitory computer readable storage medium storing instructions executable by a processor to perform any of the methods described above. Yet another implementation of the method described in this implementation can include a system including memory and one or more processors operable to execute instructions, stored in the memory, to perform any of the methods described above.

BRIEF DESCRIPTION OF THE TECHNOLOGY DISCLOSED

In conventional VR development systems, grabbing or grasping a virtual object provides an unrealistic experience. Presently, when provided with hand position information and virtual object dimensions/position information, present VR modeling software (e.g., "Unity" (http://unity3d.com/industries/sim)) decides how the virtual object reacts to the hand. When the hand closes around the object, such that the fingers are determined by Unity to have penetrated the object, Unity returns a solution that the object will fly off into space away from the hand so that the hand's fingers can close. These felt unrealistic because people don't grasp things with more than 50% hand closure.

In one implementation, the technology disclosed determines whether a grasp is intended for the virtual object based upon number of contact points (e.g., typically number of fingers) that the hand contacts the object.

When one contact point is detected, a "nudge" is inferred. The technology disclosed can compute an inertia for the virtual object and sends it skittering off into space.

When two contact points are detected, a "rotate" of the object is inferred. The technology disclosed can compute a position for the object in space in which the contact points are preserved. This allows the user to rotate something (e.g. a phone for example) by touching it with two fingers. The phone will tend to "stick" to the fingers (i.e., an "artificial gravity") until the fingers are pulled away.

When three or more contact points are detected, a "grasp" of the object is inferred. The technology disclosed can compute a position for the virtual object within the fingers that minimizes the extent that the hand's fingers penetrate the virtual object. In a present implementation, the technology disclosed can use a least squares approach applied to the contact points (e.g., square the differences between penetration of finger into object from the old position of the object and the new position of the object and add up the squares. The position of the object having a minimum sum for these square differences is the solution returned.

The technology disclosed can support a two handed grasp of the object. The first hand to grasp the object is considered dominant. Any conflicting solutions are resolved in favor of the dominant hand (e.g., two solutions equally likely will be resolved in favor of the object staying in the dominant hand).

EXAMPLE

Four fingers contact a cell phone virtual object. The cell phone is grasped. If the four fingers are on two hands, both hands grasp the phone.

Stretching—if fingers for each hand of a two hand grasp remain in relative contact position but the hands are moved apart, the size of the virtual object is extended in the direction that the hands are moved apart, effectively stretching the object.

Polymorphism—same scenario as above, but when object size passes a threshold defined for the object's class, the object morphs into a larger object. The larger object can be related to the original object (e.g., stretch the smartphone until it becomes a tablet) or can be unrelated (e.g., stretch the smartphone until it becomes a dragon) or humorously related (e.g., stretch the smartphone and it becomes an antique telephone).

FIG. 1A illustrates one implementation 100A of a one sub-component virtual contact of a control object causing a virtual displacement of a virtual object 111.

FIG. 1B illustrates one implementation 100B of a two sub-component virtual contact of a control object causing a virtual rotation of a virtual object 122B.

FIG. 1C illustrates one implementation 100B of a three sub-component virtual contact of a control object causing a virtual grasping of a virtual object 122C.

FIGS. 31, 32, 33, 34, 35, 36, 37, 38, 39, 40, 41, 42, 43, and 44 shows various implementations 3100, 3200, 3300, 3400, 3500, 3600, 3700, 3800, 3900, 4000, 4100, 4200, 4200, and 4400 of manipulating virtual objects using real motions of one or more hands in a three-dimensional (3D) sensory space.

Other aspects and advantages of the present technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the disclosed technology. In the following description, various implementations of the technology disclosed are described with reference to the following drawings, in which.

DETAILED DESCRIPTION

Figure 1:
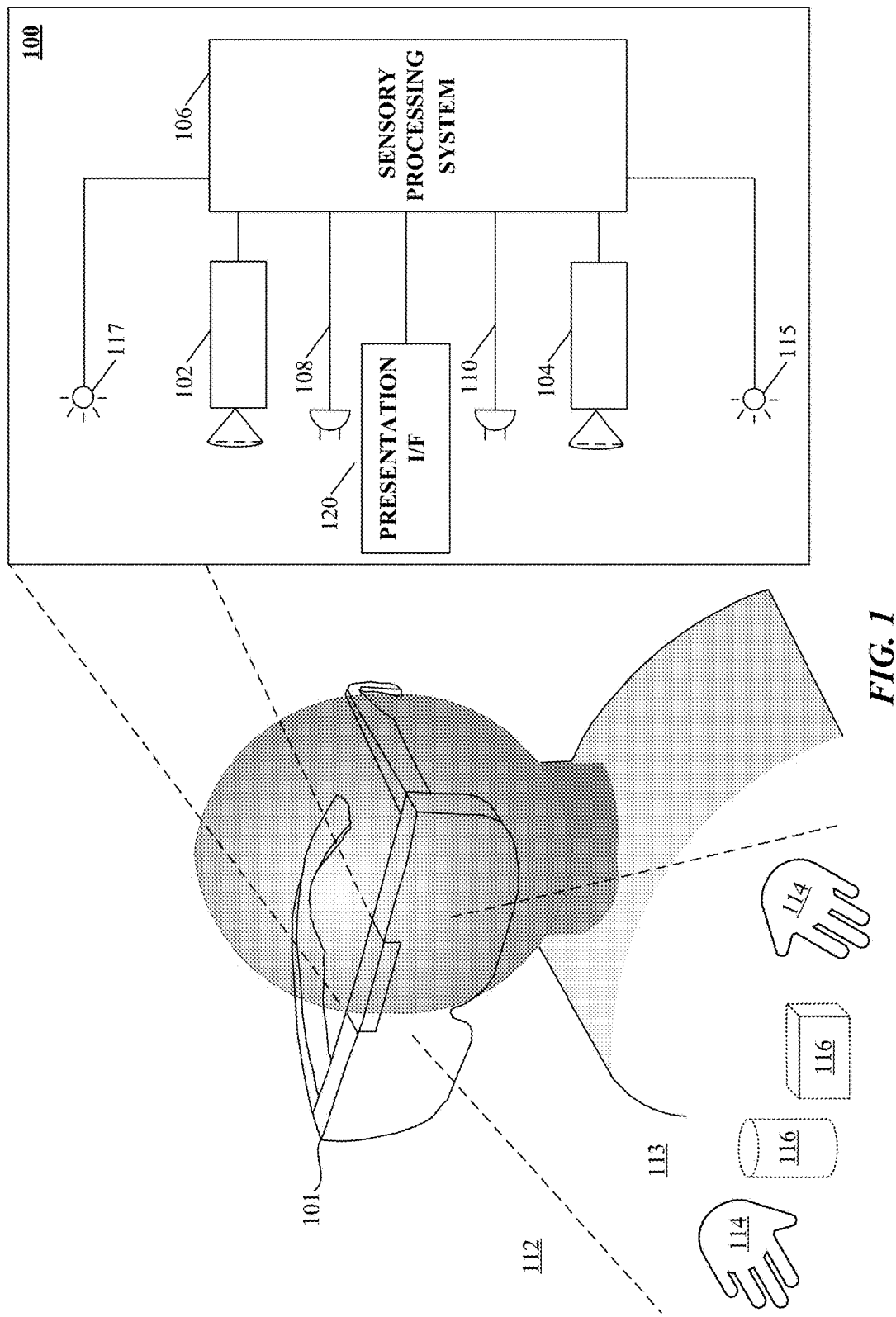
FIG. 1 illustrates a system for capturing image and other sensory data according to an implementation of the technology disclosed.

The traditional paradigms of indirect interactions through standard input devices such as mouse, keyboard, or stylus have their limitations, including skewed fields of view and restrictively receptive interfaces. Particularly in the VR/AR context, such traditional paradigms greatly diminish the user experience. Accordingly, the technology disclosed allows users to interact with the virtual interfaces generated in VR/AR environment using free-form in-air gestures.

However, existing human-VR/AR systems interactions are very limited and unfeasible. Current VR/AR systems are complex as they force the user to interact with VR/AR environment using a keyboard and mouse, or a vocabulary of simply hand gestures. Further, despite strong academic and commercial interest in VR/AR systems, VR/AR systems continue to be costly and requiring expensive equipment, and thus stand unsuitable for general use by the average consumer.

An opportunity arises to provide an economical approach that provides advantages of VR/AR for enhanced and sub-millimeter precision interaction with virtual objects without the draw backs of attaching or deploying specialized hardware.

System and methods in accordance herewith generally utilize information about the motion of a control object, such as a user's hand, finger or a stylus, in three-dimensional (3D) space to operate a physical or virtual user interface and/or components thereof based on the motion information. Various implementations take advantage of motion-capture technology to track the motions of the control object in real time (or near real time, i.e., sufficiently fast that any residual lag between the control object and the system's response is unnoticeable or practically insignificant). Other implementations can use synthetic motion data (e.g., generated by a computer game) or stored motion data (e.g., previously captured or generated). References to motions in "free-form in-air", "free-space", "in-air", or "touchless" motions or gestures are used herein with reference to an implementation to distinguish motions tied to and/or requiring physical contact of the moving object with a physical surface to effect input; however, in some applications, the control object can contact a physical surface ancillary to providing input, in such case the motion is still considered a "free-form in-air" motion.

Examples of "free-form in-air" gestures include raising an arm, or making different poses using hands and fingers (e.g., 'one finger point', 'one finger click', 'two finger point', 'two finger click', 'prone one finger point', 'prone one finger click', 'prone two finger point', 'prone two finger click', 'medial one finger point', 'medial two finger point') to indicate an intent to interact. In other implementations, a point and grasp gesture can be used to move a cursor on a display of a device. In yet other implementations, "free-form" gestures can be a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

Further, in some implementations, a virtual environment can be defined to co-reside at or near a physical environment. For example, a virtual touch screen can be created by defining a (substantially planar) virtual surface at or near the screen of a display, such as an HMD, television, monitor, or the like. A virtual active table top can be created by defining a (substantially planar) virtual surface at or near a table top convenient to the machine receiving the input.

Among other aspects, implementations can enable quicker, crisper gesture based or "free-form in-air" (i.e., not requiring physical contact) interfacing with a variety of machines (e.g., a computing systems, including HMDs, smart phones, desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen.

Implementations of the technology disclosed also relate to methods and systems that facilitate free-form in-air gestural interactions in a virtual reality (VR) and augmented reality (AR) environment. The technology disclosed can be applied to solve the technical problem of how the user interacts with the virtual screens, elements, or controls displayed in the VR/AR environment. Existing VR/AR systems restrict the user experience and prevent complete immersion into the real world by limiting the degrees of freedom to control virtual objects. Where interaction is enabled, it is coarse, imprecise, and cumbersome and interferes with the user's natural movement. Such considerations of cost, complexity and convenience have limited the deployment and use of AR technology.

The systems and methods described herein can find application in a variety of computer-user-interface contexts, and can replace mouse operation or other traditional means of user input as well as provide new user-input modalities. Free-form in-air control object motions and virtual-touch recognition can be used, for example, to provide input to commercial and industrial legacy applications (such as, e.g., business applications, including Microsoft Outlook™; office software, including Microsoft Office™, Windows™, Excel™, etc.; graphic design programs; including Microsoft Visio™ etc.), operating systems such as Microsoft Windows™; web applications (e.g., browsers, such as Internet Explorer™); other applications (such as e.g., audio, video, graphics programs, etc.), to navigate virtual worlds (e.g., in video games) or computer representations of the real world (e.g., Google Street View™), or to interact with three-dimensional virtual objects (e.g., Google Earth™). In some implementations, such applications can be run on HMDs or other portable computer devices and thus can be similarly interacted with using the free-form in-air gestures.

A "control object" or "object" as used herein with reference to an implementation is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object can be used as well.

A "virtual environment," may also referred to as a "virtual construct," "virtual touch plane," or "virtual plane," as used herein with reference to an implementation denotes a geometric locus defined (e.g., programmatically) in space and useful in conjunction with a control object, but not corresponding to a physical object; its purpose is to discriminate between different operational modes of the control object (and/or a user-interface element controlled therewith, such as a cursor) based on whether the control object interacts the virtual environment. The virtual environment, in turn, can be, e.g., a virtual environment (a plane oriented relative to a tracked orientation of the control object or an orientation of a screen displaying the user interface) or a point along a line or line segment extending from the tip of the control object.

Using the output of a suitable motion-capture system or motion information received from another source, various implementations facilitate user input via gestures and motions performed by the user's hand or a (typically handheld) pointing device. For example, in some implementations, the user can control the position of a cursor and/or other object on the interface of an HMD by with his index finger in the physical environment outside the HMD's virtual environment, without the need to touch the screen. The position and orientation of the finger relative to the HMD's interface, as determined by the motion-capture system, can be used to manipulate a cursor symbol. As will be readily apparent to one of skill in the art, many other ways of mapping the control object position and/or orientation onto a screen location can, in principle, be used; a particular mapping can be selected based on considerations such as, without limitation, the requisite amount of information about the control object, the intuitiveness of the mapping to the user, and the complexity of the computation. For example, in some implementations, the mapping is based on intersections with or projections onto a (virtual) plane defined relative to the camera, under the assumption that the HMD interface is located within that plane (which is correct, at least approximately, if the camera is correctly aligned relative to the screen), whereas, in other implementations, the screen location relative to the camera is established via explicit calibration (e.g., based on camera images including the screen).

Aspects of the system and methods, described herein provide for improved machine interface and/or control by interpreting the motions (and/or position, configuration) of one or more control objects or portions thereof relative to one or more virtual environments defined (e.g., programmatically) disposed at least partially within a field of view of an image-capture device. In implementations, the position, orientation, and/or motion of control object(s) (e.g., a user's finger(s), thumb, etc.; a suitable hand-held pointing device such as a stylus, wand, or some other control object; portions and/or combinations thereof) are tracked relative to the virtual environment to facilitate determining whether an intended free-form in-air gesture has occurred. Free-form in-air gestures can include engaging with a virtual control (e.g., selecting a button or switch), disengaging with a virtual control (e.g., releasing a button or switch), motions that do not involve engagement with any virtual control (e.g., motion that is tracked by the system, possibly followed by a cursor, and/or a single object in an application or the like), environmental interactions (i.e., gestures to direct an environment rather than a specific control, such as scroll up/down), special-purpose gestures (e.g., brighten/darken screen, volume control, etc.), as well as others or combinations thereof.

Free-form in-air gestures can be mapped to one or more virtual controls, or a control-less screen location, of a display device associated with the machine under control, such as an HMD. Implementations provide for mapping of movements in three-dimensional (3D) space conveying control and/or other information to zero, one, or more controls. Virtual controls can include imbedded controls (e.g., sliders, buttons, and other control objects in an application), or environmental-level controls (e.g., windowing controls, scrolls within a window, and other controls affecting the control environment). In implementations, virtual controls can be displayable using two-dimensional (2D) presentations (e.g., a traditional cursor symbol, cross-hairs, icon, graphical representation of the control object, or other displayable object) on, e.g., one or more display screens, and/or 3D presentations using holography, projectors, or other mechanisms for creating 3D presentations. Presentations can also be audible (e.g., mapped to sounds, or other mechanisms for conveying audible information) and/or haptic.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Among other aspects, the technology described herein with reference to example implementations can provide for automatically (e.g., programmatically) cancelling out motions of a movable sensor configured to capture motion and/or determining the path of an object based on imaging, acoustic or vibrational waves. Implementations can enable gesture detection, virtual reality and augmented reality, and other machine control and/or machine communications applications using portable devices, e.g., head mounted displays (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection. In some implementations, projection techniques can supplement the sensory based tracking with presentation of virtual (or virtualized real) objects (visual, audio, haptic, and so forth) created by applications loadable to, or in cooperative implementation with, the HMD or other device to provide a user of the device with a personal virtual experience (e.g., a functional equivalent to a real experience).

Some implementations include optical image sensing. For example, a sequence of images can be correlated to construct a 3-D model of the object, including its position and shape. A succession of images can be analyzed using the same technique to model motion of the object such as free-form gestures. In low-light or other situations not conducive to optical imaging, where free-form gestures cannot be recognized optically with a sufficient degree of reliability, audio signals or vibrational waves can be detected and used to supply the direction and location of the object as further described herein.

Refer first to FIG. 1, which illustrates a system 100 for capturing image data according to one implementation of the technology disclosed. System 100 is preferably coupled to a wearable device 101 that can be a personal head mounted display (HMD) having a goggle form factor such as shown in FIG. 1, a helmet form factor, or can be incorporated into or coupled with a watch, smartphone, or other type of portable device or any number of cameras 102, 104 coupled to sensory processing system 106. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 112 by motion of the device 101, in order to view a virtually rendered or virtually augmented view of the region of interest 112 that can include a variety of virtual objects 116 as well as contain an object of interest 114 (in this example, one or more hands) that moves within the region of interest 112. One or more sensors 108, 110 capture motions of the device 101. In some implementations, one or more light sources 115, 117 are arranged to illuminate the region of interest 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of cameras 102, 104 to capture images of the region of interest 112 and sensors 108, 110 to capture motions of the device 101. Information from sensors 108, 110 can be applied to models of images taken by cameras 102, 104 to cancel out the effects of motions of the device 101, providing greater accuracy to the virtual experience rendered by device 101. Based on the captured images and motions of the device 101, sensory processing system 106 determines the position and/or motion of object 114.

For example, as an action in determining the motion of object 114, sensory processing system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 101 from sensors 108, 110 allows sensory processing system 106 to determine the location in 3D space of object 114, and analyzing sequences of images allows sensory processing system 106 to reconstruct 3D motion of object 114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 120 employs projection techniques in conjunction with the sensory based tracking in order to present virtual (or virtualized real) objects (visual, audio, haptic, and so forth) created by applications loadable to, or in cooperative implementation with, the device 101 to provide a user of the device with a personal virtual experience. Projection can include an image or other visual representation of an object.

Figure 8:
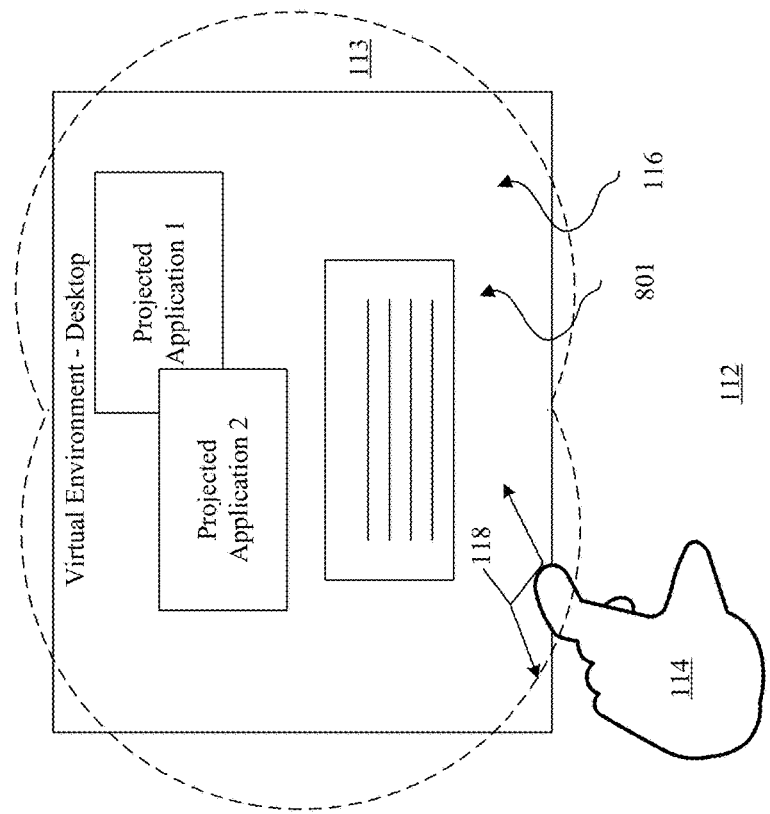
FIG. 8 illustrates one implementation of a system for providing a virtual device experience.
Figure 8:
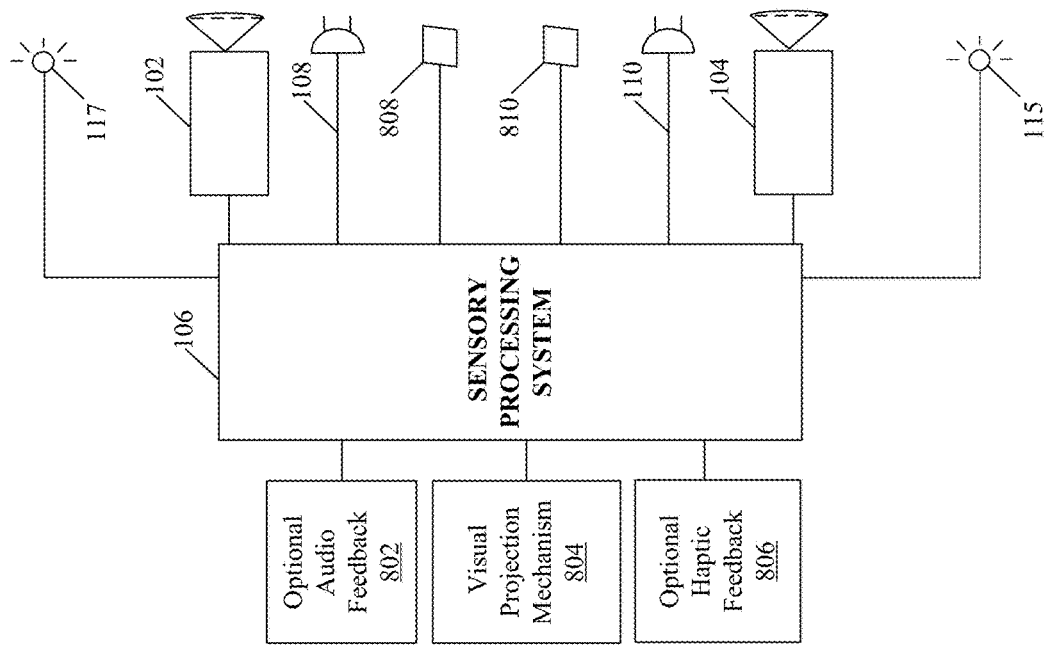

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from cameras 102, 104 or acoustic or other sensory devices. Control information is communicated to a system based in part on a combination of the motion of the portable device 101 and the detected motion of the user determined from the sensory information received from cameras 102, 104 or acoustic or other sensory devices. The virtual device experience can be augmented in some implementations by the addition of haptic, audio and/or other sensory information projectors. For example, with reference to FIG. 8, optional video projection mechanism 804 can project an image of a page (e.g., virtual device 801) from a virtual book object superimposed upon a desk (e.g., surface portion 116) of a user; thereby creating a virtual device experience of reading an actual book, or an electronic book on a physical e-reader, even though no book or e-reader is present. Optional haptic projector 806 can project the feeling of the texture of the "virtual paper" of the book to the reader's finger. Optional audio projector 802 can project the sound of a page turning in response to detecting the reader making a swipe to turn the page.

A plurality of sensors 108, 110 can coupled to the sensory processing system 106 to capture motions of the device 101. Sensors 108, 110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 100 can include any of various other sensors not shown in FIG. 1 for clarity, alone or in various combinations, to enhance the virtual experience provided to the user of device 101. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 106 from a standby mode to an operational mode. For example, the system 106 may enter the standby mode if optical signals from the cameras 102, 104 are absent for longer than a threshold interval.

It will be appreciated that the figures shown in FIG. 1 are illustrative. In some implementations, it may be desirable to house the system 100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 2:
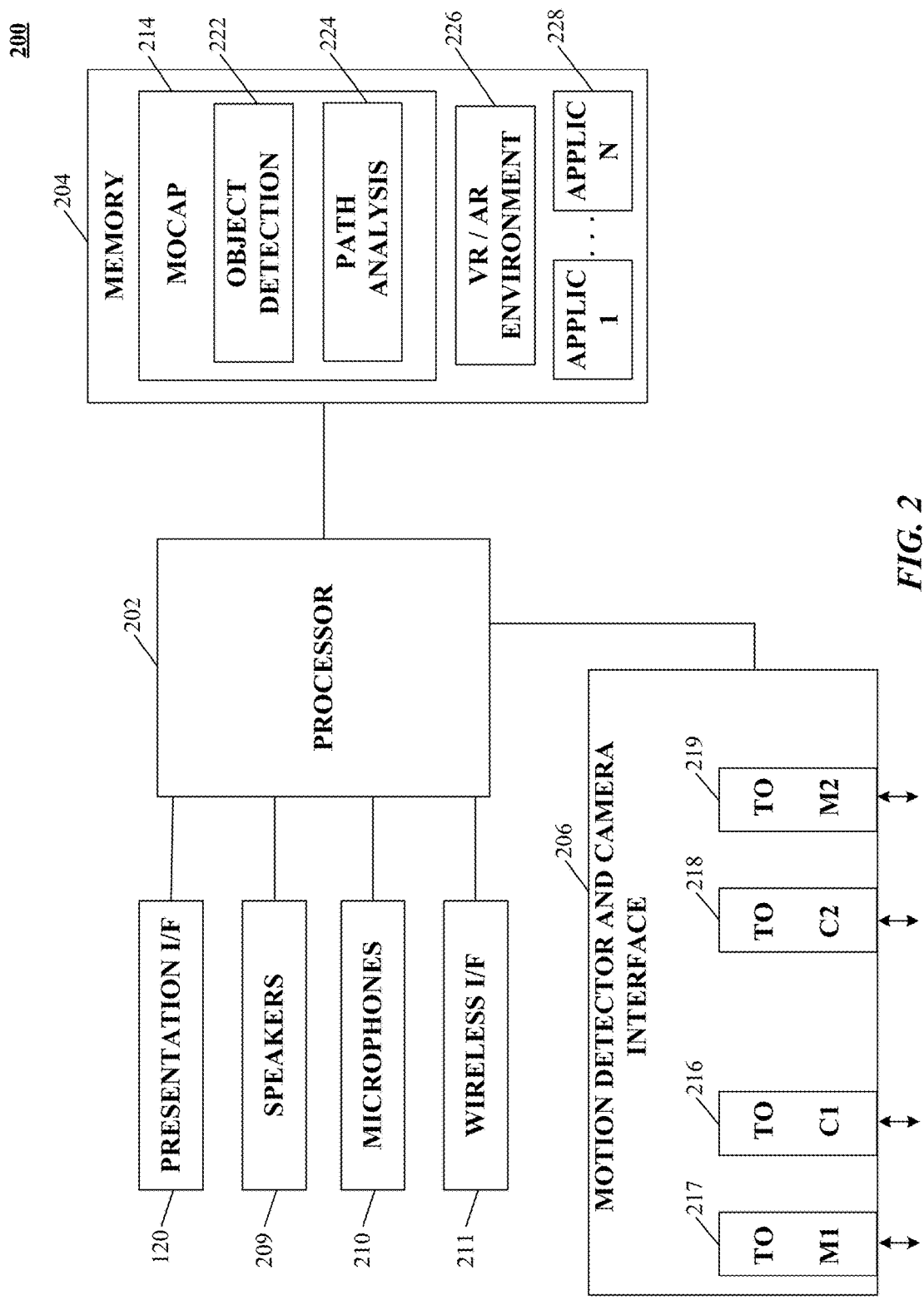
FIG. 2 is a simplified block diagram of a computer system implementing image analysis suitable for supporting a virtual environment enabled apparatus according to an implementation of the technology disclosed.

Refer now to FIG. 2, which shows a simplified block diagram of a computer system 200 for implementing sensory processing system 106. Computer system 200 includes a processor 202, a memory 204, a motion detector and camera interface 206, a presentation interface 120, speaker(s) 209, a microphone(s) 210, and a wireless interface 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPEN-ACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Motion detector and camera interface 206 can include hardware and/or software that enables communication between computer system 200 and cameras 102, 104, as well as sensors 108, 110 (see FIG. 1). Thus, for example, motion detector and camera interface 206 can include one or more camera data ports 216, 218 and motion detector ports 217, 219 to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 214 executing on processor 202. In some implementations, motion detector and camera interface 206 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and audio signals from sensors connected to motion detector and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. In some implementations, object analysis module 222 can also analyze audio signals (e.g., audio signals captured via interface 206) to localize the object by, for example, time distance of arrival, multilateration or the like. ("Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC). Path analysis module 224 can track and predict object movements in 3D based on information obtained via the cameras. Some implementations will include a Virtual Reality (VR)/Augmented Reality (AR) environment manager 226 that provides integration of virtual objects reflecting real objects (e.g., hand 114) as well as synthesized objects 116 for presentation to user of device 101 via presentation interface 120 to provide a personal virtual experience. One or more applications 228 can be loaded into memory 204 (or otherwise made available to processor 202) to augment or customize functioning of device 101 thereby enabling the system 200 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis.

VR/AR environment manager 226 can include a number of components for generating a VR/AR environment. One component can be a camera such as cameras 102 or 104 or other video input to generate a digitized video image of the real world or user-interaction region. The camera can be any digital device that is dimensioned and configured to capture still or motion pictures of the real world and to convert those images to a digital stream of information that can be manipulated by a computer. For example, cameras 102 or 104 can be digital still cameras, digital video cameras, web cams, head-mounted displays, phone cameras, tablet personal computers, ultra-mobile personal computers, and the like.

Another component can be a transparent, partially transparent, or semi-transparent user interface such as a display of HMD 101 that combines rendered 3D virtual imagery with a view of the real world, so that both are visible at the same time to a user. In some implementations, the rendered 3D virtual imagery can projected using holographic, laser, stereoscopic, auto-stereoscopic, or volumetric 3D displays.

The VR/AR environment manager 226 can generate for display the virtual objects automatically or in response to trigger events. For example, a virtual object may only appear when the user selects an icon or invokes an application presented across the VR/AR environment. In other implementations, the virtual object can be generated using a series of unique real world markers. The markers can be of any design, including a circular, linear, matrix, variable bit length matrix, multi-level matrix, black/white (binary), gray scale patterns, and combinations thereof. The markers can be two-dimensional or three-dimensional. The markers can be two- or three-dimensional barcodes, or two- or three-dimensional renderings of real world, three-dimensional objects. For example, the markers can be thumbnail images of the virtual images that are matched to the markers. The marker can also be an image of a real world item which the software has been programmed to recognize. So, for example, the software can be programmed to recognize a smart phone or other item from a video stream of a book. The software then superimposes the virtual object in place of the smart phone device. Each unique real world marker can correspond to a different virtual object, or a quality of a virtual object (e.g. the control's color, texture, opacity, adhesiveness, etc.) or both the virtual object itself and all (or a subset) of the qualities of the virtual object.

In some implementations, the VR/AR environment manager 226 can use an VR/AR library that serves as an image repository or database of interactive virtual objects, a computer 200 that can selectively search and access the library, and a display (embedded within the HMD 101) or a projector that is dimensioned and configured to display the real world digital image captured by a camera, as well as the virtual objects retrieved from the VR/AR library. In some implementations, computer 200 includes a search and return engine that links each unique real world marker to a corresponding virtual object in the VR/AR library.

In operation, a camera (e.g. 102, 104) returns a digital video stream of the real world, including images of one or more of the markers described previously. Image samples are taken from the video stream and passed to the computer 200 for processing. The search and return engine then searches the VR/AR library for the virtual object that corresponds to the marker images contained in the digital video stream of the real world. Once a match is made between a real world marker contained in the digital video stream and the VR/AR library, the AR library returns the virtual object, its qualities, and its orientation for display across a screen of the HMD 101. The virtual object is then superimposed upon the real world space that comprises a digital marker in the form of a quick response (QR) code or RFID tags, according to one example. In other implementations, multiple markers can be used to position and orient a single virtual control.

In yet other implementations, a "markerless" VR/AR experience can be generated by identifying features of the surrounding real-world physical environment via sensors such as gyroscopes, accelerometers, compasses, and GPS data such as coordinates.

Projected VR/AR allows users to simultaneously view the real word physical space and the virtual object superimposed in the space. In one implementation, a virtual object can be projected on to the real word physical space using micro-projectors embedded in wearable goggle or other head mounted display (like HMD 101) that cast a perspective view of a stereoscopic 3D imagery onto the real world space. In such an implementation, a camera, in-between the micro-projectors can scan for infrared identification markers placed in the real world space. The camera can use these markers to precisely track the user's head position and orientation in the real word physical space, according to another implementation. Yet another implementation includes using retro-reflectors in the real word physical space to prevent scattering of light emitted by the micro-projectors and to provision multi-user participation by maintaining distinct and private user views. In such an implementation, multiple users can simultaneously interact with the same virtual object or with virtual controls that manipulate the same virtual object, such that both the users view the same virtual objects and manipulations to virtual objects by one user are seen by the other user, hence creating a collaborative environment.

In other implementations, projected VR/AR obviates the need of using wearable hardware such as goggles and other hardware like displays to create an AR experience. In such implementations, a video projector, volumetric display device, holographic projector, and/or heads-up display can be used to create a "glasses-free" AR environment. See e.g., holographic chip projectors available from Ostendo, a company headquartered in Carlsbad, Calif. (http://online.wsj.com/articles/new-chip-to-bring-holograms-to-smartphones-1401752938). In one implementation, such projectors can be electronically coupled to user computing devices such as HMDs, smart phones and can be configured to produce and magnify virtual object and/or augmented virtual objects that are perceived as being overlaid on the real word physical space.

The sensory processing system 106, which captures a series of sequentially temporal images of a region of interest 112. It further identifies any gestures performed in the region of interest 112 or objects in the region of interest 212 and controls responsiveness of the rendered 3D virtual imagery to the performed gestures by updating the 3D virtual imagery based on the corresponding gestures.

Presentation interface 120, speakers 209, microphones 210, and wireless network interface 211 can be used to facilitate user interaction via device 101 with computer system 200. These components can be of generally conventional design or modified as desired to provide any type of user interaction. In some implementations, results of motion capture using motion detector and camera interface 206 and mocap program 214 can be interpreted as user input. For example, a user can perform hand gestures or motions across a surface that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed to the user of device 101 via presentation interface 120, to use rotating gestures to increase or decrease the volume of audio output from speakers 209, and so on. Path analysis module 224 may represent the detected path as a vector and extrapolate to predict the path, e.g., to improve rendering of action on device 101 by presentation interface 120 by anticipating movement.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object analysis module 222 by processor 202 can cause processor 202 to operate motion detector and camera interface 206 to capture images and/or audio signals of an object traveling across and in contact with a surface to detect its entrance by analyzing the image and/or audio data.

Figure 3A:
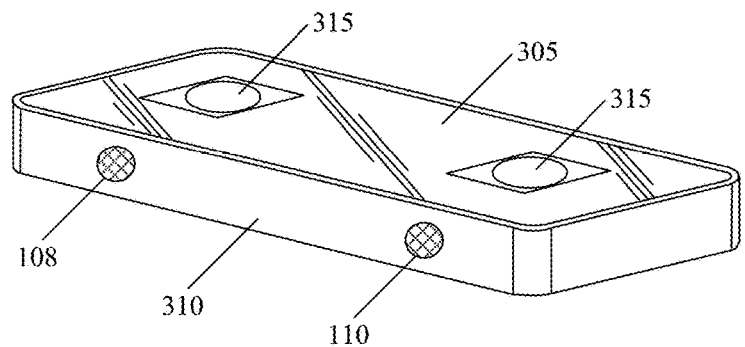
FIG. 3A is a perspective view from the top of a sensor in accordance with the technology disclosed, with motion sensors along an edge surface thereof
Figure 3B:
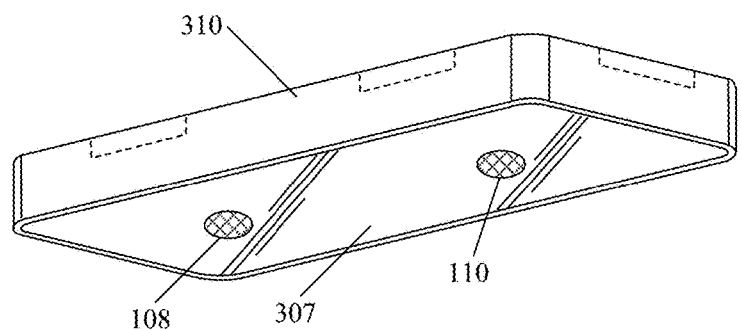
FIG. 3B is a perspective view from the bottom of a sensor in accordance with the technology disclosed, with motion sensors along the bottom surface thereof.
Figure 3C:
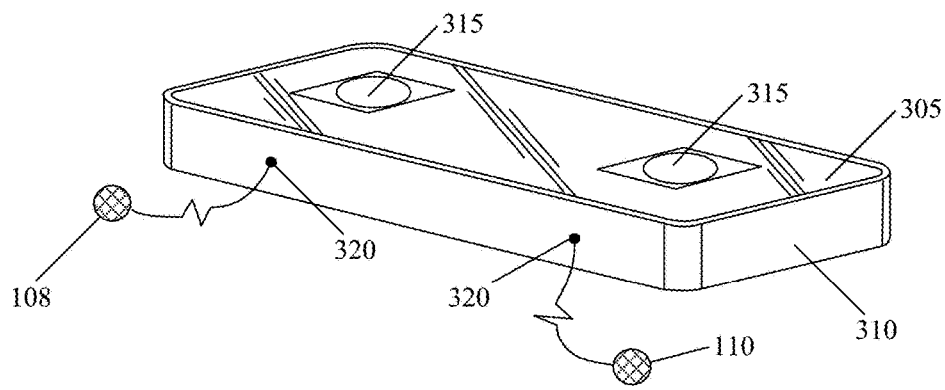
FIG. 3C is a perspective view from the top of a sensor in accordance with the technology disclosed, with detachable motion sensors configured for placement on a surface.

FIGS. 3A, 3B, and 3C illustrate three different configurations of a movable sensor system 300A-C, with reference to example implementations packaged within a single housing as an integrated sensor. In all cases, sensor 300A, 300B, 300C includes a top surface 305, a bottom surface 307, and a side wall 310 spanning the top and bottom surfaces 305, 307. With reference also to FIG. 3A, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked. In sensor 300A, motion sensors 108, 110 are located on the side wall 310. Desirably, the motion sensors are flush with the surface of side wall 310 so that, the motion sensors are disposed to sense motions about a longitudinal axis of sensor 300A. Of course, the motion sensors can be recessed from side wall 310 internal to the device in order to accommodate sensor operation and placement within available packaging space so long as coupling with the external housing of sensor 300A remains adequate. In sensor 300B, motion sensors 108, 110 are located proximate to the bottom surface 307, once again in a flush or recessed configuration. The top surface of the sensor 300B (not shown in the figure for clarity sake) contains camera windows 315 as shown in FIG. 3A. In FIG. 3C, motion sensors 108, 110 are external contact transducers that connect to sensor 300C via jacks 320. This configuration permits the motion sensors to be located away from the sensor 300C, e.g., if the motion sensors are desirably spaced further apart than the packaging of sensor 300C allows. In other implementations, movable sensor components of FIG. 2 can be imbedded in portable (e.g., head mounted displays (HMDs), wearable goggles, watch computers, smartphones, and so forth) or movable (e.g., autonomous robots, material transports, automobiles (human or machine driven)) devices.

Figure 4:
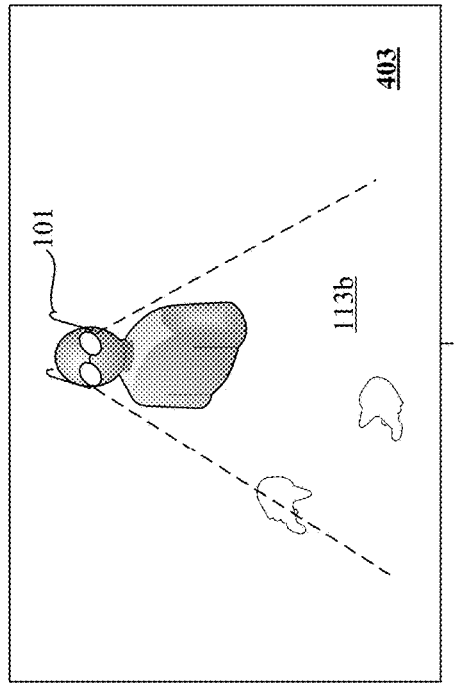
FIG. 4 illustrates apparent movement of objects from the perspective of the user of a virtual environment enabled apparatus in accordance with the technology disclosed.
Figure 4:
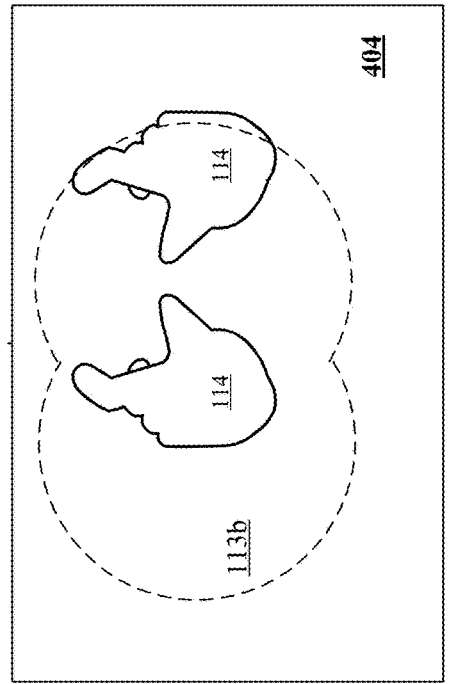
Figure 4:
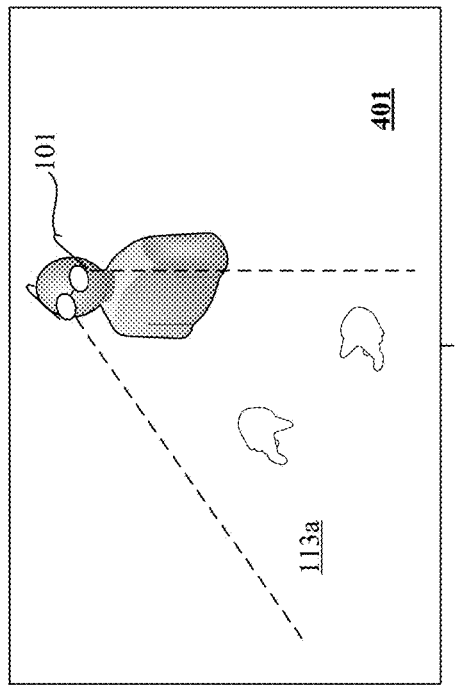
Figure 4:
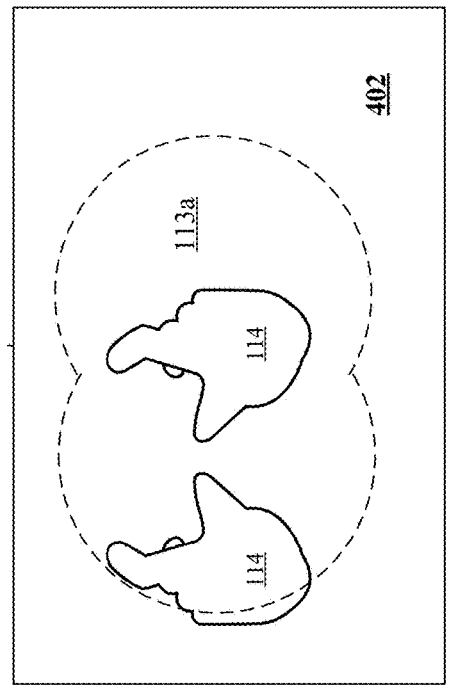

FIG. 4 illustrates apparent movement of objects from the perspective of the user of a virtual environment enabled apparatus 400 in accordance with the technology. FIG. 4 shows two views of a user of a device 101 viewing a field of view 113 at two different times. As shown in block 401, at an initial time $t_0$, user is viewing field of view 113a using device 101 in a particular initial position to view an area 113a. As shown in block 402, device 101 presents to user a display of the device field of view 113a that includes objects 114 (hands) in a particular pose. As shown in block 403, subsequently at time $t_1$, the user has repositioned device 101. Accordingly, the apparent position of objects 114 in the field of view 113b shown in block 404 has changed from the apparent position of the objects 114 in field of view 113a. Even in the case where the hands 114 did not move in space, the user sees an apparent movement of the hands 114 due to the change in position of the device.

Figure 5:
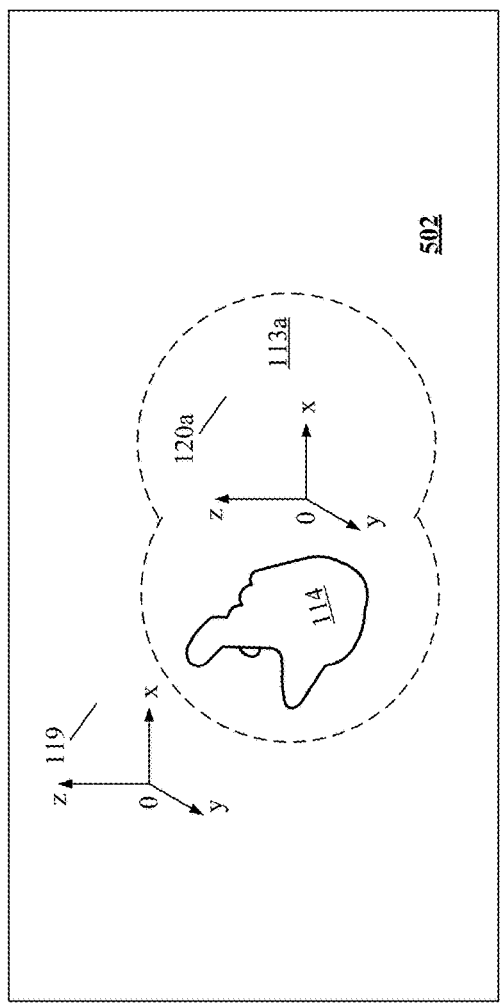
FIG. 5 illustrates apparent movement of objects from the perspective of the user of a virtual environment enabled apparatus in accordance with the technology disclosed.
Figure 5:
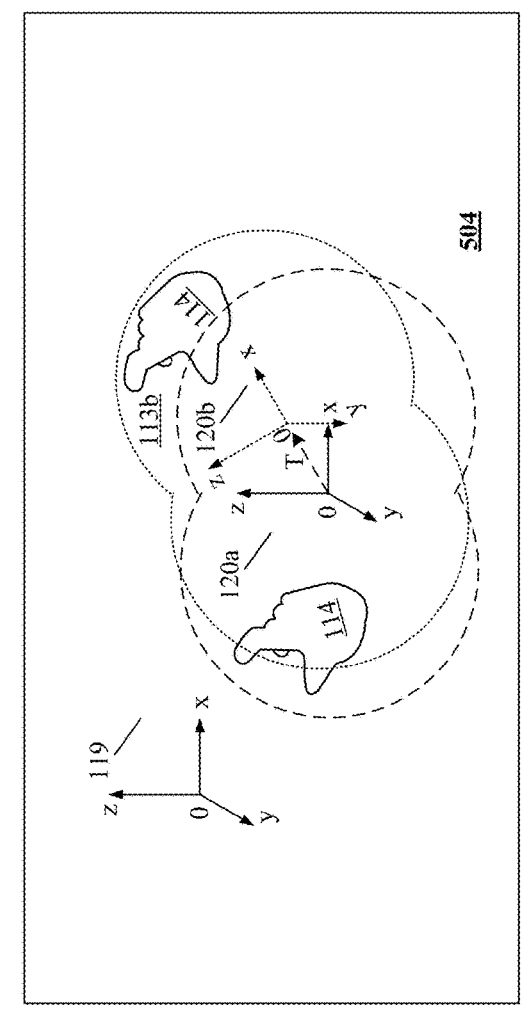

Now with reference to FIG. 5, an apparent movement of one or more moving objects from the perspective of the user of a virtual environment enabled apparatus 500 is illustrated. As shown by block 502, field of view 113a presented by device 101 at time $t_0$ includes an object 114. At time $t_0$, the position and orientation of tracked object 114 is known with respect to device reference frame 120a, again at time $t_0$. As shown by block 404, at time $t_1$, the position and orientation of both device reference frame 120b and tracked object 114 have changed. As shown by block 504, field of view 113b presented by device 101 at time $t_1$ includes object 114 in a new apparent position. Because the device 101 has moved, the device reference frame 120 has moved from an original or starting device reference frame 120a to a current or final reference frame 120b as indicated by transformation T. It is noteworthy that the device 101 can rotate as well as translate. Implementations can provide sensing the position and rotation of reference frame 120b with respect to reference frame 120a and sensing the position and rotation of tracked object 114 with respect to 120b, at time $t_1$. Implementations can determine the position and rotation of tracked object 114 with respect to 120a from the sensed position and rotation of reference frame 120b with respect to reference frame 120a and the sensed position and rotation of tracked object 114 with respect to 120b.

In an implementation, a transformation $R^T$ is determined that moves dashed line reference frame 120a to dotted line reference frame 120b, without intermediate conversion to an absolute or world frame of reference. Applying the reverse transformation $-R^T$ makes the dotted line reference frame 120b lie on top of dashed line reference frame 120a. Then the tracked object 114 will be in the right place from the point of view of dashed line reference frame 120a. (It is noteworthy that $R^T$ is equivalent to $R^{-1}$ for our purposes.) In determining the motion of object 114, sensory processing system 106 can determine its location and direction by computationally analyzing images captured by cameras 102, 104 and motion information captured by sensors 108, 110. For example, an apparent position of any point on the object (in 3D space) at time $$t = t_0: \begin{bmatrix} x \\ y \\ z \\ 1 \end{bmatrix},$$

can be converted to a real position of the point on the object at time $$t = t_1: \begin{bmatrix} x' \\ y' \\ z' \\ 1 \end{bmatrix}$$

using an affine transform $$\begin{bmatrix} R_{ref} & T_{ref} \\ 0 & 1 \end{bmatrix}$$

from the frame of reference of the device. We refer to the combination of a rotation and translation, which are not generally commutative, as the affine transformation.

The correct location at time $t=t_1$ of a point on the tracked object with respect to device reference frame 120a is given by an inverse affine transformation, e.g., $$\begin{bmatrix} R_{ref}^T & -R_{ref}^T * T_{ref} \\ 0 & 1 \end{bmatrix}$$

as provided for in equation (1):

$$\begin{bmatrix} R_{ref}^T & (-R_{ref}^T) * T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (1)$$

Where:

$R_{ref}^T$—Represents the rotation matrix part of an affine transform describing the rotation transformation from the device reference frame 120a to the device reference frame 120b.

$T_{ref}$—Represents translation of the device reference frame 120a to the device reference frame 120b.

One conventional approach to obtaining the Affine transform R (from axis unit vector $u=(u_x, u_y, u_z)$, rotation angle $\theta$) method. Wikipedia, at http://en.wikipedia.org/wiki/Rotation_matrix, Rotation matrix from axis and angle, on Jan. 30, 2014, 20:12 UTC, upon which the computations equation (2) are at least in part inspired:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix} \quad (2)$$

$$R^T = \begin{bmatrix} \cos\theta + u_x^2(1-\cos\theta) & u_y u_x(1-\cos\theta) + u_z\sin\theta & u_z u_x(1-\cos\theta) - u_y\sin\theta \\ u_x u_y(1-\cos\theta) - u_z\sin\theta & \cos\theta + u_y^2(1-\cos\theta) & u_z u_y(1-\cos\theta) + u_x\sin\theta \\ u_x u_z(1-\cos\theta) + u_y\sin\theta & u_y u_z(1-\cos\theta) + u_x\sin\theta & \cos\theta + u_z^2(1-\cos\theta) \end{bmatrix}$$

$$-R^T = \begin{bmatrix} -\cos\theta - u_x^2(1-\cos\theta) & -u_y u_x(1-\cos\theta) - u_z\sin\theta & -u_z u_x(1-\cos\theta) + u_y\sin\theta \\ -u_x u_y(1-\cos\theta) + u_z\sin\theta & -\cos\theta - u_y^2(1-\cos\theta) & -u_z u_y(1-\cos\theta) - u_x\sin\theta \\ -u_x u_z(1-\cos\theta) - u_y\sin\theta & -u_y u_z(1-\cos\theta) + u_x\sin\theta & -\cos\theta - u_z^2(1-\cos\theta) \end{bmatrix}$$

$$T = \begin{bmatrix} a \\ b \\ c \end{bmatrix}$$

is a vector representing a translation of the object with respect to origin of the coordinate system of the translated frame, $$-R^T * T = \begin{bmatrix} (-\cos\theta - u_x^2(1-\cos\theta))(a) + (-\cos\theta - u_y^2(1-\cos\theta))(b) + \\ (-u_z u_x(1-\cos\theta) + u_y\sin\theta)(c) \\ (-u_x u_y(1-\cos\theta) + u_z\sin\theta)(a) + (-\cos\theta - u_y^2(1-\cos\theta))(b) + \\ (-u_z u_y(1-\cos\theta) - u_x\sin\theta)(c) \\ (-u_x u_z(1-\cos\theta) - u_y\sin\theta)(a) + \\ (-u_y u_z(1-\cos\theta) + u_x\sin\theta)(b) + \\ (-\cos\theta - u_z^2(1-\cos\theta))(c) \end{bmatrix}$$

In another example, an apparent orientation and position of the object at time $t=t_0$: vector pair $$\begin{bmatrix} R_{obj} & T_{obj} \\ 0 & 1 \end{bmatrix},$$

can be converted to a real orientation and position of the object at time $$t = t_1: \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

The correct orientation and position of the tracked object with respect to device reference frame at time $t=t_0$ (120a) is given by an inverse affine transformation, e.g., $$\begin{bmatrix} R_{ref}^T & -R_{ref}^T * T_{ref} \\ 0 & 1 \end{bmatrix}$$

as provided for in equation (3):

$$\begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (3)$$

Where:
- $R^T_{ref}$—Represents the rotation matrix part of an affine transform describing the rotation transformation from the device reference frame 120a to the device reference frame 120b.
- $R_{obj}$—Represents a matrix describing the rotation at $t_0$ of the object with respect to the device reference frame 120b.
- $R'_{obj}$—Represents a matrix describing the rotation at $t_1$ of the object with respect to the device reference frame 120a.
- $T_{ref}$—Represents a vector translation of the device reference frame 120a to the device reference frame 120b.
- $T_{obj}$—Represents a vector describing the position at $t_0$ of the object with respect to the device reference frame 120b.
- $T'_{obj}$—Represents a vector describing the position at $t_1$ of the object with respect to the device reference frame 120a.

In a yet further example, an apparent orientation and position of the object at time $t=t_0$: affine transform $$\begin{bmatrix} R_{obj} & T_{obj} \\ 0 & 1 \end{bmatrix},$$

can be converted to a real orientation and position of the object at time $$t = t_1 : \begin{bmatrix} R'_{obj} & T'_{obj} \\ 0 & 1 \end{bmatrix}$$

using an affine transform $$\begin{bmatrix} R_{ref} & T_{ref} \\ 0 & 1 \end{bmatrix}.$$

Furthermore, the position and orientation of the initial reference frame with respect to a (typically) fixed reference point in space can be determined using an affine transform $$\begin{bmatrix} R_{init} & T_{init} \\ 0 & 1 \end{bmatrix}.$$

The correct orientation and position of the tracked object with respect to device reference frame at time $t=t_0$ (120a) is given by an inverse affine transformation, e.g., $$\begin{bmatrix} R_{init}^T & (R_{init}^T) * T_{init} \\ 0 & 1 \end{bmatrix}$$

as provided for in equation (4):

$$\begin{bmatrix} R_{init}^T & (-R_{init}^T) * T_{init} \\ 0 & 1 \end{bmatrix} \begin{bmatrix} R_{ref}^T & (-R_{ref}^T) * T_{ref} \\ 0 & 1 \end{bmatrix} * \begin{bmatrix} R_{obj} & T_{obj} \\ 0 & 1 \end{bmatrix} = \begin{bmatrix} R'_{obj} & T'_{obj} \\ 0 & 1 \end{bmatrix} \quad (4)$$

Where:
- $R^T_{init}$—Represents a rotation matrix part of an affine transform describing the rotation transformation at $t_0$ from the world reference frame 119 to the device reference frame 120a.
- $R^T_{ref}$—Represents the rotation matrix part of an affine transform describing the rotation transformation from the device reference frame 120a to the device reference frame 120b.
- $R_{obj}$—Represents a matrix describing the rotation of the object at $t_0$ with respect to the device reference frame 120b.
- $R'_{obj}$—Represents a matrix describing the rotation of the object at $t_1$ with respect to the device reference frame 120a.
- $T_{init}$—Represents a vector translation at $t_0$ of the world reference frame 119 to the device reference frame 120a.
- $T_{ref}$—Represents a vector translation at $t_1$ of the device reference frame 120a to the device reference frame 120b.
- $T_{obj}$—Represents a vector describing the position at $t_0$ of the object with respect to the device reference frame 120b.
- $T'_{obj}$—Represents a vector describing the position at $t_1$ of the object with respect to the device reference frame 120a.

Detecting Motion Using Image Information

In some implementations, the technology disclosed can build a world model with an absolute or world frame of reference. The world model can include representations of object portions (e.g. objects, edges of objects, prominent vortices) and potentially depth information when available from a depth sensor, depth camera or the like, within the viewpoint of the virtual or augmented reality head mounted sensor. The system can build the world model from image information captured by the cameras of the sensor. Points in 3D space can be determined from the stereo-image information are analyzed to obtain object portions. These points are not limited to a hand or other control object in a foreground; the points in 3D space can include stationary background points, especially edges. The model is populated with the object portions.

When the sensor moves (e.g., the wearer of a wearable headset turns her head) successive stereo-image information is analyzed for points in 3D space. Correspondences are made between two sets of points in 3D space chosen from the current view of the scene and the points in the world model to determine a relative motion of the object portions. The relative motion of the object portions reflects actual motion of the sensor.

Differences in points are used to determine an inverse transformation (the $$\begin{bmatrix} R^T & -R^T * T \\ 0 & 1 \end{bmatrix}$$

between model position and new position of object portions. In this affine transform, $R^T$ describes the rotational portions of motions between camera and object coordinate systems, and T describes the translational portions thereof.

The system then applies an inverse transformation of the object corresponding to the actual transformation of the device (since the sensor, not the background object moves) to determine the translation and rotation of the camera. Of course, this method is most effective when background objects are not moving relative to the world frame (i.e., in free space).

The model can be updated whenever we detect new points not previously seen in the model. The new points are added to the model so that it continually grows.

Of course, embodiments can be created in which (1) device cameras are considered stationary and the world model is considered to move; or (2) the device cameras are considered to be moving and the world model is considered stationary.

Drift Cancellation

The use of a world model described above does not require any gyroscopic, accelerometer or magnetometer sensors, since the same cameras in a single unit (even the same cameras) can sense both the background objects and the control object. In any view where the system can recognize elements of the model, it can re-localize its position and orientation relative to the model and without drifting from sensor data. In some embodiments, motion sensors can be used to seed the frame to frame transformation and therefore bring correspondences between the rendered virtual or augmented reality scenery closer to the sensed control object, making the result less ambiguous (i.e., the system would have an easier time determining what motion of the head had occurred to result in the change in view from that of the model). In a yet further embodiment, sensor data could be used to filter the solution above so that the motions appear to be smoother from frame to frame, while still remaining impervious to drift caused by relying upon motion sensors alone.

In some implementations, a Kabsch algorithm can be used to determine an optimal rotation matrix given two paired sets of points. Reference regarding Kabsch algorithm can be to Wikipedia, at http://en.wikipedia.org/wiki/Kabsch_algorithm, Kabsch algorithm, on Feb. 11, 2014, 07:30 UTC.

Figure 6:
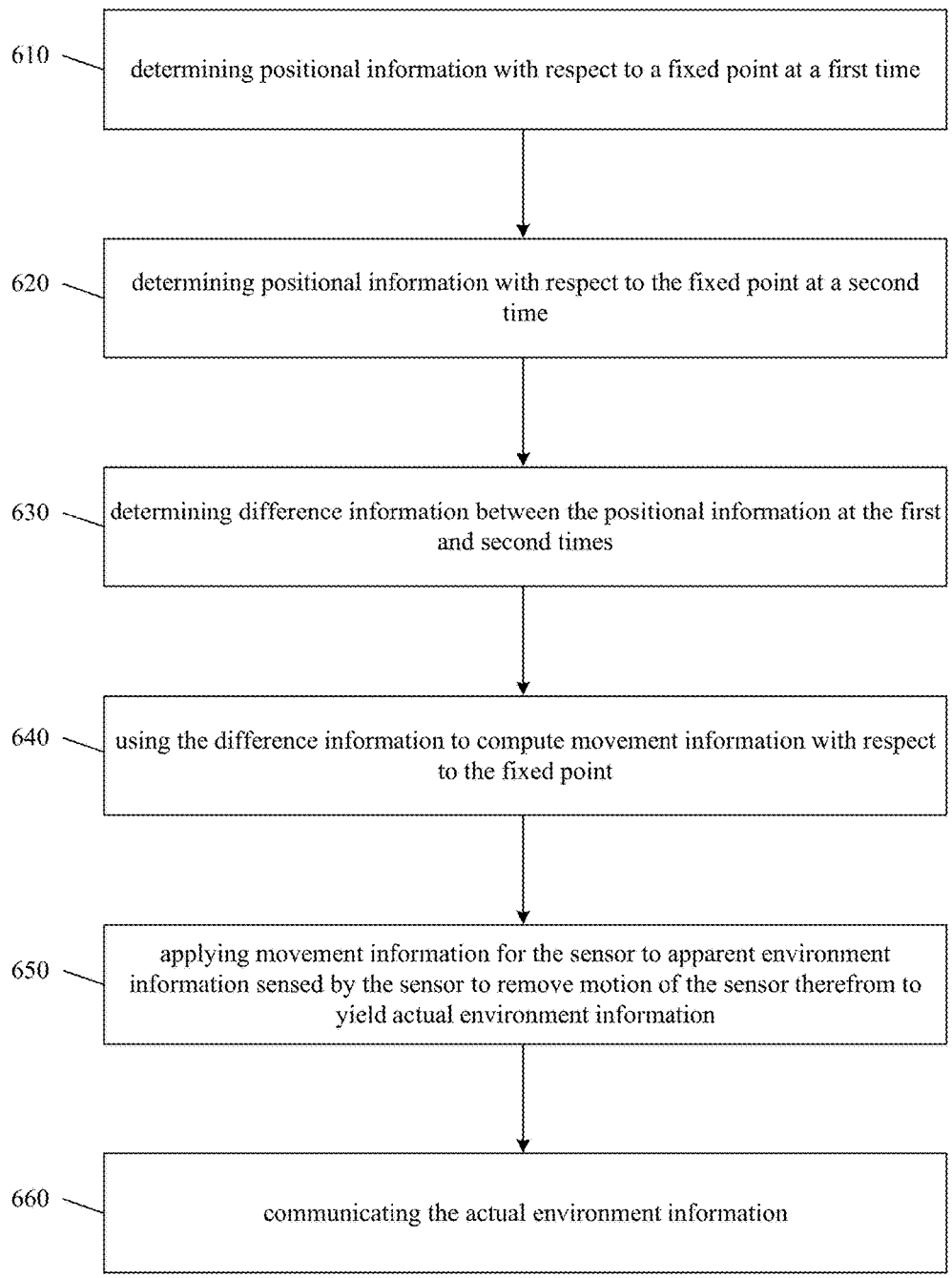
FIG. 6 shows a flowchart of one implementation of determining motion information in a movable sensor apparatus.

FIG. 6 shows a flowchart 600 of one implementation of determining motion information in a movable sensor apparatus. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 610, a first positional information of a portable or movable sensor is determined with respect to a fixed point at a first time. In one implementation, first positional information with respect to a fixed point at a first time $t=t_0$ is determined from one or motion sensors integrated with, or coupled to, a device including the portable or movable sensor. For example, an accelerometer can be affixed to device 101 of FIG. 1 or sensor 300 of FIG. 3, to provide acceleration information over time for the portable or movable device or sensor. Acceleration as a function of time can be integrated with respect to time (e.g., by sensory processing system 106) to provide velocity information over time, which can be integrated again to provide positional information with respect to time. In another example, gyroscopes, magnetometers or the like can provide information at various times from which positional information can be derived. These items are well known in the art and their function can be readily implemented by those possessing ordinary skill. In another implementation, a second motion-capture sensor (e.g., such as sensor 300A-C of FIG. 3 for example) is disposed to capture position information of the first sensor (e.g., affixed to 101 of FIG. 1 or sensor 300 of FIG. 3) to provide positional information for the first sensor.

At action 620, a second positional information of the sensor is determined with respect to the fixed point at a second time $t=t_1$.

At action 630, difference information between the first positional information and the second positional information is determined.

At action 640, movement information for the sensor with respect to the fixed point is computed based upon the difference information. Movement information for the sensor with respect to the fixed point is can be determined using techniques such as discussed above with reference to equations (2).

At action 650, movement information for the sensor is applied to apparent environment information sensed by the sensor to remove motion of the sensor therefrom to yield actual environment information. Motion of the sensor can be removed using techniques such as discussed above with reference to FIGS. 4-5.

At action 660, actual environment information is communicated.

Figure 7:
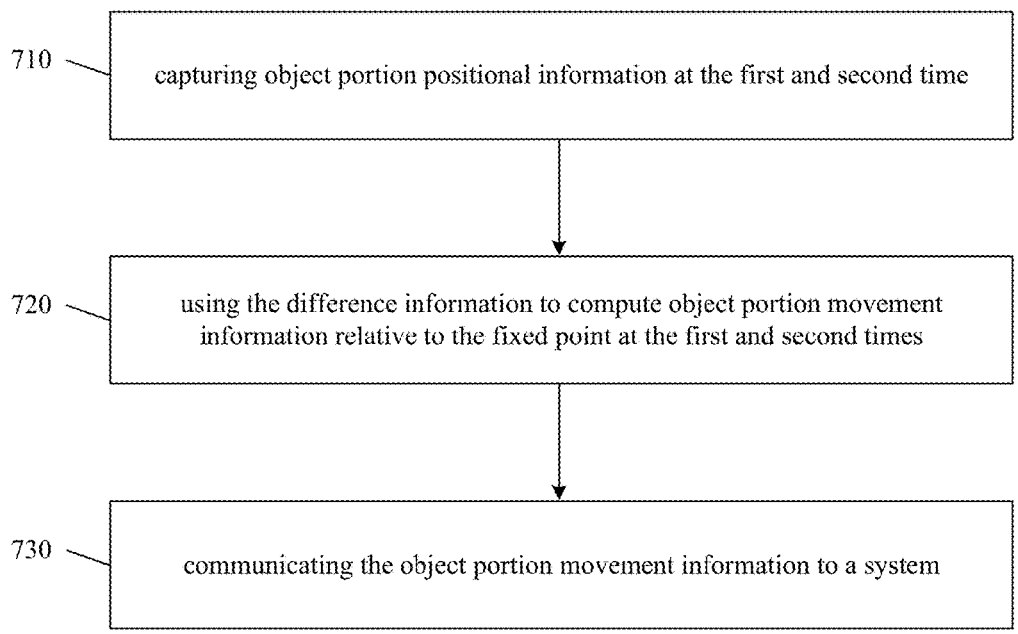
FIG. 7 shows a flowchart of one implementation of applying movement information to apparent environment information sensed by the sensor to yield actual environment information in a movable sensor apparatus.

FIG. 7 shows a flowchart 700 of one implementation of applying movement information for the sensor to apparent environment information (e.g., apparent motions of objects in the environment 112 as sensed by the sensor) to remove motion of the sensor therefrom to yield actual environment information (e.g., actual motions of objects in the environment 112 relative to the reference frame 120a). Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 710, positional information of an object portion at the first time and the second time are captured.

At action 720, object portion movement information relative to the fixed point at the first time and the second time is computed based upon the difference information and the movement information for the sensor.

At action 730, object portion movement information is communicated to a system.

Some implementations will be applied to virtual reality or augmented reality applications. For example, and with reference to FIG. 8, which illustrates a system 800 for projecting a virtual device experience 801 onto a surface medium 116 according to one implementation of the technology disclosed. System 800 includes a sensory processing system 106 controlling a variety of sensors and projectors, such as for example one or more cameras 102, 104 (or other image sensors) and optionally some illumination sources 115, 117 comprising an imaging system. Optionally, a plurality of vibrational (or acoustical) sensors 808, 810 positioned for sensing contacts with surface 116 can be included. Optionally projectors under control of system 106 can augment the virtual device experience 801, such as an optional audio projector 802 to provide for example audio feedback, optional video projector 804, an optional haptic projector 806 to provide for example haptic feedback to a user of virtual device experience 801. For further information on projectors, reference may be had to "Visio-Tactile Projector" YouTube (https://www.youtube.com/watch?v=BbOhNMxxewg) (accessed Jan. 15, 2014). In operation, sensors and projectors are oriented toward a region of interest 112, that can include at least a portion of a surface 116, or free space 112 in which an object of interest 114 (in this example, a hand) moves along the indicated path 118.

Figure 9:
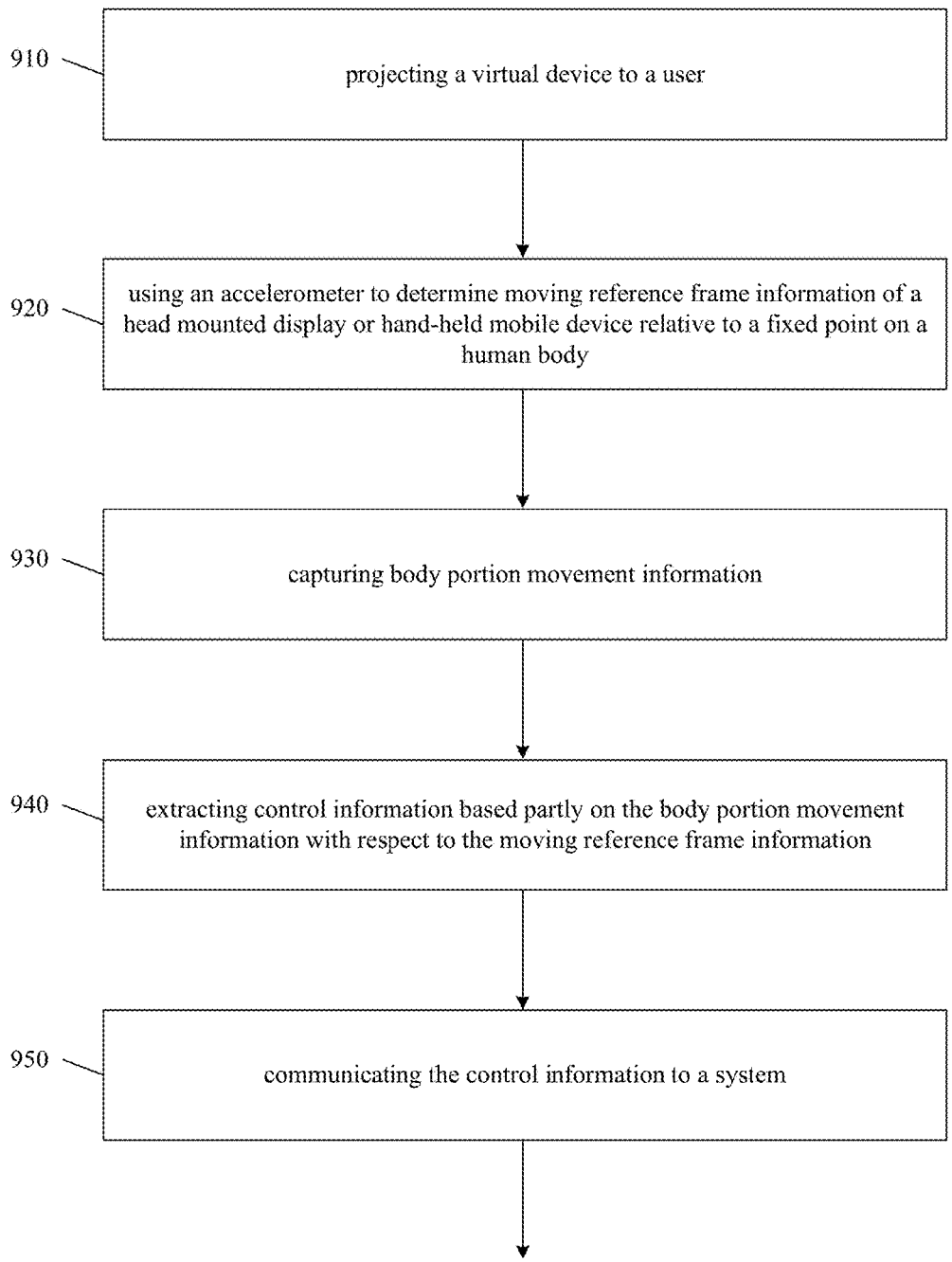
FIG. 9 shows a flowchart of one implementation of providing a virtual device experience.

FIG. 9 shows a flowchart 900 of one implementation of providing a virtual device experience. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, a virtual device is projected to a user. Projection can include an image or other visual representation of an object. For example, visual projection mechanism 804 of FIG. 8 can project a page (e.g., virtual device 801) from a book into a virtual environment 801 (e.g., surface portion 116 or in space 112) of a reader; thereby creating a virtual device experience of reading an actual book, or an electronic book on a physical e-reader, even though no book nor e-reader is present. In some implementations, optional haptic projector 806 can project the feeling of the texture of the "virtual paper" of the book to the reader's finger. In some implementations, optional audio projector 802 can project the sound of a page turning in response to detecting the reader making a swipe to turn the page.

At action 920, using an accelerometer, moving reference frame information of a head mounted display (or hand-held mobile device) relative to a fixed point on a human body is determined.

At action 930, body portion movement information is captured. Motion of the body portion can be detected via sensors 108, 110 using techniques such as discussed above with reference to FIG. 6.

At action 940, control information is extracted based partly on the body portion movement information with respect to the moving reference frame information. For example, repeatedly determining movement information for the sensor and the object portion at successive times and analyzing a sequence of movement information can be used to determine a path of the object portion with respect to the fixed point. For example, a 3D model of the object portion can be constructed from image sensor output and used to track movement of the object over a region of space. The path can be compared to a plurality of path templates and identifying a template that best matches the path. The template that best matches the path control information to a system can be used to provide the control information to the system. For example, paths recognized from an image sequence (or audio signal, or both) can indicate a trajectory of the object portion such as a gesture of a body portion.

At action 950, control information can be communicated to a system. For example, a control information such as a command to turn the page of a virtual book can be sent based upon detecting a swipe along the desk surface of the reader's finger. Many other physical or electronic objects, impressions, feelings, sensations and so forth can be projected onto surface 116 (or in proximity thereto) to augment the virtual device experience and applications are limited only by the imagination of the user.

Figure 10:
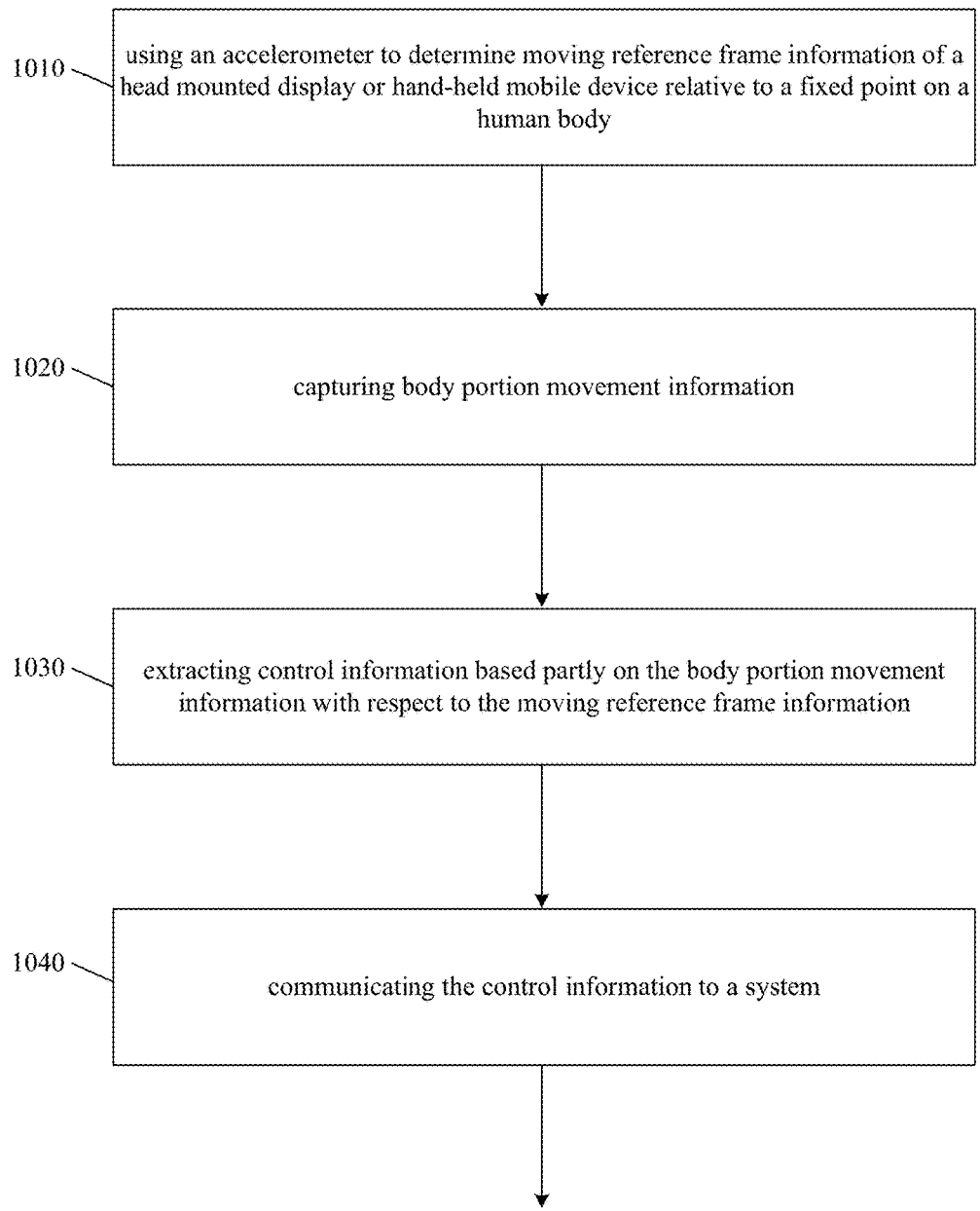
FIG. 10 shows a flowchart of one implementation of cancelling drift in a head mounted device (HMD).

FIG. 10 shows a flowchart 1000 of one implementation of cancelling drift in a head mounted device (HMD). Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, using an accelerometer, moving reference frame information of a head mounted display (or hand-held mobile device) relative to a fixed point on a human body is determined.

At action 1020, body portion movement information is captured.

At action 1030, control information is extracted based partly on the body portion movement information with respect to the moving reference frame information.

At action 1040, the control information is communicated to a system.

In some implementations, motion capture is achieved using an optical motion-capture system. In some implementations, object position tracking is supplemented by measuring a time difference of arrival (TDOA) of audio signals at the contact vibrational sensors and mapping surface locations that satisfy the TDOA, analyzing at least one image, captured by a camera of the optical motion-capture system, of the object in contact with the surface, and using the image analysis to select among the mapped TDOA surface locations as a surface location of the contact.

Reference may be had to the following sources, incorporated herein by reference, for further information regarding computational techniques:

1. Wikipedia, at http://en.wikipedia.org/wiki/Euclidean_group, on Nov. 4, 2013, 04:08 UTC;

2. Wikipedia, at http://en.wikipedia.org/wiki/Affine_transformation, on Nov. 25, 2013, 11:01 UTC;

3. Wikipedia, at http://en.wikipedia.org/wiki/Rotation_matrix, Rotation matrix from axis and angle, on Jan. 30, 2014, 20:12 UTC;

4. Wikipedia, at http://en.wikipedia.org/wiki/Rotation_group_SO(3), Axis of rotation, on Jan. 21, 2014, 21:21 UTC;

5. Wikipedia, at http://en.wikipedia.org/wiki/Transformation_matrix, Affine Transformations, on Jan. 28, 2014, 13:51 UTC; and 6. Wikipedia, at http://en.wikipedia.org/wiki/Axis%E2%80%93angle_representation, on Jan. 25, 2014, 03:26 UTC.

7. Wikipedia, at http://en.wikipedia.org/wiki/Kabsch_algorithm, Kabsch algorithm, on Feb. 11, 2014, 07:30 UTC.

Figure 11A:
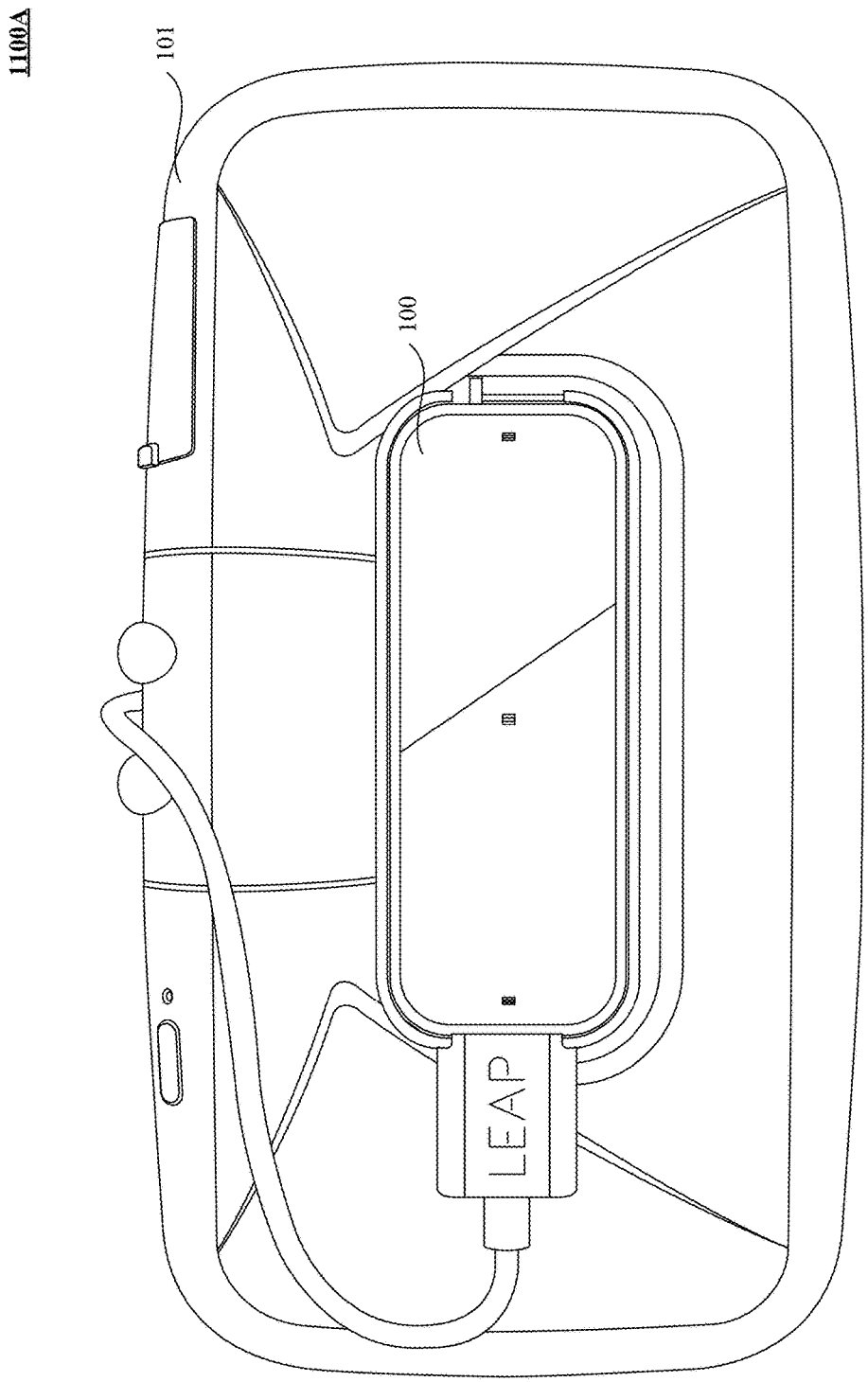
FIGS. 11A, 11B, and 11C illustrate different implementations of a motion sensory integrated with a head mounted device (HMD).
Figure 11B:
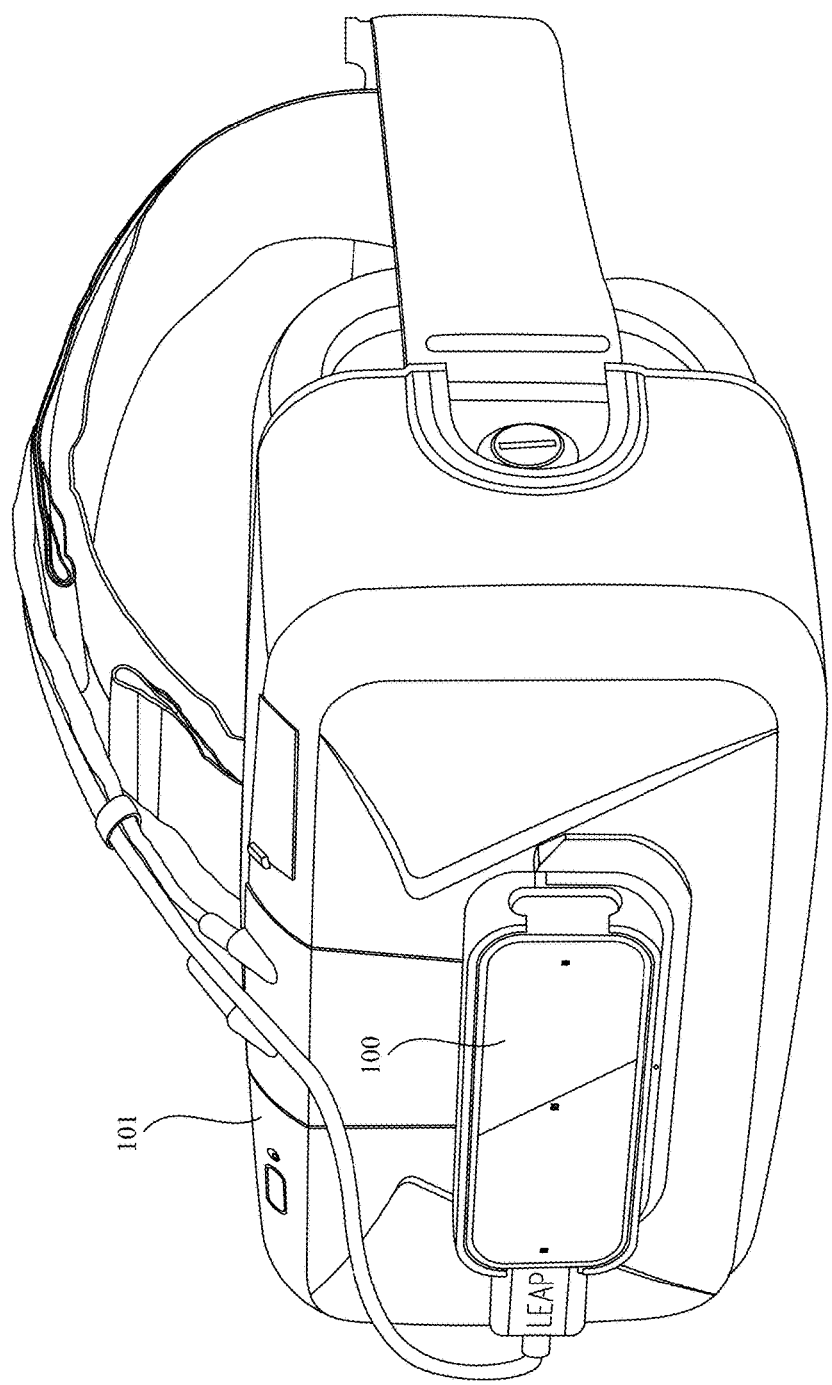
Figure 11C:
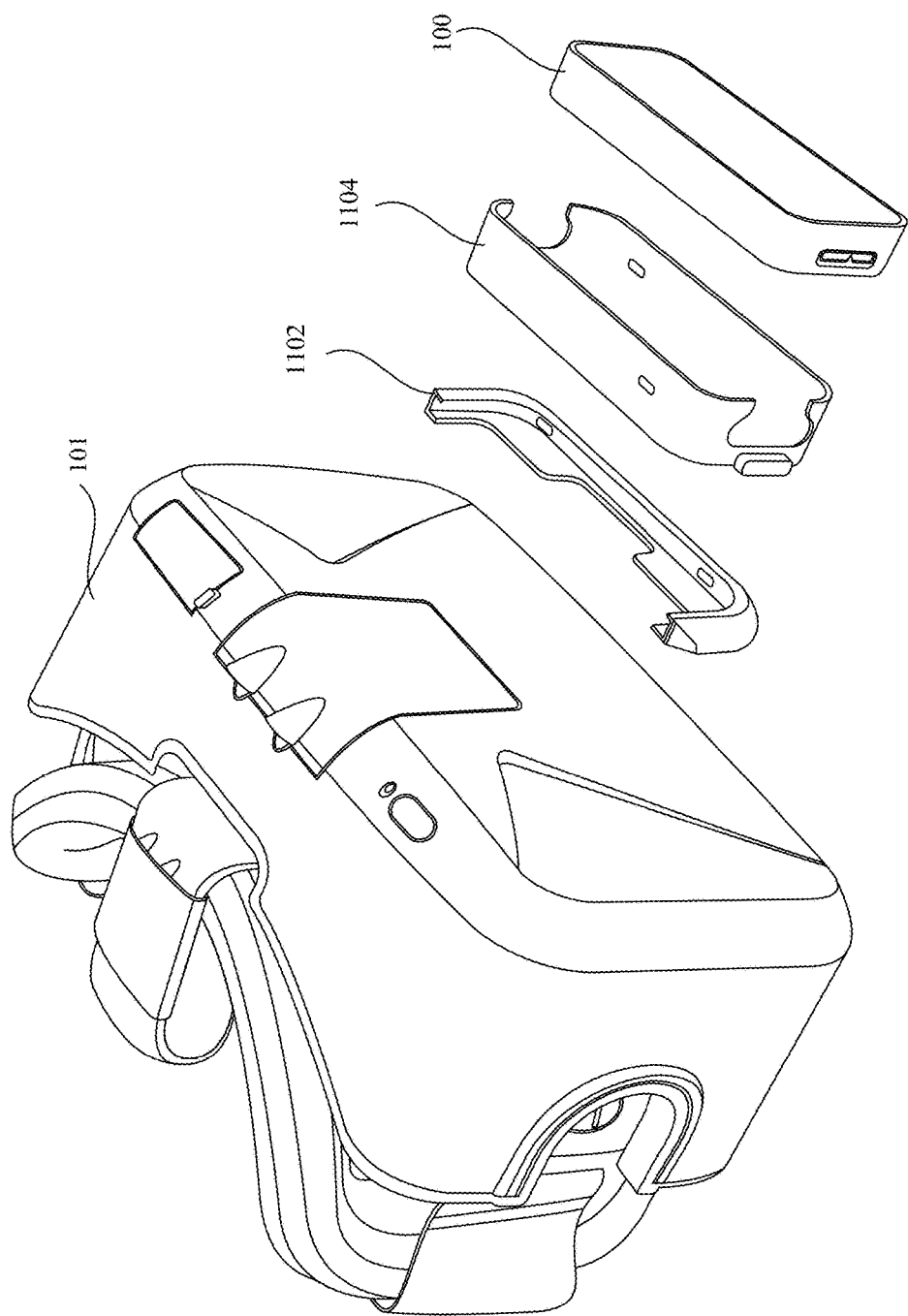

FIGS. 11A, 11B, and 11C illustrate different implementations of a motion sensor 100 attached to a head mounted display 101. HMDs are wearable devices that contain one or more displays positioned in the field of vision of the user 1204 wearing the device 101. HMDs hold the promise of being useful providers of virtual and augmented reality functionality. While popular conventional HMDs, such as "Google Glass" and "Oculus Rift" can be found in gaming applications, attempts to use HMDs in other, "more serious" applications have been wrought with difficulty and drawbacks. One problem is that there is no practical mechanism to provide user input to today's HMDs.

A user 1204 wearing a HMD 101 may have the desire to provide inputs to a computer system in communication with the HMD 101 in order to select among options being displayed (e.g., menus, lists, icons and so forth), select virtual objects (such as 1214A, 1214B, 1314A, 1314B, 1414A, 1414B) being displayed to view properties or obtain more information, add information to objects and other reasons. Unfortunately, however, addition of traditional input devices such as a mouse, joystick, touch pad, or touch screen, or the like would be cumbersome at best, robbing the portability advantages from the wearable device. Speech input holds some promise of providing non-contact based input to HMDs. Unfortunately, however, even commercial grade speech recognition systems have disappointed. Furthermore, even if the speech input system were to function flawlessly, many users would be reticent to use it for fear that it would have the appearance that they were talking to themselves when using the device. The so named "geek-chic" factor is lost.

Consequently, there is a need for enabling users of HMDs and similar devices to be able to provide input to a computer system without encumbrances.

Implementations of the technology disclosed address these and other problems by providing devices and methods for adding motion sensory capabilities to HMDs, enabling users to provide command input to the device with gestures. An example implementation includes a motion capture device 100 that is preferably attached to a wearable device 101 that can be a personal head mounted display (HMD) having a goggle form factor. Motion capture devices include systems for capturing image data that may be used for detecting gestures, motions of objects and so forth. A motion capture device such as motion sensor 100 may include any number of cameras and radiation emitters coupled to a sensory processing system, as described above. The motion capture device can be used for detecting gestures from a user which can be used as an input for a computer system coupled with the HMD. In this application, the phrase "motion sensor" and "motion capture device" are used interchangeably.

In some implementations, the motion sensor 100 can be a motion-capture device (such as for example, a dual-camera motion controller as provided by Leap Motion, Inc., San Francisco, Calif. or other interfacing mechanisms and/or combinations thereof) that is positioned and oriented so as to monitor a region where hand motions normally take place.

In one implementation, a motion capture device 100 is operable to be attached to or detached from an adapter 1104, and the adapter 1104 is operable to be attached to or detached from a HMD 101. The motion capture device 100 is attached to the HMD 101 with an adapter 1104 in a fixed position and orientation. In other implementations, the motion capture device 100 is attached to the HMD 101 using a combination of the adapter 1104 and a mount bracket 1102. In implementations, including 1100A, 1100B, and 1100C, the attachment mechanism coupling the adapter 1104 to the HMD 101 utilizes existing functional or ornamental elements of an HMD like HMD 101. Functional or ornamental elements of the HMD include; air vents, bosses, grooves, recessed channels, slots formed where two parts connect, openings for head straps and so forth. Advantageously using existing features of the HMD to attach the adapter 1104 obviates any need to modify the design of the HMD to attach a motion capture device.

Advantageously, coupling the motion capture device 100 to the HMD 101 enables gesture recognition while the user 1204 is wearing the HMD 101. Further, implementations can provide improved interfacing with computing systems, such as using the motion capture device 100 to detect motion of the HMD 101. With these advantages there is a reduced need for contact-based input devices and stationary contactless input devices.

In yet other implementations, the motion capture device 100 is embedded within the HMD 101 and not separately attached to the HMD 101, such that the HMD 101 and the motion capture device 100 are part of one system along with other components of the HMD 101.

Figure 12A:
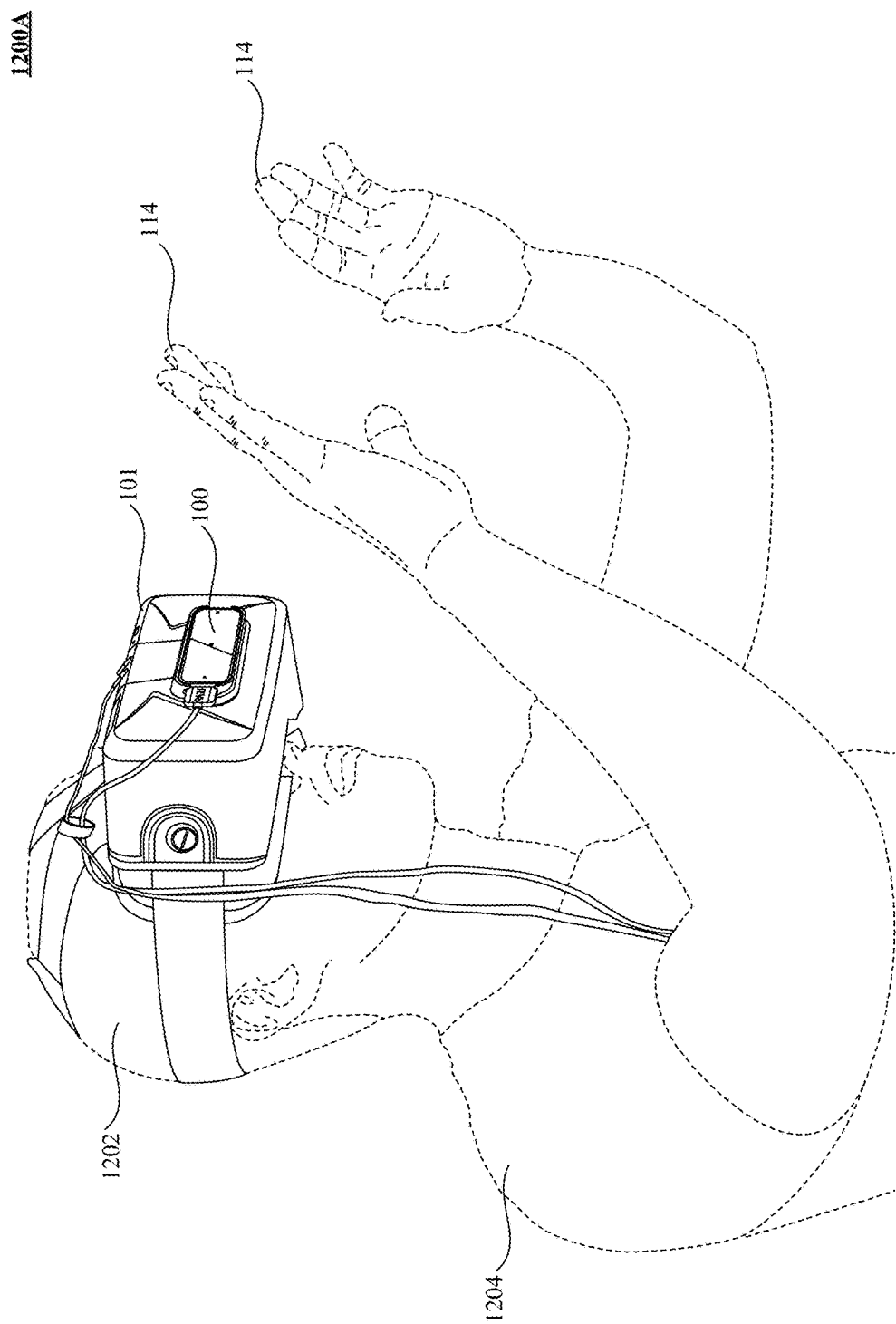
FIG. 12A shows one implementation of a user interacting with a virtual reality/augmented reality environment using a motion sensor integrated with a head mounted device (HMD).

FIG. 12A shows one implementation 1200 of a user 1204 interacting with a virtual reality/augmented reality environment 1206 of the HMD 101 using a motion sensor 100 integrated with a HMD 101. In FIG. 12A, the user 1204 wears the HMD 101 and begins interacting with the VR/AR environment 1206 presented across a display/interface of the HMD 101. In some implementations, the display/interface of the HMD 101 can include virtual objects as part of applications, programs, operating system APIs (which mimic and are analogous to pre-existing "windows, icons, menus, pointer" (WIMP) interactions and operating system kernel) browsers, videos, images, etc.

In FIG. 12A, the user 1204 can operate a virtual environment (such as 1206 of FIG. 12B, 1306 of FIG. 13B and 1406 of FIG. 14) generated by the HMD 101 and viewed by the user 1204 in intuitive ways using free-form in-air gestures that are performed in the real word physical space. For example, gestures can be used to perform traditional manipulations of virtual files, folders, text editors, spreadsheets, databases, paper sheets, recycling bin, windows, or clipboards that represent their pre-existing counterparts. Such manipulations can include the user picking up a virtual object and bringing it to their desired destination, running searches or flipping through with their hands and find what is need, trashing unwanted virtual items by picking them and dropping them into the virtual recycling bin, pointing towards virtual song files to be played, pulling a blank virtual paper and begin typing, pulling-down a virtual menu, selecting a virtual icon, rotating a 3D image for 360 degree inspection, moving forward into the windows envelope with a forward sweep, moving backward into the windows envelope with a backward sweep, bringing in contact a first file icon with an application or program icon using a two-hand inward swipe to open the corresponding file with the application or program, and the like.

Figure 12B:
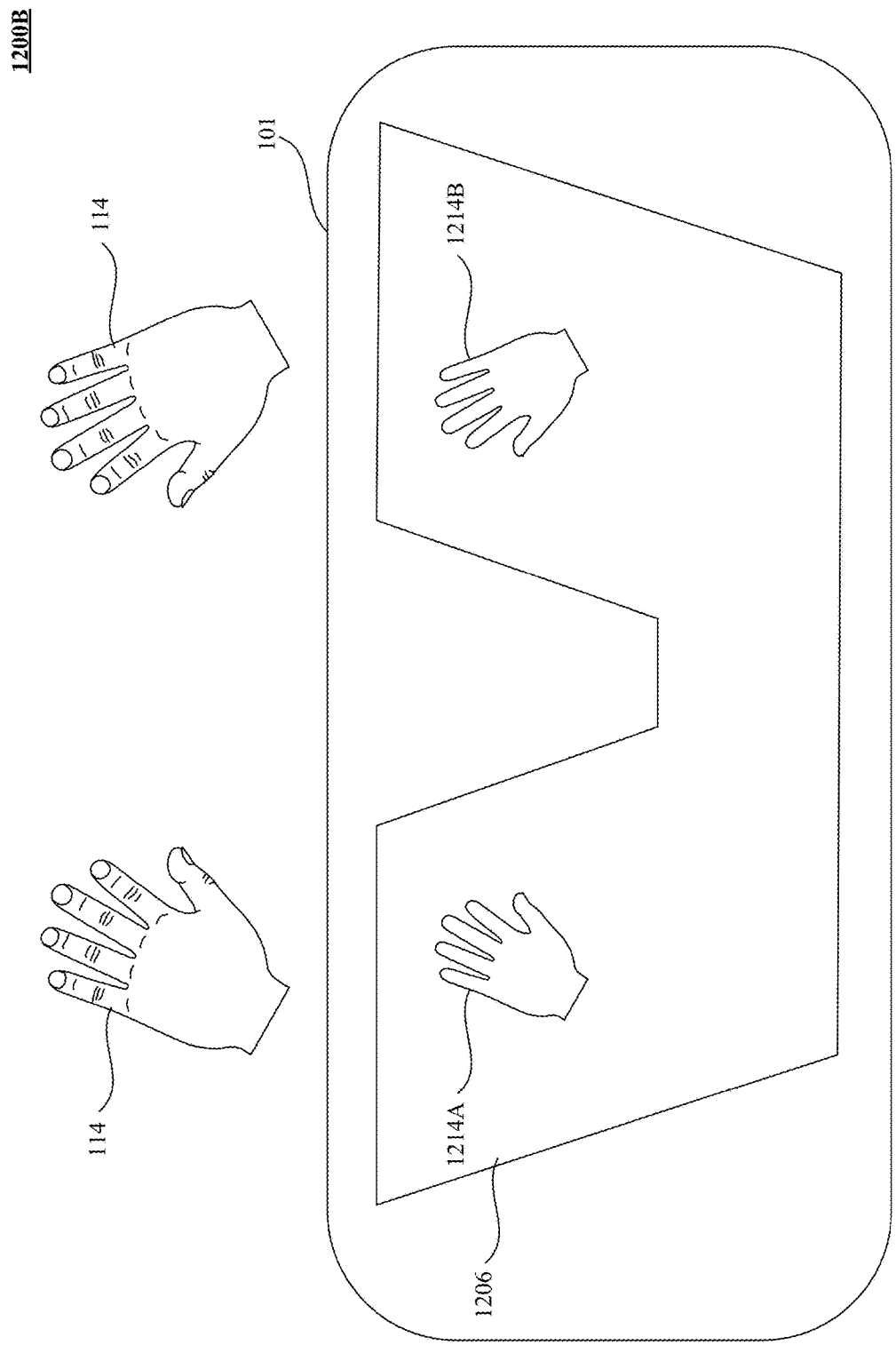
FIG. 12B illustrates one implementation of a virtual reality/augmented reality environment as viewed by a user in FIG. 12A.

FIG. 12B illustrates one implementation 1200B of a virtual reality/augmented reality environment as viewed by a user in FIG. 12A. In particular, FIG. 12B shows an example of rendered 3D virtual imagery in a virtual environment 1206. In various implementations, virtual environment 1206 is generated using real-time rendering techniques such as orthographic or perspective projection, clipping, screen mapping, and/or rasterizing and is transformed into the field of view of a live camera embedded in the motion sensor 100, HMD 101 or another motion sensor, HMD, video projector, holographic projection system, smartphone, wearable goggle, or heads up display (HUD). In some other implementations, transforming models into the current view space of the user 1204 can be accomplished using sensor output from onboard sensors. For example, gyroscopes, magnetometers and other motion sensors can provide angular displacements, angular rates and magnetic readings with respect to a reference coordinate frame, and that data can be used by a real-time onboard rendering engine to generate the 3D virtual imagery. If the user 1204 physically moves the HMD 101, resulting in a change of view of the embedded camera, the virtual environment 1206 and the 3D virtual imagery can be updated accordingly using the sensor data.

In some implementations, virtual environment 1206 can include a variety of information from a variety of local or network information sources. Some examples of information include specifications, directions, recipes, data sheets, images, video clips, audio files, schemas, user interface elements, thumbnails, text, references or links, telephone numbers, blog or journal entries, notes, part numbers, dictionary definitions, catalog data, serial numbers, order forms, marketing or advertising, icons associated with objects managed by an OS, and any other information that may be useful to a user. Some examples of information resources include local databases or cache memory, network databases, Websites, online technical libraries, other devices, or any other information resource that can be accessed by user computing devices either locally or remotely through a communication link.

Virtual objects (such as 1214A, 1214B, 1314A, 1314B, 1414A, 1414B) can include text, images, or references to other information (e.g., links). In one implementation, virtual objects can be displayed proximate to their corresponding real-world objects (e.g. hand 114). In another implementation, virtual objects can describe or otherwise provide useful information about the objects to a user. Some other implementations include the virtual objects representing other and/or different real world products such as furniture (chairs, couches, tables, etc.), kitchen appliances (stoves, refrigerators, dishwashers, etc.), office appliances (copy machines, fax machines, computers), consumer and business electronic devices (telephones, scanners, etc.), furnishings (pictures, wall hangings, sculpture, knick knacks, plants), fixtures (chandeliers and the like), cabinetry, shelving, floor coverings (tile, wood, carpets, rugs), wall coverings, paint colors, surface textures, countertops (laminate, granite, synthetic countertops), electrical and telecommunication jacks, audio-visual equipment, speakers, hardware (hinges, locks, door pulls, door knobs, etc.), exterior siding, decking, windows, shutters, shingles, banisters, newels, hand rails, stair steps, landscaping plants (trees, shrubs, etc.), and the like, and qualities of all of these (e.g. color, texture, finish, etc.).

Figure 13A:
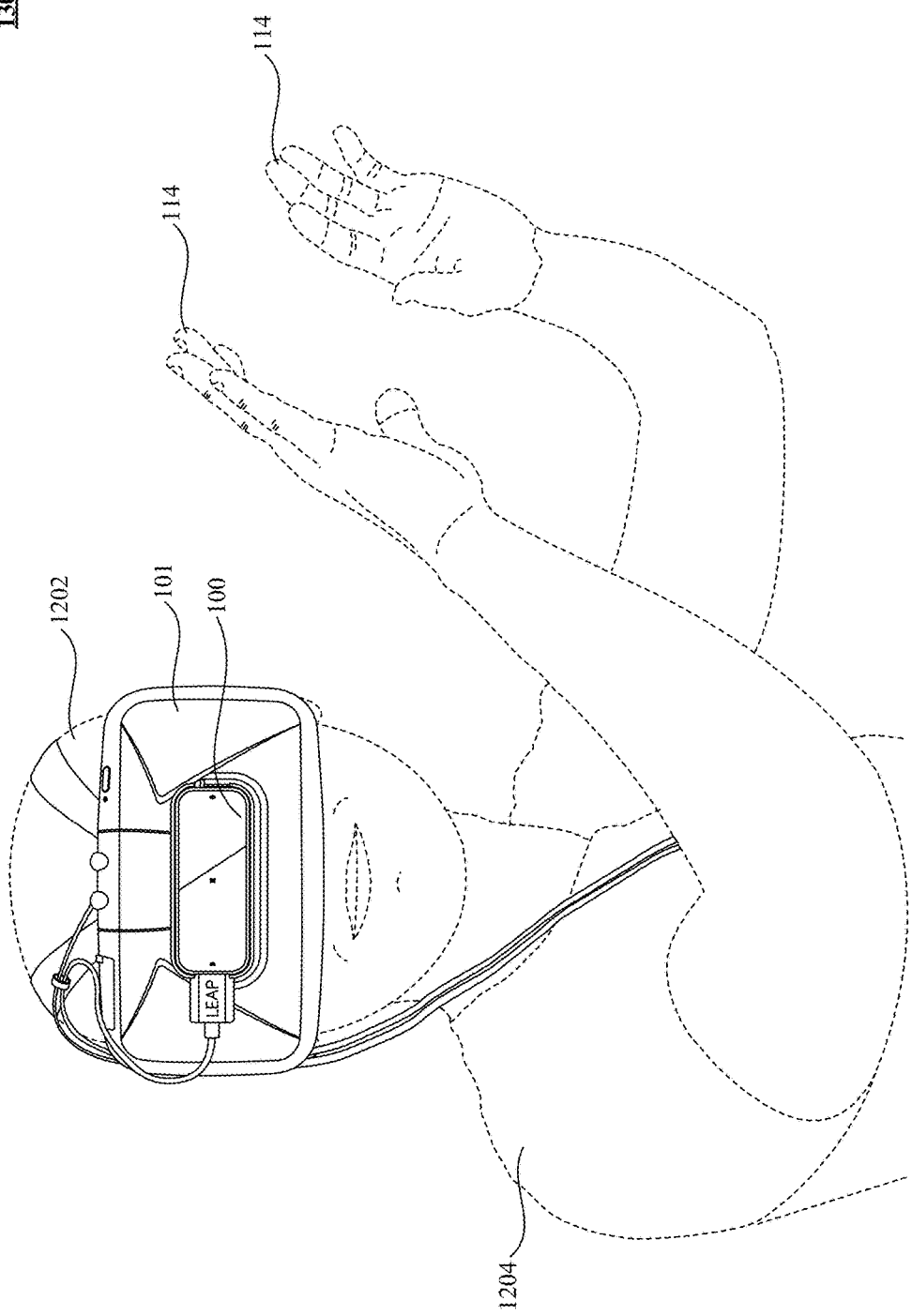
FIG. 13A shows one implementation of moving a motion sensor integrated with a head mounted device (HMD) in response to body movements of a user depicted in FIG. 12A.

In operation, the technology disclosed detects presence and motion of the hands 114 in the real world physical and responsively creates corresponding virtual representations 1214A and 1214B in the virtual environment 1206, which are viewable by the user 1204. FIG. 13A shows one implementation 1300A in which the motion sensor 100 that is integrated with the HMD 101 moves in response to body movements of user 1204.

In the example shown in FIG. 13A, the user 1204 turns his head 1202 causing the HMD 101 and the attached motion sensor 100 to move. The motion of the attached motion sensor 100 causes a change in the reference frame of the HMD 101, resulting in an updated virtual environment 1306 of the HMD 101.

Figure 13B:
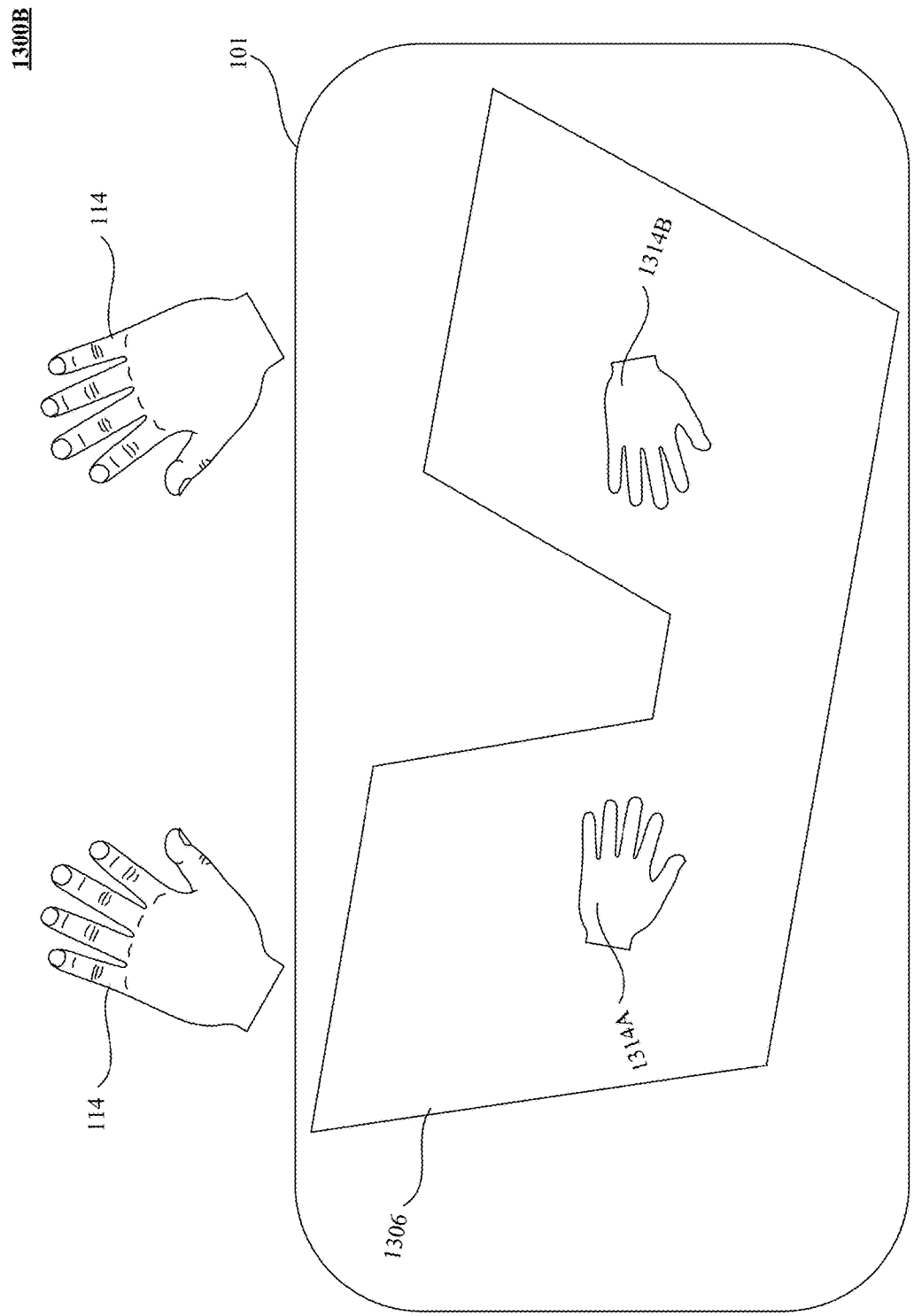
FIG. 13B illustrates one implementation of a virtual reality/augmented reality environment as viewed by a user in FIG. 13A.

FIG. 13B illustrates one implementation 1300B of the updated virtual environment 1306. It should be noted that at this juncture the hands 114 have not moved from their initial position and orientation illustrated in FIGS. 12A and 12B. However, the updated virtual environment 1306 generates erroneous virtual representations 1314A and 1314B based on the movement of the motion sensor 100.

Dependence of the determination of the positions and orientations of the hands 114, and in turn that of their corresponding virtual representations, on the motion of the motion sensor 100 is described with reference to FIG. 26, 27A, 27B. The motion sensor 100 includes the cameras 102, 104, whose location is determinative factor in the calculation of the positions and orientations of the hands 114, as described below.

Figure 26:
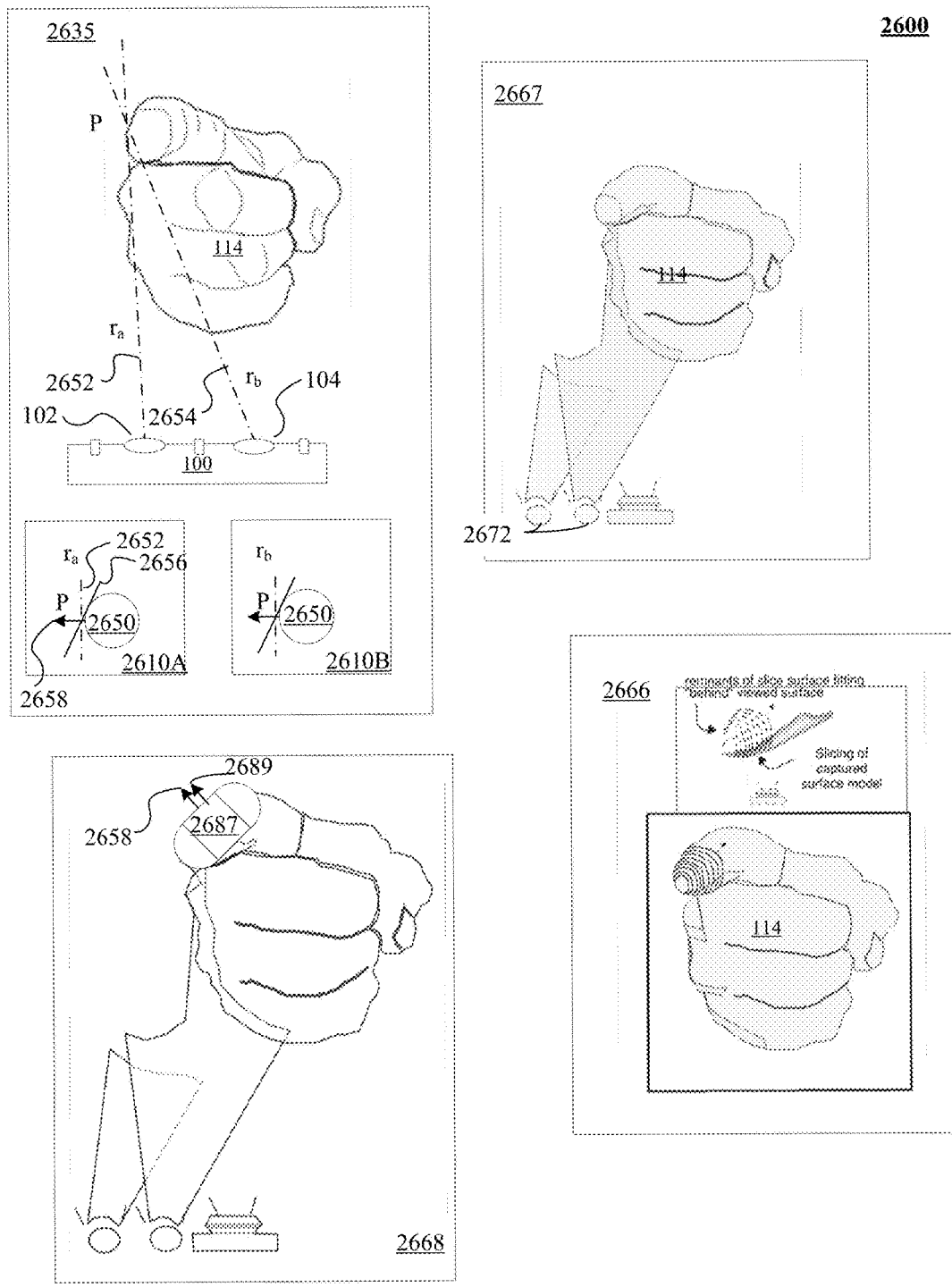
FIG. 26 illustrates one implementation of finding points in an image of an object being modeled.

FIG. 26 illustrates an implementation of finding points in an image of an object being modeled. Now with reference to block 2635 of FIG. 26, cameras 102, 104 are operated to collect a sequence of images (e.g., 2610A, 2610B) of the object 114. The images are time correlated such that an image from camera 2602 can be paired with an image from camera 104 that was captured at the same time (or within a few milliseconds). These images are then analyzed by an object detection module that detects the presence of one or more objects 2650 in the image, and an object analysis module analyzes detected objects to determine their positions and shape in 3D space. If the received images 2610A, 2610B include a fixed number of rows of pixels (e.g., 1080 rows), each row can be analyzed, or a subset of the rows can be used for faster processing. Where a subset of the rows is used, image data from adjacent rows can be averaged together, e.g., in groups of two or three.

Again with reference to block 2635 in FIG. 26, one or more rays 2652 can be drawn from the camera(s) proximate to an object 114 for some points P, depending upon the number of vantage points that are available. One or more rays 2652 can be determined for some point P on a surface of the object 2650 in image 2610A. A tangent 2656 to the object surface at the point P can be determined from point P and neighboring points. A normal vector 2658 to the object surface 2650 at the point P is determined from the ray and the tangent by cross product or other analogous technique. In block 2668, a model portion (e.g., capsule 2687) can be aligned to object surface 2650 at the point P based upon the vector 2658 and a normal vector 2689 of the model portion 2687. Optionally, as shown in block 2635, a second ray 2654 is determined to the point P from a second image 2610B captured by a second camera. In some instances, fewer or additional rays or constraints from neighboring capsule placements can create additional complexity or provide further information. Additional information from placing neighboring capsules can be used as constraints to assist in determining a solution for placing the capsule. For example, using one or more parameters from a capsule fit to a portion of the object adjacent to the capsule being placed, e.g., angles of orientation, the system can determine a placement, orientation and shape/size information for the capsule. Object portions with too little information to analyze can be discarded or combined with adjacent object portions.

Figure 27A:
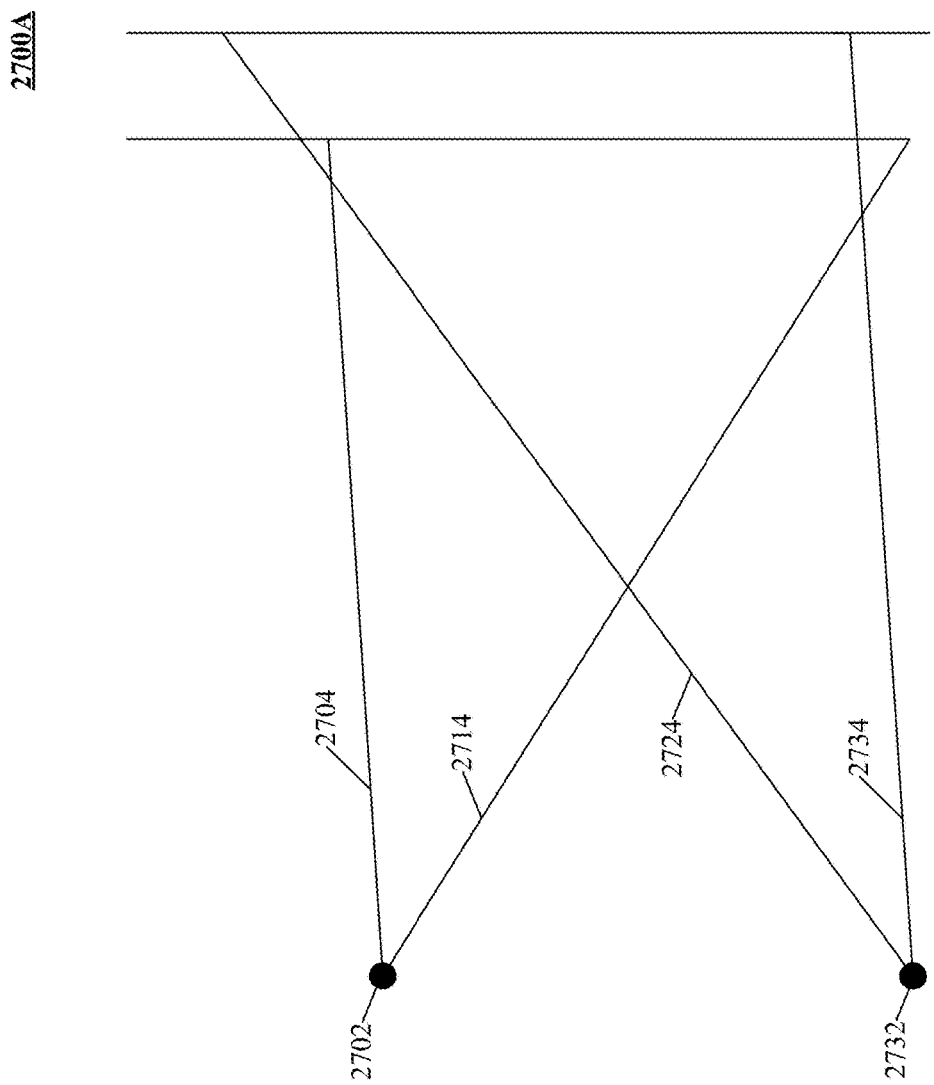
FIGS. 27A and 27B graphically illustrates one implementation of determining observation information.
Figure 27B:
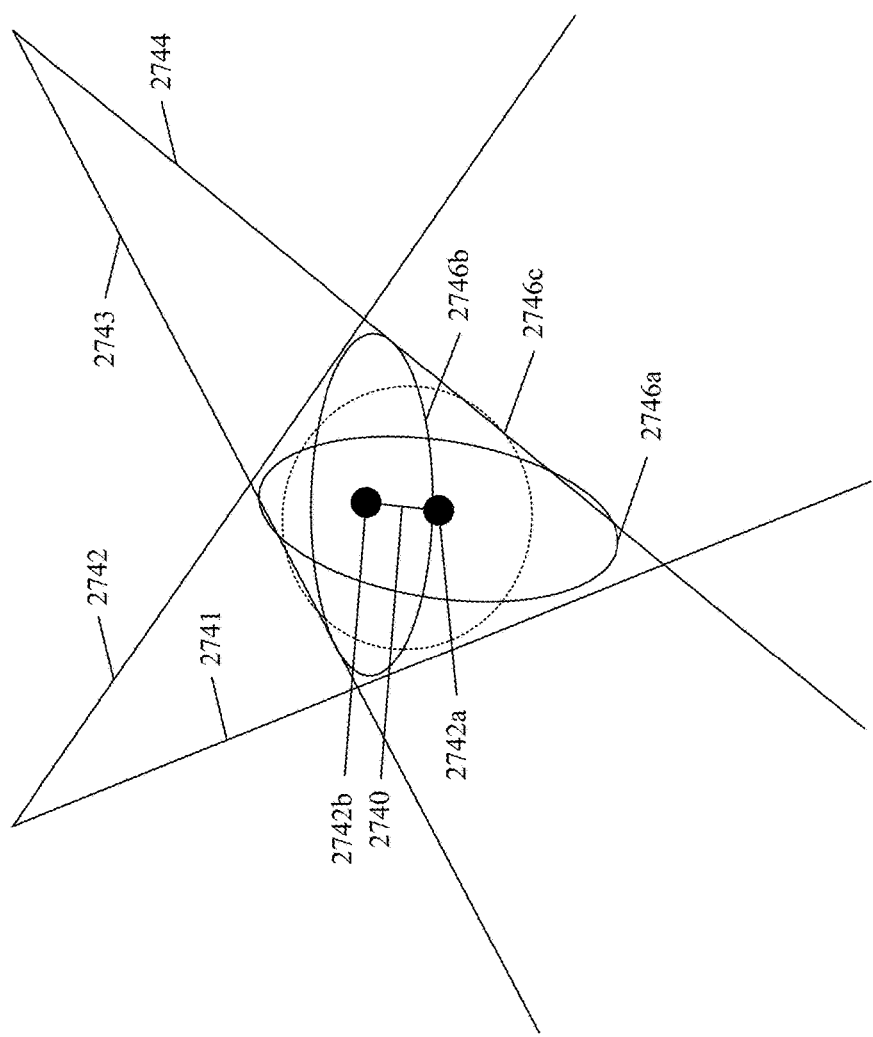

FIGS. 27A and 27B graphically illustrates one implementation of determining observation information 2700A and 2700B. In an implementation, comparing predictive information to observation information can be achieved by selecting one or more sets of points in space surrounding or bounding the control object within a field of view of one or more image capture device(s). As shown by FIG. 27A, points in space can be determined using one or more sets of lines 2704, 2714, 2724, 2734 originating at point(s) of view 2732, 2702 associated with the image capture device(s) (e.g., FIG. 1: 102, 104) and determining therefrom one or more intersection point(s) defining a bounding region (i.e., region shown in FIG. 27B formed by lines FIG. 27B: 2741, 2742, 2743, and 2744) surrounding a cross-section of the control object. The bounding region can be used to define a virtual surface (see e.g., FIG. 27B: 2746*a*, 2746*b*, 2746*c*) to which model subcomponents can be compared. In an implementation, the virtual surface can include straight portions, curved surface portions, and/or combinations thereof.

The technology disclosed solves this technical problem by applying a correction that prevents the HMD 101 from displaying such erroneous virtual representations and instead generate virtual representations that accurately corresponding to the actual positions and orientations of the hands 114 in the real world physical space.

Figure 14:
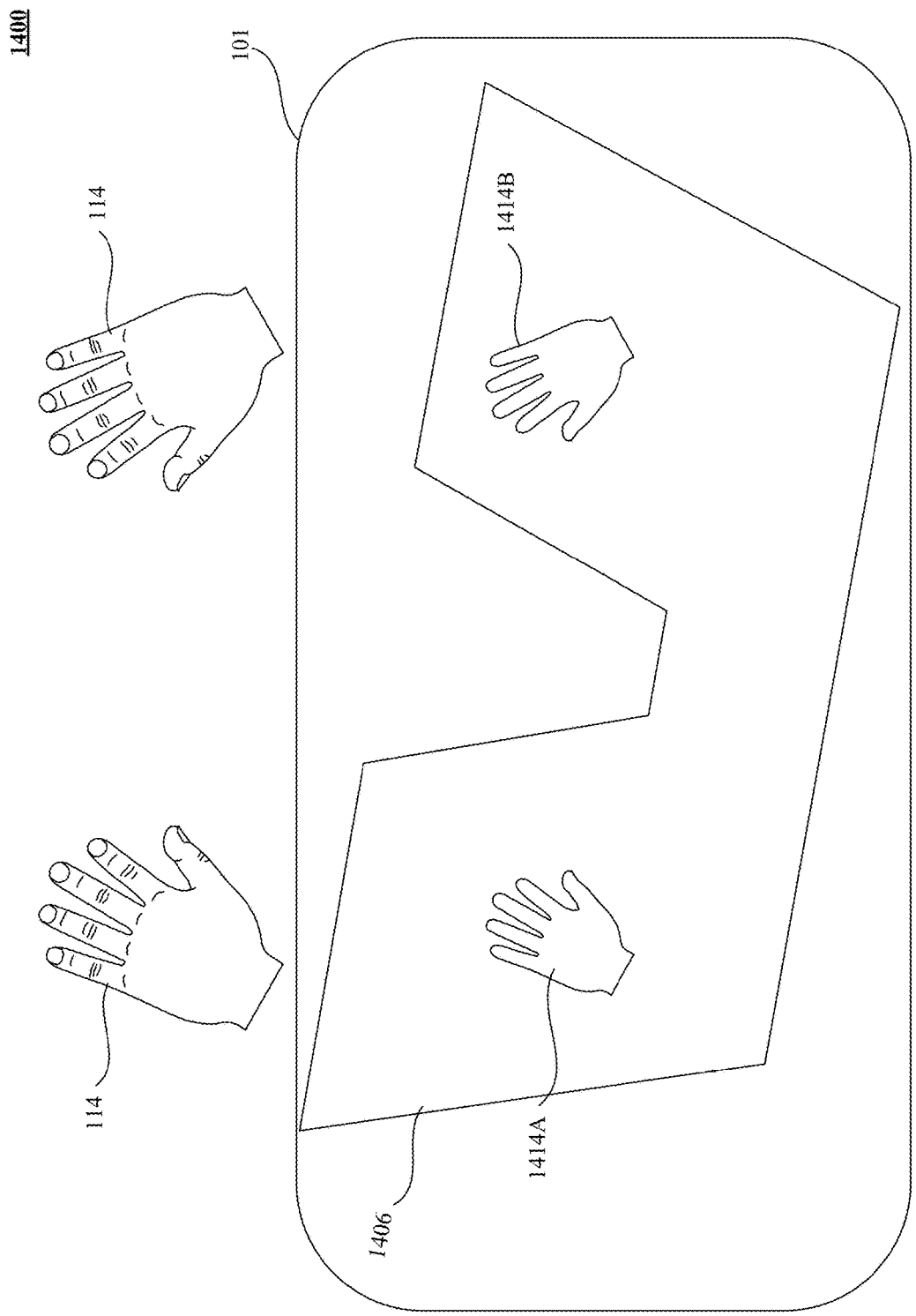
FIG. 14 illustrates one implementation of generating a drift-adapted virtual reality/augmented reality environment responsive to motions of a motion sensor integrated with a head mounted device (HMD).

FIG. 14 illustrates one implementation 1400 of generating a drift-adapted virtual reality/augmented reality environment 1406 of the HMD 101 responsive to motions of a motion sensor 100 integrated with the HMD 101. In particular, FIG. 14 shows that virtual representations 1414A and 1414B correspond to the actual positions and orientations of the hands 114 in the real world physical space even when the HMD 101 has generated an updated virtual environment 1306 responsive to the movement of the motion sensor 100.

A gesture-recognition system recognizes gestures for purposes of providing input to the electronic device, but can also capture the position and shape of the user's hand in consecutive video images in order to characterize a hand gesture in 3D space and reproduce it on the display screen. A 3D model of the user's hand is determined from a solid hand model covering one or more capsule elements built from the images using techniques described below with reference to FIGS. 15A-15C.

Figure 15A:
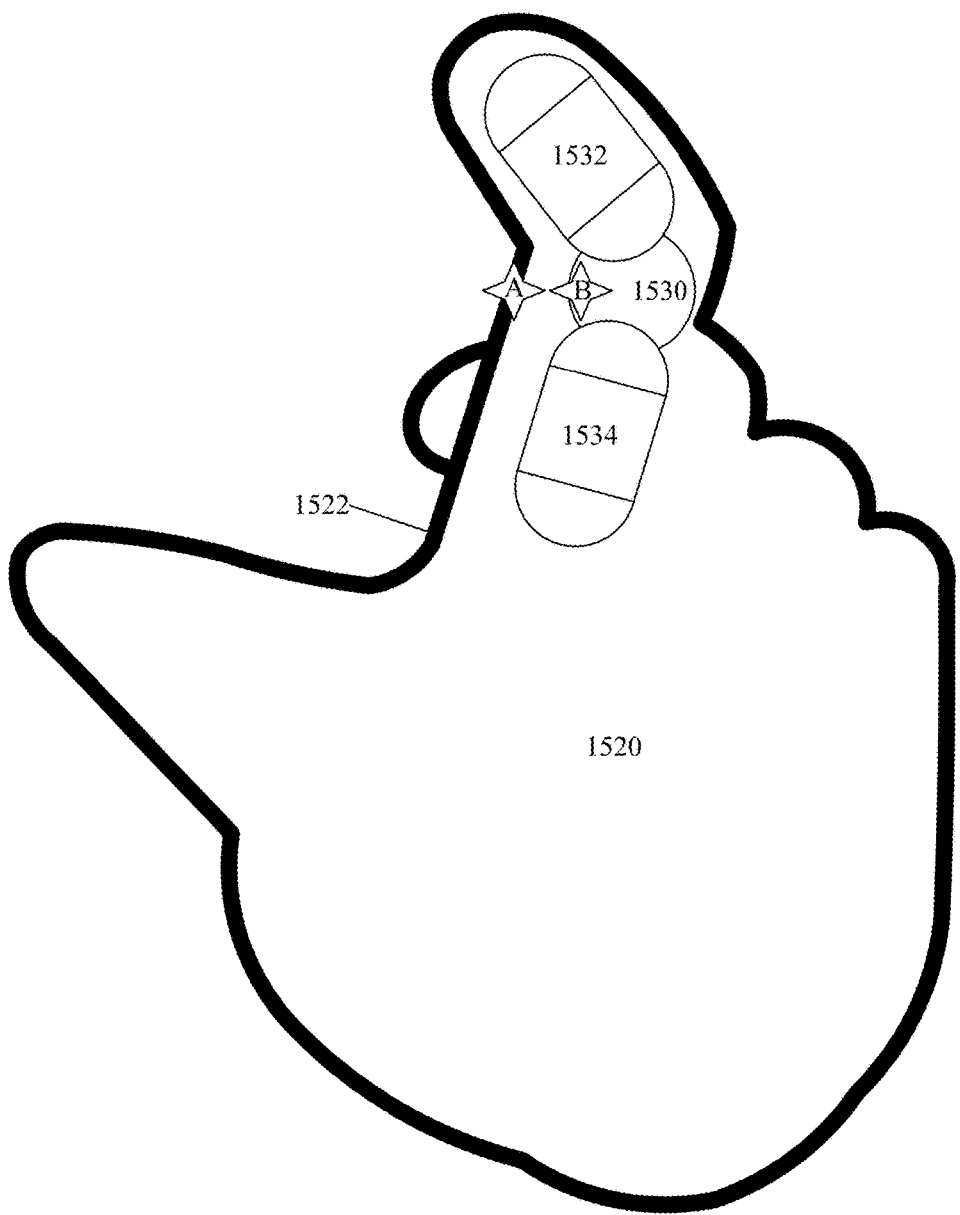
FIGS. 15A, 15B and 15C illustrate different views of a 3D capsule hand according to one implementation of the technology disclosed.

FIG. 15A shows one implementation of a 3D solid hand model 1500A with capsule representation 1520 of predictive information of the hand. Some examples of predictive information of the hand include finger segment length, distance between finger tips, joint angles between fingers, and finger segment orientation. As illustrated by FIG. 15A, the prediction information can be constructed from one or more model subcomponents referred to as capsules 1530, 1532, and 1534, which are selected and/or configured to represent at least a portion of a surface of the hand and virtual surface portion 1522. In some implementations, the model subcomponents can be selected from a set of radial solids, which can reflect at least a portion of the hand in terms of one or more of structure, motion characteristics, conformational characteristics, other types of characteristics of hand, and/or combinations thereof. In one implementation, radial solids are objects made up of a 1D or 2D primitive (e.g., line, curve, plane) and a surface having a constant radial distance to the 1D or 2D primitive. A closest point to the radial solid can be computed relatively quickly. As used herein, three or greater capsules are referred to as a "capsoodle."

In an implementation, observation information including observation of the control object can be compared against the model at one or more of periodically, randomly or substantially continuously (i.e., in real time). A "control object" as used herein with reference to an implementation is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object can be used as well.

Observational information can include without limitation observed values of attributes of the control object corresponding to the attributes of one or more model subcomponents in the predictive information for the control object. In an implementation, comparison of the model with the observation information provides an error indication. In an implementation, an error indication can be computed by determining a closest distance determined between a first point A belonging to a set of points defining the virtual surface 1522 and a second point B belonging to a model subcomponent 1530 determined to be corresponding to the first point (e.g., nearest to the first point for example). In an implementation, the error indication can be applied to the predictive information to correct the model to more closely conform to the observation information. In an implementation, error indication can be applied to the predictive information repeatedly until the error indication falls below a threshold, a measure of conformance with the observation information rises above a threshold, or a fixed or variable number of times, or a fixed or variable number of times per time period, or combinations thereof.

Figure 15B:
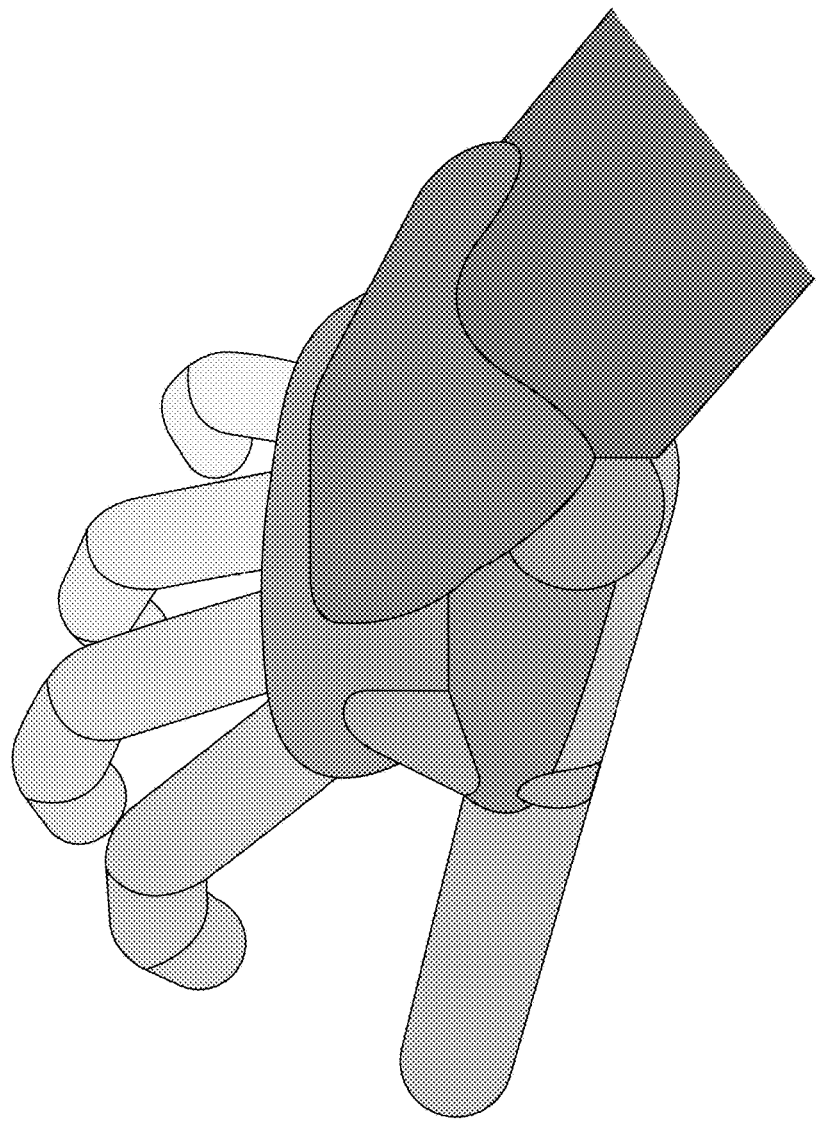
Figure 15C:
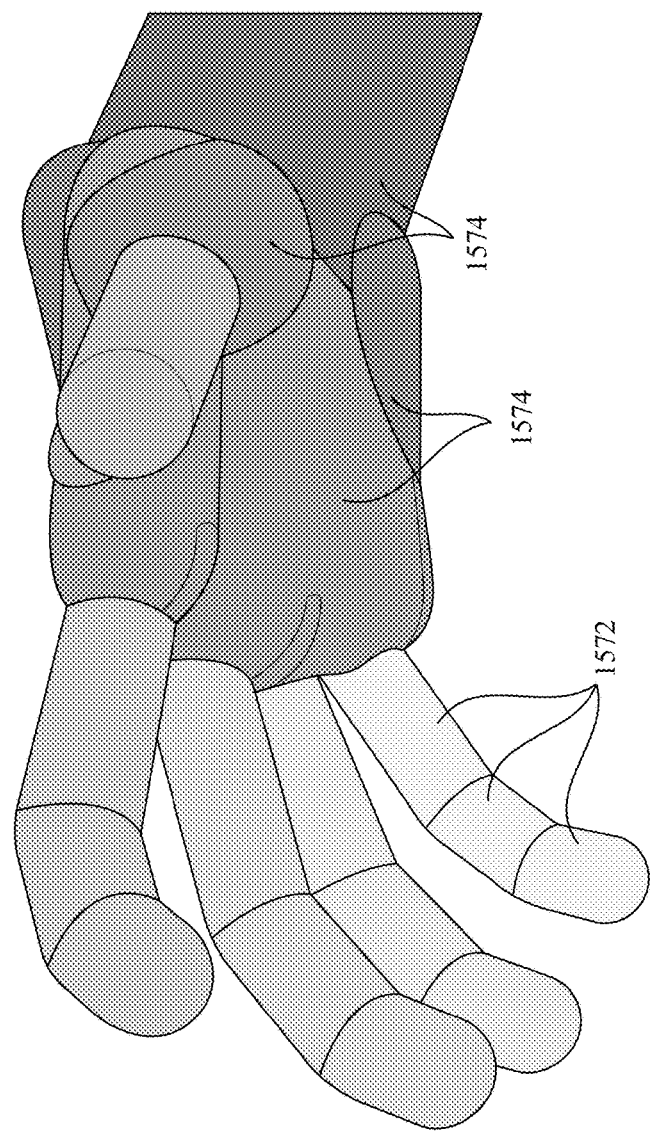

In one implementation and with reference to FIGS. 15B and 15C, a collection of radial solids and/or capsuloids can be considered a "capsule hand." In particular, FIGS. 15B and 15C illustrate different views 1500B and 1500C of a 3D capsule hand. A number of capsuloids 1572, e.g. five (5), are used to represent fingers on a hand while a number of radial solids 1574 are used to represent the shapes of the palm and wrist.

FIGS. 17-20 illustrate an exemplary machine sensory and control system (MSCS) in implementations.

In one implementation, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

Figure 17:
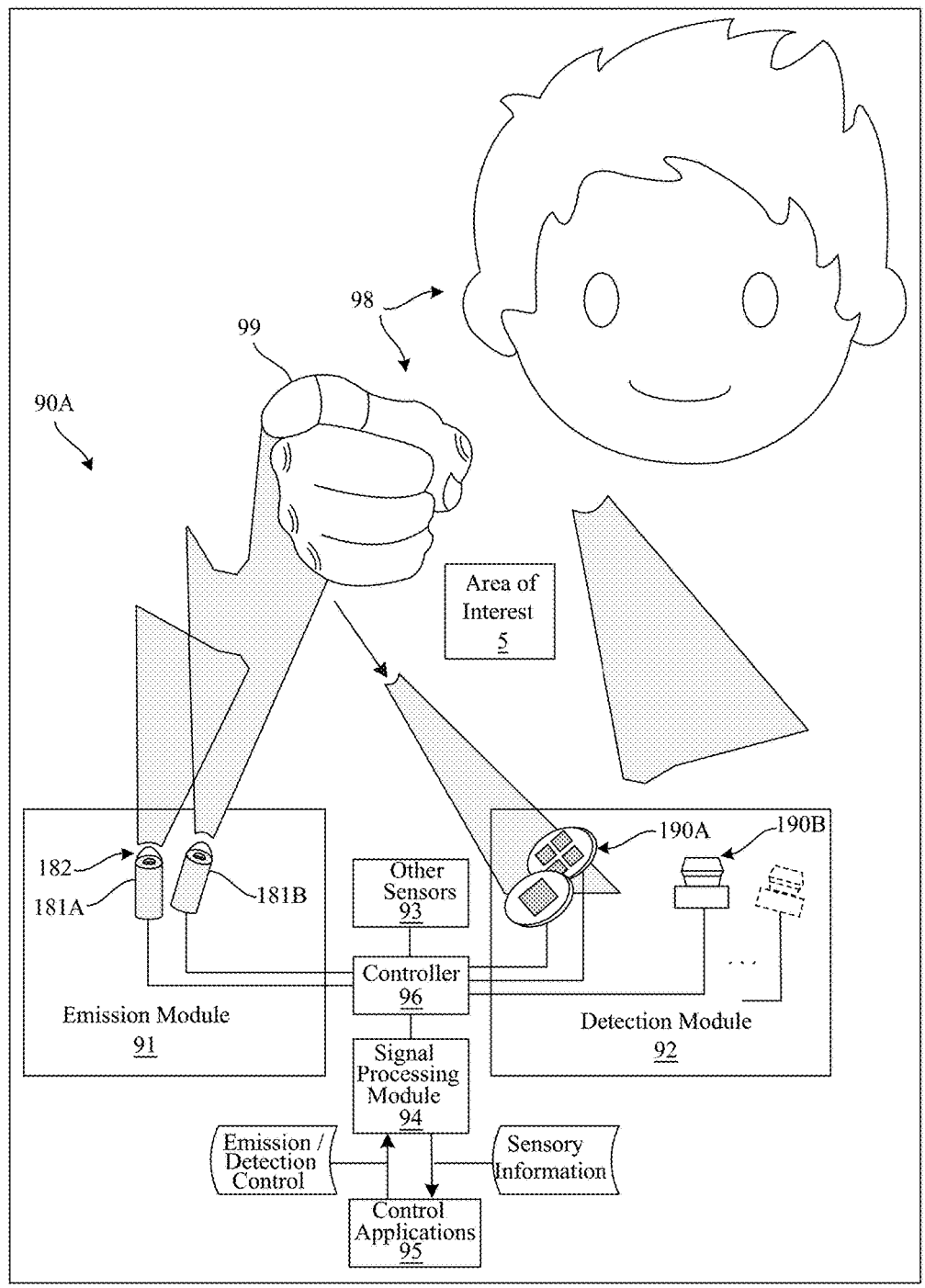
FIG. 17 illustrates an exemplary machine sensory and control system in one embodiment.
Figure 18:
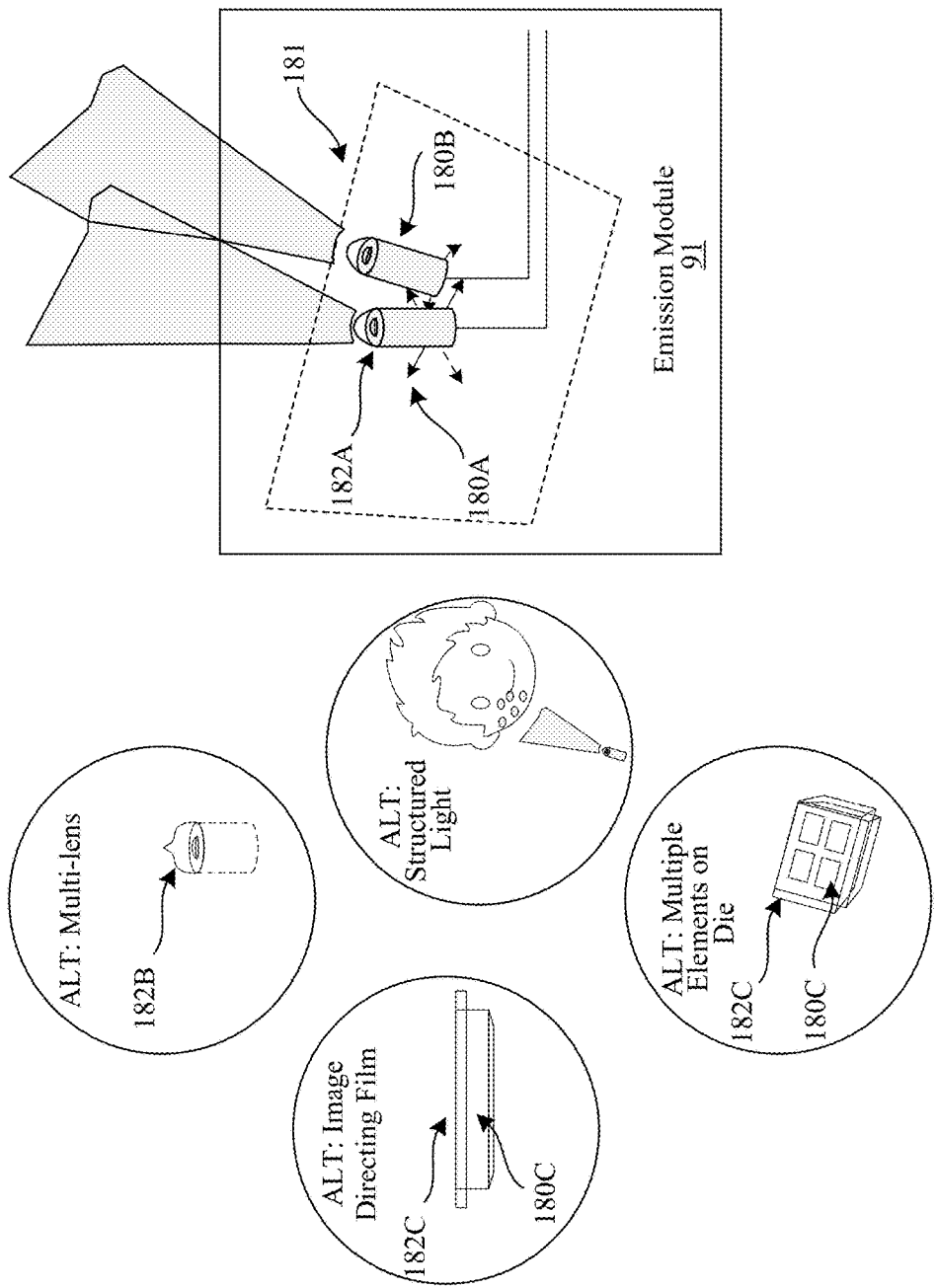
FIG. 18 depicts one embodiment of coupling emitters with other materials or devices.
Figure 19:
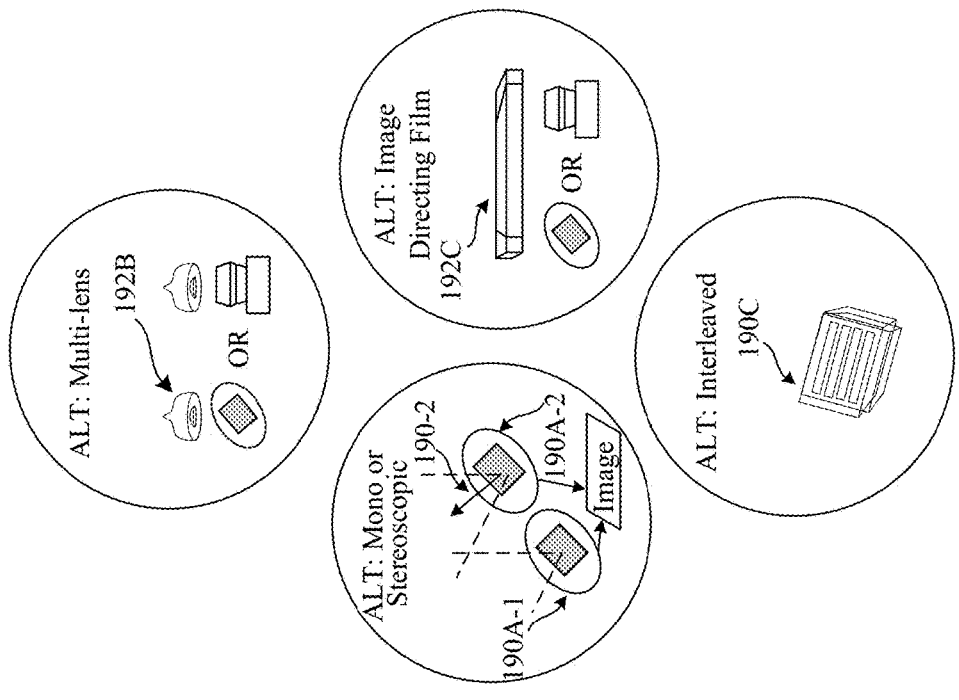
FIG. 19 shows one embodiment of interleaving arrays of image capture device(s).
Figure 19:
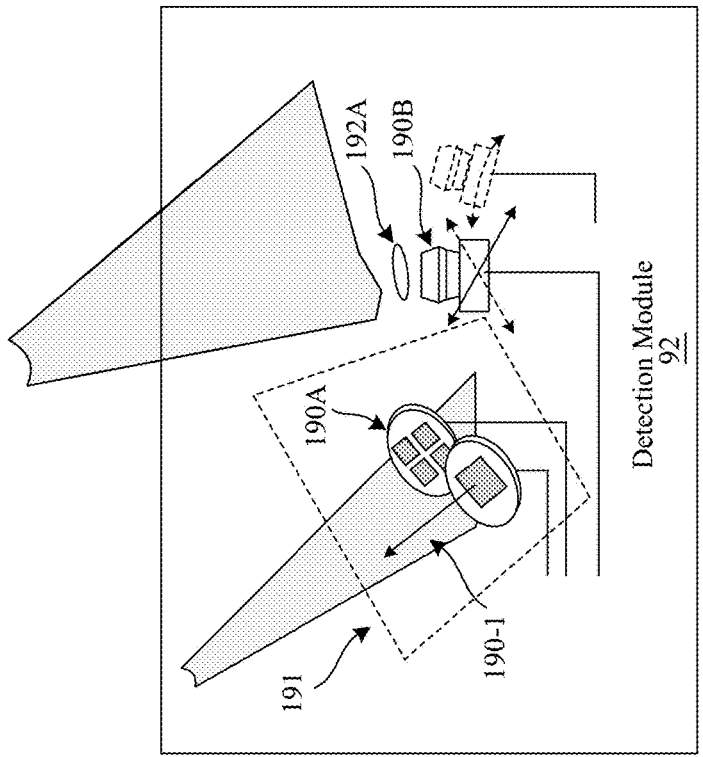

As FIG. 17 shows, one detection system 90A implementation includes an emission module 91, a detection module 92, a controller 96, a processing module 94 and a machine control module 95. In one implementation, the emission module 91 includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 18), image directing film (IDF) 182C (of FIG. 18), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 18) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some implementations, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further implementations, detection system 90A may omit emission module 91 altogether (e.g., in favor of ambient lighting).

In one implementation, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 19) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 19) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 19) (e.g., lenses 192A (of FIG. 19), multi-lenses 192B (of FIG. 19), image directing film (IDF) 192C (of FIG. 19), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof or alternatively operable in conjunction with radio and/or other electromagnetic signal emitting devices in various applications. In an implementation, capture devices 190A, 190B can capture one or more images for sensing objects 98 and capturing information about the object (e.g., position, motion, etc.). In implementations comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 19), including those known in the art to obtain information from a plurality of images captured substantially contemporaneously.

While illustrated with reference to a particular implementation in which control of emission module 91 and detection module 92 are co-located within a common controller 96, it should be understood that these functions will be separate in some implementations, and/or incorporated into one or a plurality of elements comprising emission module 91 and/or detection module 92 in some implementations. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor-perceptible phenomena indicate a possible presence of one or more objects of interest 98, including control objects 99, the presence and/or variations thereof can be used to control machines and/or other applications 95.

In various implementations, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one implementation, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

Figure 20:
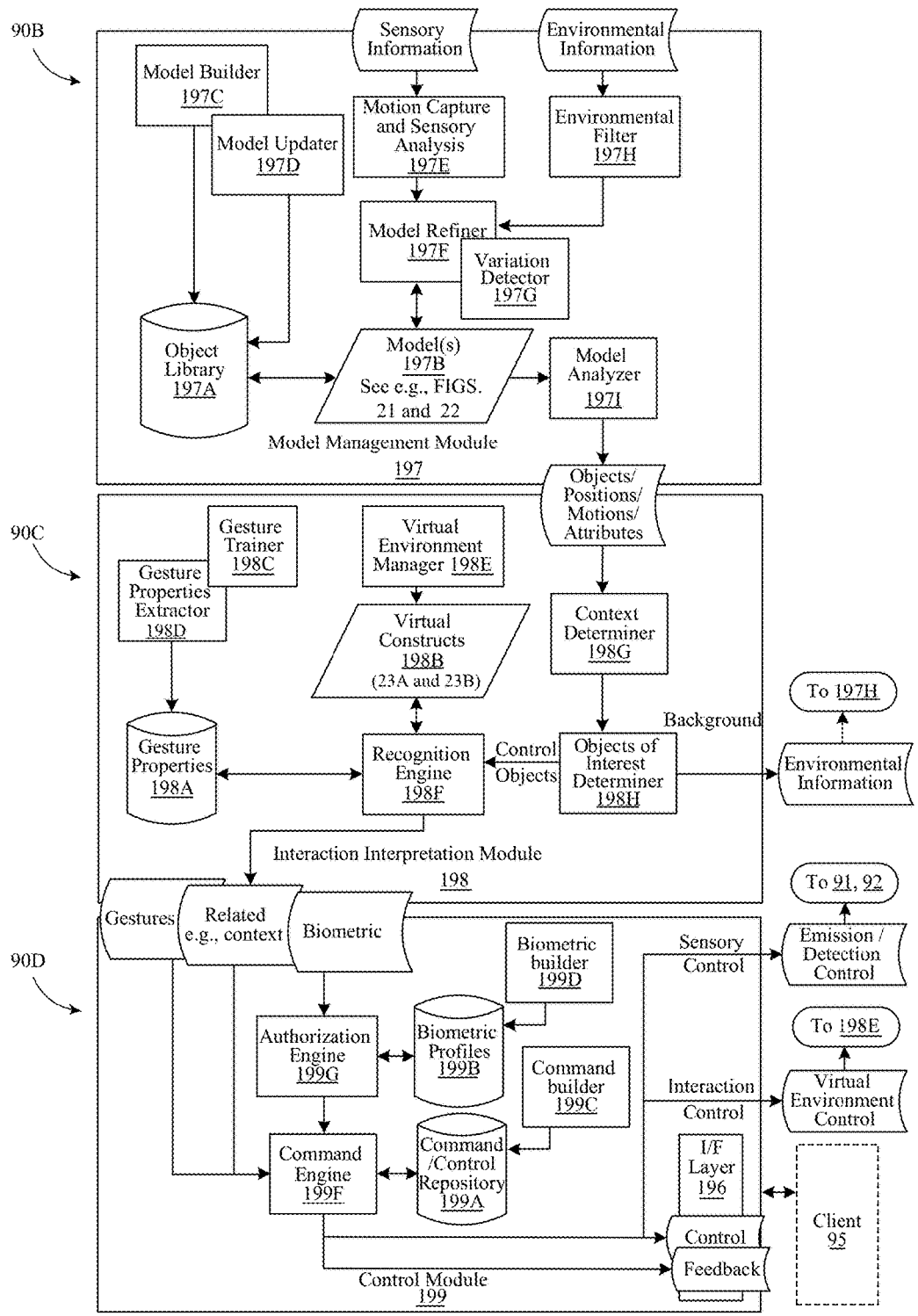
FIG. 20 shows another embodiment of an exemplary machine sensory and control system.

For example and with reference to FIG. 20, a variation determination system 90B implementation comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 implementation comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 21, 22)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1-197B-2 of FIGS. 21-22), useful to define and update models 197B, and model attributes 197-5. While illustrated with reference to a particular implementation in which models, model components and attributes are co-located within a common object library 197A, it should be understood that these objects will be maintained separately in some implementations.

In an implementation, when the control object morphs, conforms, and/or translates, motion information reflecting such motion(s) is included into the observed information. Points in space can be recomputed based on the new observation information. The model subcomponents can be scaled, sized, selected, rotated, translated, moved, or otherwise re-ordered to enable portions of the model corresponding to the virtual surface(s) to conform within the set of points in space.

In an implementation, motion(s) of the control object can be rigid transformation, in which case, points on the virtual surface(s) remain at the same distance(s) from one another through the motion. Motion(s) can be non-rigid transformations, in which points on the virtual surface(s) can vary in distance(s) from one another during the motion. In an implementation, observation information can be used to adjust (and/or recomputed) predictive information thereby enabling "tracking" the control object. In implementations, control object can be tracked by determining whether a rigid transformation or a non-rigid transformation occurs. In an implementation, when a rigid transformation occurs, a transformation matrix is applied to each point of the model uniformly. Otherwise, when a non-rigid transformation occurs, an error indication can be determined, and an error minimization technique such as described herein above can be applied. In an implementation, rigid transformations and/or non-rigid transformations can be composed. One example composition implementation includes applying a rigid transformation to predictive information. Then an error indication can be determined, and an error minimization technique such as described herein above can be applied. In an implementation, determining a transformation can include calculating a rotation matrix that provides a reduced RMSD (root mean squared deviation) between two paired sets of points. One implementation can include using Kabsch Algorithm to produce a rotation matrix. In an implementation and by way of example, one or more force lines can be determined from one or more portions of a virtual surface.

Figure 21:
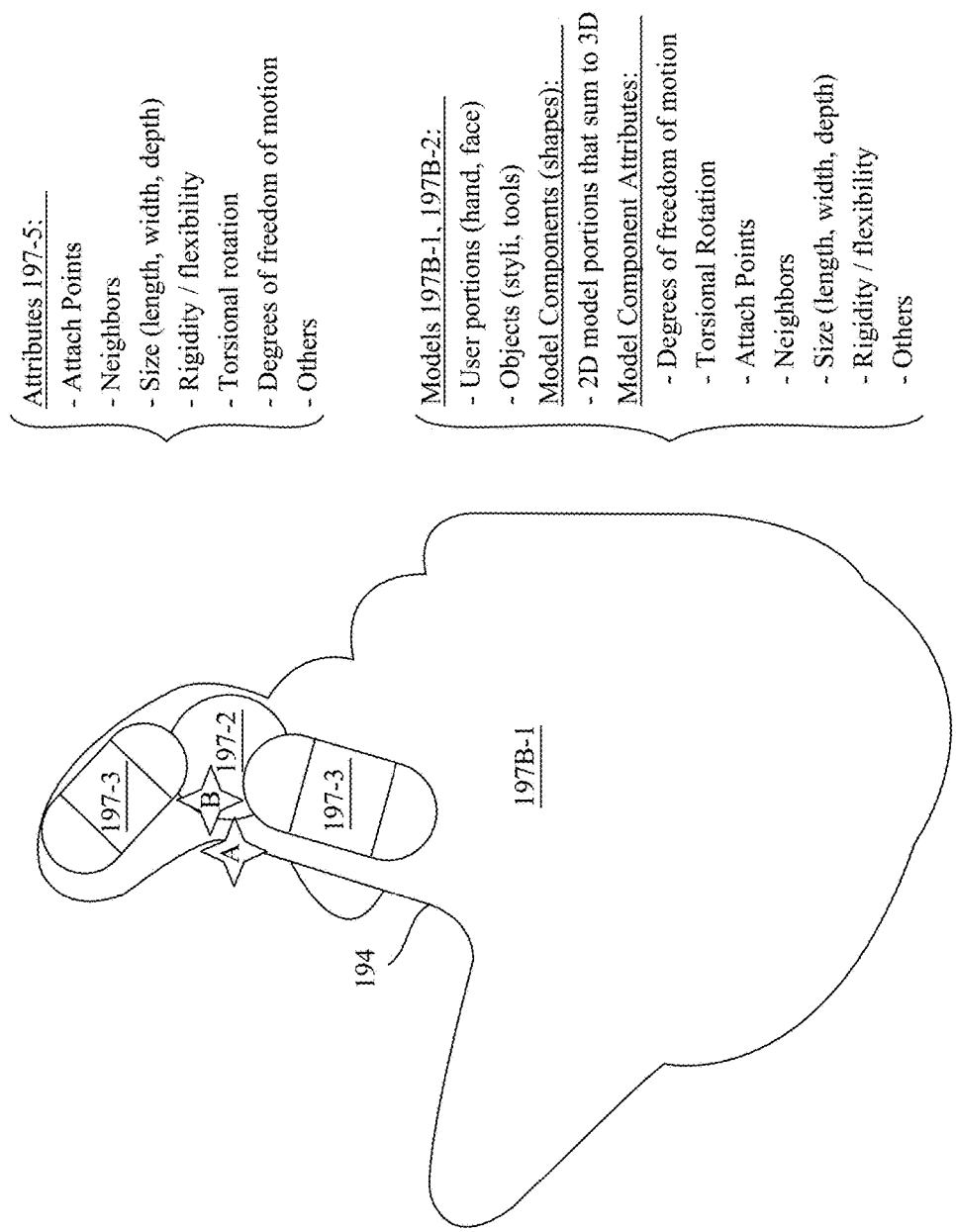
FIGS. 21 and 22 illustrate prediction information including models of different control objects.

FIG. 21 illustrates prediction information including a model 197B-1 of a control object (e.g., FIG. 17: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 21 for clarity sake. In an implementation, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one implementation, radial solids include a contour and a surface defined by a set of points having a fixed distance from the closest corresponding point on the contour. Another radial solid implementation includes a set of points normal to points on a contour and a fixed distance therefrom. In an implementation, computational technique(s) for defining the radial solid include finding a closest point on the contour and the arbitrary point, then projecting outward the length of the radius of the solid. In an implementation, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

One or more attributes 197-5 can define characteristics of a model subcomponent 197-3. Attributes can include e.g., attach points, neighbors, sizes (e.g., length, width, depth), rigidity, flexibility, torsion, zero or more degrees of freedom of motion with respect to one or more defined points, which can include endpoints for example, and other attributes defining a salient characteristic or property of a portion of control object 99 being modeled by predictive information 197B-1. In an implementation, predictive information about the control object can include a model of the control object together with attributes defining the model and values of those attributes.

In an implementation, observation information including observation of the control object can be compared against the model at one or more of periodically, randomly or substantially continuously (i.e., in real time). Observational information can include without limitation observed values of attributes of the control object corresponding to the attributes of one or more model subcomponents in the predictive information for the control object. In an implementation, comparison of the model with the observation information provides an error indication. In an implementation, an error indication can be computed by determining a closest distance determined between a first point A belonging to a set of points defining the virtual surface 194 and a second point B belonging to a model subcomponent 197-2 determined to be corresponding to the first point (e.g., nearest to the first point for example). In an implementation, the error indication can be applied to the predictive information to correct the model to more closely conform to the observation information. In an implementation, error indication can be applied to the predictive information repeatedly until the error indication falls below a threshold, a measure of conformance with the observation information rises above a threshold, or a fixed or variable number of times, or a fixed or variable number of times per time period, or combinations thereof.

Figure 22:
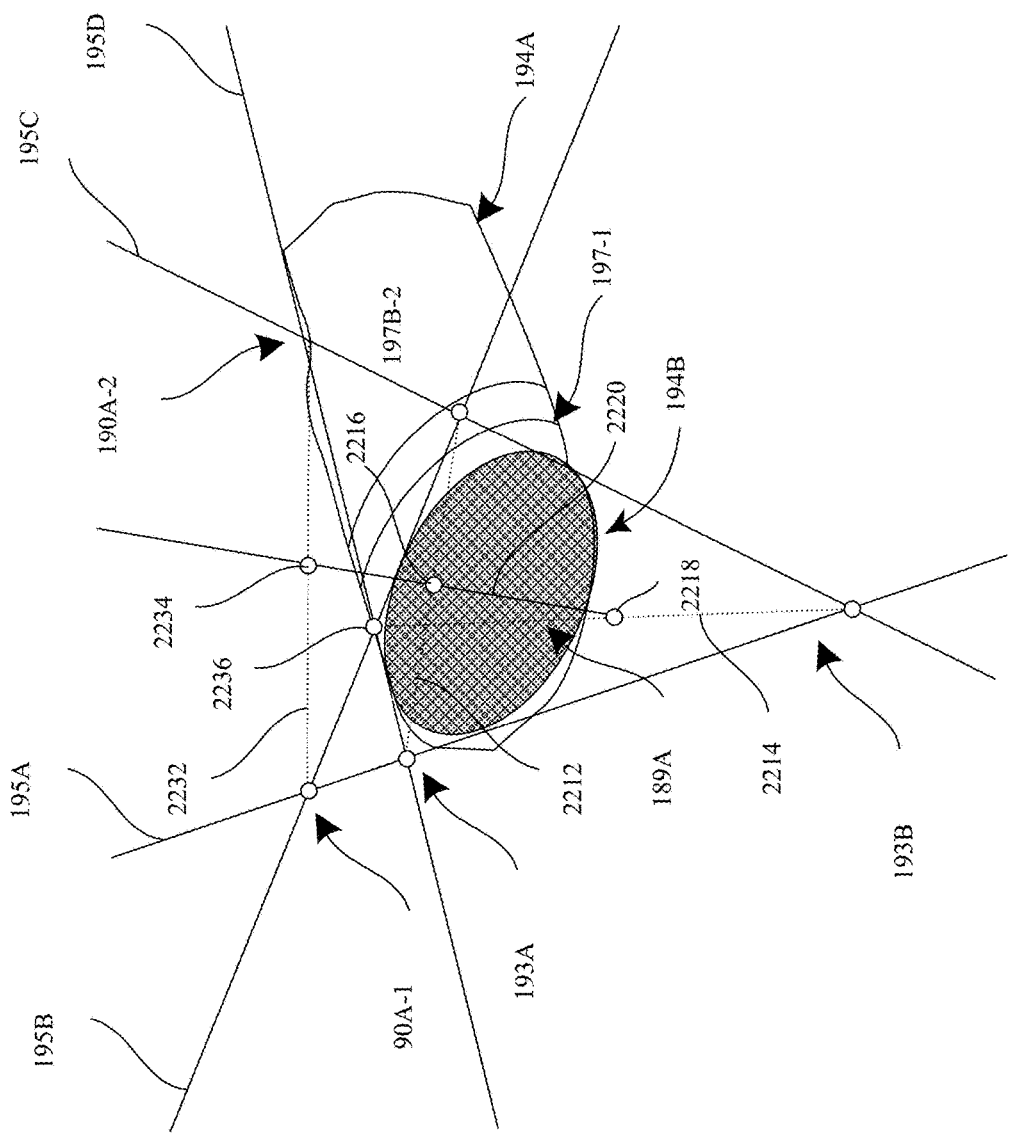

In an implementation and with reference to FIGS. 17, 22, updating predictive information to observed information comprises selecting one or more sets of points (e.g., FIG. 22:193A, 193B) in space surrounding or bounding the control object within a field of view of one or more image capture device(s). As shown by FIG. 22, points 193 can be determined using one or more sets of lines 195A, 195B, 195C, and 195D originating at vantage point(s) (e.g., FIG. 19: 190-1, 190-2) associated with the image capture device(s) (e.g., FIG. 19: 190A-1, 190A-2) and determining therefrom one or more intersection point(s) defining a bounding region (i.e., region formed by lines FIG. 22: 195A, 195B, 195C, and 195D) surrounding a cross-section of the control object. The bounding region can be used to define a virtual surface (FIG. 22: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example and according to one implementation illustrated by FIG. 22, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and $\theta$ the rotation angle. The coefficients $C_1$, $C_2$ and $C_3$ are defined in terms of these parameters, as shown:

$$C_1 x^2 + C_2 xy + C_3 y^2 - (2C_1 x_c + C_2 y_c)x - \quad (5)$$
$$(2C_3 y_c + C_2 x_c)y + (C_1 x_c^2 + C_2 x_c y_c + C_3 y_c^2 - 1) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (5) is solved for $\theta$, subject to the constraints that: (5) $(x_C, y_C)$ must lie on the centerline determined from the four tangents 195A, 195B, 195C, and 195D (i.e., centerline 2220 of FIG. 22) which joins midpoints 2216, 2218 of diagonal line segments 2212, 2214 that connect opposite corners of the bounding region determined from the tangent lines 195A, 195B, 195C, and 195D; and (6) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (6) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$

$$A_2 x + B_2 y + D_2 = 0$$

$$A_3 x + B_3 y + D_3 = 0$$

$$A_4 x + B_4 y + D_4 = 0 \quad (6)$$

Four column vectors $r_{12}$, $r_{23}$, $r_{14}$ and $r_{24}$ are obtained from the coefficients $A_i$, $B_i$ and $D_i$ of equations (6) according to equations (7), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \quad (7)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (8) from the vectors of tangent coefficients A, B and D and scalar quantities p and q, which are defined using the column vectors $r_{12}$, $r_{23}$, $r_{14}$ and $r_{24}$ from equations (7).

$$c1 = (r_{13} + r_{24})/2$$

$$c2 = (r_{14} + r_{23})/2$$

$$\delta 1 = c2_1 - c1_1$$

$$\delta 2 = c2_2 - c1_2$$

$$p = \delta 1 / \delta 2$$

$$q = c1_1 - c1_2 * p$$

$$G = Ap + B$$

$$H = Aq + D \quad (8)$$

Six scalar quantities $v_{A2}$, $v_{AB}$, $v_{B2}$, $w_{A2}$, $w_{AB}$, and $w_{B2}$ are defined by equation (9) in terms of the components of vectors G and H of equation (8).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix} \quad (9)$$

-continued $$w = \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1A_1)^2 + (v_2A_2)^2 + (v_3A_3)^2$$

$$v_{AB} = (v_1A_1B_1)^2 + (v_2A_2B_2)^2 + (v_3A_3B_3)^2$$

$$v_{B2} = (v_1B_1)^2 + (v_2B_2)^2 + (v_3B_3)^2$$

$$w_{A2} = (w_1A_1)^2 + (w_2A_2)^2 + (w_3A_3)^2$$

$$w_{AB} = (w_1A_1B_1)^2 + (w_2A_2B_2)^2 + (w_3A_3B_3)^2$$

$$w_{B2} = (w_1B_1)^2 + (w_2B_2)^2 + (w_3B_3)^2$$

Using the parameters defined in equations (5)-(9), solving for θ is accomplished by solving the eighth-degree polynomial equation (6) for t, where the coefficients $Q_i$ (for i=0 to 8) are defined as shown in equations (11)-(119).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \quad (10)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (11)-(15) are defined as shown in equations (5)-(8). The parameter n is the assumed semi-major axis (in other words, $a_0$). Once the real roots t are known, the possible values of θ are defined as θ=atan(t).

$$Q_8 = 4A_1^2 n^2 v_{B2}^2 + 4v_{B2} B_1^2 (1 - n^2 v_{A2}) - (G_1(1 - n_2 v_{A2}) w_{B2} + n^2 v_{B2} w_{A2} + 2H_1 v_{B2})^2 \quad (11)$$

$$Q_7 = -(2(2n^2 v_{AB} w_{A2} + 4H_1 v_{AB} + 2G_1 n^2 v_{AB} w_{B2} + 2G_1(1 - n_2 v_{A2}) w_{AB}))(G_1(1 - n^2 v_{A2}) w_{B2} + n_2 v_{B2} w_{A2} + 2H_1 v_{B2}) - 8A_1 B_1 n^2 v_{B2}^2 + 16A_1^2 n^2 v_{AB} v_{B2} + (4(2A_1 B_1 (1 - n^2 v_{A2}) + 2B_1^2 n^2 v_{AB})) v_{B2} + 8B_1^2 (1 - n^2 v_{A2}) v_{AB} \quad (12)$$

$$Q_6 = -(2(2H_1 v_{B2} + 2H_1 v_{A2} + n^2 v_{A2} w_{A2} + n^2 v_{B2} (-2w_{AB} + w_{B2}) + G_1 (n_2 v_{B2} + 1) w_{B2} + 4G_1 n^2 v_{AB} w_{AB} + G_1 (1 - n^2 v_{A2}) v_{A2})) \times (G_1 (1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1 (1 - n^2 v_{A2}) w_{AB})^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) + 4A_1^2 n^2 v_{B2}^2 + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{B2} + (8(2A_1 B_1 (1 - n^2 v_{A2}) + 2B_1^2 n^2 v_{AB} + 4B_1^2 (1 - n^2 v_{A2}) v_{A2} \quad (13)$$

$$Q_5 = -(2(4H_1 v_{AB} + 2G_1 (-n^2 v_{B2} + 1) w_{AB} + 2G_1 n^2 v_{AB} v_{A2} + 2n^2 v_A (-2w_{AB} + w_{B2}))) (G_1 (1 - n^2 v_{A2}) w_{B2} + n^2 v_{B2} w_{A2} + 2H_1 v_{B2}) - (2(2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2})) \times (2n^2 v_{AB} w_{A2} + 4H_1 v_{AB} + 2G_1 n^2 v_{AB} w_{B2} + 2G_1 (1 - n^2 v_{A2}) w_{AB}) + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} - 8A_1 B_1 n^2 v_{B2}^2 + 16A_1^2 n^2 v_{AB} v_{B2} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{B2} + (8(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{AB} + (4(2A_1 B_1 (1 - n^2 v_{A2}) + 2B_1^2 n^2 v_{AB})) v_{A2} \quad (14)$$

$$Q_4 = (4(A_1^2 (-n^2 v_{B2}) + A_1^2 (1 - n^2 v_{A2}) + 4A_1 B_1 n^2 v_{AB} + B_1^2 (-n^2 v_{B2} + 1))) v_{B2} + (8(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{AB} + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{A2} + 4B_1^2 n^2 (2v_{A2} v_{B2} + 4v_{AB}^2) + 4B_1^2 n^2 v_{B2}^2 - 32A_1 B_1 n^2 v_{AB} v_{B2} + 4A_1^2 n^2 v_{A2}^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) - (2(G_1(-n^2 v_{B2} + 1) v_{A2} + n^2 v_{A2}(-2 w_{AB} + w_{B2}) + 2H_1 v_{A2}))(G_1 (1 - n^2 v_{A2}) w_{B2} + n^2 v_{B2} w_{A2} + 2H_1 v_{B2}) - (2(4H_1 v_{AB} + 2G_1(-n^2 v_{B2} + 1) w_{AB} + 2G_1 n^2 v_{AB} v_{A2} + 2n^2 v_{AB}(-2 w_{AB} + w_{B2}))) \times (2n^2 v_{AB} w_{A2} + 4H_1 v_{AB} + 2G_1 n^2 v_{AB} w_{B2} + 2G_1 (1 - n^2 v_{A2}) w_{AB}) - (2H_1 v_{B2} + 2H_1 v_{A2} + n^2 v_{A2} w_{A2} + n^2 v_{B2}(-2 w_{AB} + w_{B2}) + G_1(-n^2 v_{B2} + 1) w_{B2} + 4G_1 n^2 v_{AB} w_{AB} + G_1 (1 - n^2 v_{A2}) v_{A2})^2 \quad (15)$$

$$Q_3 = -(2(G_1(-n^2 v_{B2} + 1) v_{A2} + n^2 v_{A2}(-2 w_{AB} + w_{B2}) + 2H_1 v_{A2}))(2n^2 v_{AB} w_{A2} + 4H_1 v_{AB} + 2G_1 n^2 v_{AB} w_{B2} + $$

$$2G_1(1 - n^2 v_{A2}) w_{AB}) - (2(4H_1 v_{AB} + 2G_1(-n^2 v_{B2} + 1) w_{AB} + 2G_1 n^2 v_{AB} v_{A2} + 2n^2 v_{AB}(-2 w_{AB} + w_{B2}))) \times (2H_1 v_{B2} + 2H_1 v_{A2} + n^2 v_{A2} w_{A2} + n^2 v_{B2}(-2 w_{AB} + w_{B2}) + G_1(-n^2 v_{B2} + 1) w_{B2} + 4G_1 n^2 v_{AB} w_{AB} + G_1(1 - n^2 v_{A2}) v_{A2}) - (4H_1 v_{AB} + 2G_1(-n^2 v_{B2} + 1) w_{AB} + 2G_1 n^2 v_{AB} v_{A2} + 2n^2 v_{AB}(-2 w_{AB} + w_{B2}))^2 + (2H_1 v_{B2} + 2H_1 v_{A2} + n^2 v_{A2} w_{A2} + n^2 v_{B2}(-2 w_{AB} + w_{B2})) + G_1(-n^2 v_{B2} + 1) w_{B2} + 4G_1 n^2 v_{AB} w_{AB} + G_1(1 - n^2 v_{A2}) v_{A2}) - (4H_1 v_{AB} + 2G_1(-n^2 v_{B2} + 1) w_{AB} + 2G_1 n^2 v_{AB} v_{A2} + 2n^2 v_{AB}(-2 w_{AB} + w_{B2}))^2 v_{A2} + 16B_1^2 n^2 v_{A2} v_{AB} - 8A_1 B_1 n^2 v_{A2}^2 + 16A_1^2 n^2 v_{A2} v_{AB} + (4(2A_1^2 n^2 v_{AB} + 2A_1 B_1 (-n^2 v_{B2} + 1))) v_{A2} + (8(A_1^2 (-n^2 v_{B2} + 1) + A_1^2 (1 - n^2 v_{A2}) + 4A_1 B_1 n^2 v_{AB} + B_1^2 (-n^2 v_{B2} + 1))) v_{AB} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{A2} \quad (16)$$

$$Q_2 = 4A_1^2 (-n^2 v_{B2} + 1) v_{B2} + (8(2A_1^2 n^2 v_{AB} + 2A_1 B_1 (-n^2 v_{B2} + 1))) v_{AB} + (4(A_1^2 (-n^2 v_{B2} + 1) + A_1^2 (1 - n^2 v_{A2}) + 4A_1 B_1 n^2 v_{AB} + B_1^2 (-n^2 v_{B2} + 1))) v_{A2} + 4B_1^2 n^2 v_{A2} v_{B2} + 4B_1^2 n^2 (2v_{A2} v_{B2} + 4v_{AB}^2) - 32A_1 B_1 n^2 v_{A2} v_{AB} + 4A^2 n^2 v_{A2}^2 - (2(G_1 (-n^2 v_{B2} + 1) v_{A2} + n^2 v_{A2}(-2 w_{AB} + w_{B2}) + 2H_1 v_{A2})) \times (2H_1 v_{B2} + 2H_1 v_{A2} + n^2 v_{A2} w_{A2} + n^2 v_{B2}(-2 w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) - (4H_1 v_{AB} + 2G_1 (-n^2 v_{B2} + 1) w_{AB} + 2G_1 n^2 v_{AB} v_{A2} + 2n^2 v_{AB}(-2 w_{AB} + w_{B2}))^2 \quad (17)$$

$$Q_1 = 8A_1^2 (-n^2 v_{B2} + 1) v_{AB} + (4(2A_1^2 n^2 v_{AB} + 2A_1 B_1 (-n^2 v_{B2} + 1))) v_{A2} + 16B_1^2 n^2 v_{A2} v_{AB} - 8A_1 B_1 n^2 v_{A2}^2 - (2(G_1 (-n^2 v_{B2} + 1) v_{A2} + n^2 v_{A2}(-2 w_{AB} + w_{B2}) + 2H_1 v_{A2})) (4H_1 v_{AB} + 2G_1 (-n^2 v_{B2} + 1) w_{AB} + 2G_1 n^2 v_{AB} v_{A2} + 2n^2 v_{AB}(-2 w_{AB} + w_{B2})) \quad (18)$$

$$Q_0 = 4A_1^2 (-n^2 v_{B2} + 1) v_{A2} - (G_1(-n^2 v_{B2} + 1) v_{A2} + n^2 v_{A2}(-2 w_{AB} + w_{B2}) + 2H_1 v_{A2})^2 + 4B_1^2 n^2 v_{A2}^2 \quad (19)$$

In this exemplary implementation, equations (10)-(11) have at most three real roots; thus, for any four tangent lines, there are at most three possible ellipses that are tangent to all four lines and that satisfy the $a=a_0$ constraint. (In some instances, there may be fewer than three real roots.) For each real root θ, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters {θ, $a=a_0$, b, $(x_C, y_C)$}. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Figure 23A:
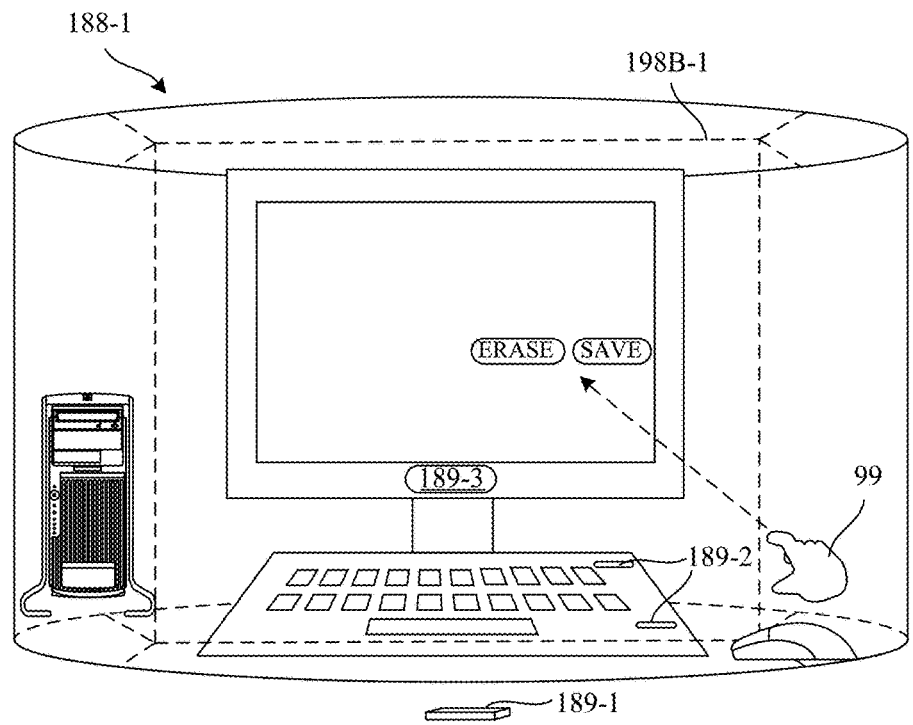
FIGS. 23A and 23B show interaction between a control object and an engagement target.
Figure 23B:
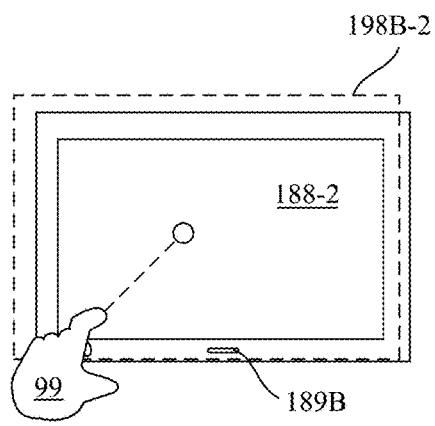

Again with reference to FIG. 20, an interaction system 90C includes an interaction interpretation module 198 that provides functionality to recognize command and other information from object, position, motion and attribute information obtained from variation system 90B. An interaction interpretation module 198 implementation comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 23A, 23B: 198B-1, 198B-2) to recognize variations in control object presence or motion indicating command information, related information, environmental information and other information discernable from the object, position, motion and attribute information that might be useful in controlling a machine. With reference to FIG. 23A, 23B, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B (see FIGS. 23A, 23B). In some implementations, virtual constructs (e.g., a virtual object defined in space; such that variations in real objects relative to the virtual construct, when detected, can be interpreted for control or other purposes (see FIGS. 23A, 23B)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

In an implementation, predictive information can include collision information concerning two or more capsoloids. By means of illustration, several possible fits of predicted information to observed information can be removed from consideration based upon a determination that these potential solutions would result in collisions of capsoloids. In an implementation, a relationship between neighboring capsoloids, each having one or more attributes (e.g., determined minima and/or maxima of intersection angles between capsoloids) can be determined. In an implementation, determining a relationship between a first capsoloid having a first set of attributes and a second capsoloid having a second set of attributes includes detecting and resolving conflicts between first attribute and second attributes. For example, a conflict can include a capsoloid having one type of angle value with a neighbor having a second type of angle value incompatible with the first type of angle value. Attempts to attach a capsoloid with a neighboring capsoloid having attributes such that the combination will exceed what is allowed in the observed—or to pair incompatible angles, lengths, shapes, or other such attributes—can be removed from the predicted information without further consideration.

In an implementation, predictive information can be artificially constrained to capsoloids positioned in a subset of the observed information thereby enabling creation of a "lean model". For example, as illustrated in FIG. 21, capsoloid 197-3 could be used to denote the portion of the observed without addition of capsoloids 197-2. In a yet further implementation, connections can be made using artificial constructs to link together capsoloids of a lean model. In another implementation, the predictive information can be constrained to a subset of topological information about the observed information representing the control object to form a lean model.

In an implementation, a lean model can be associated with a full predictive model. The lean model (or topological information, or properties described above) can be extracted from the predictive model to form a constraint. Then, the constraint can be imposed on the predictive information thereby enabling the predictive information to be constrained in one or more of behavior, shape, total (system) energy, structure, orientation, compression, shear, torsion, other properties, and/or combinations thereof.

Figure 16A:
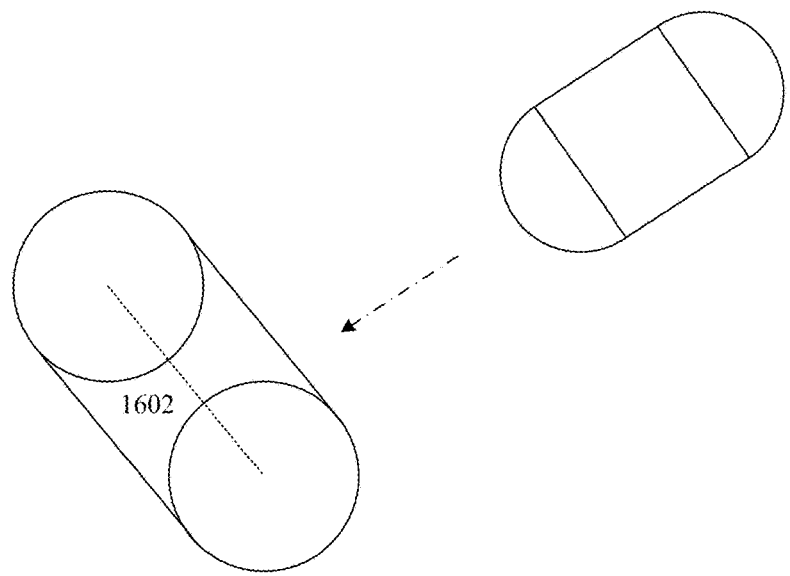
FIGS. 16A and 16B are simplified illustrations of fitting one or more 3D solid subcomponents to the observation information according to an implementation.
Figure 16B:
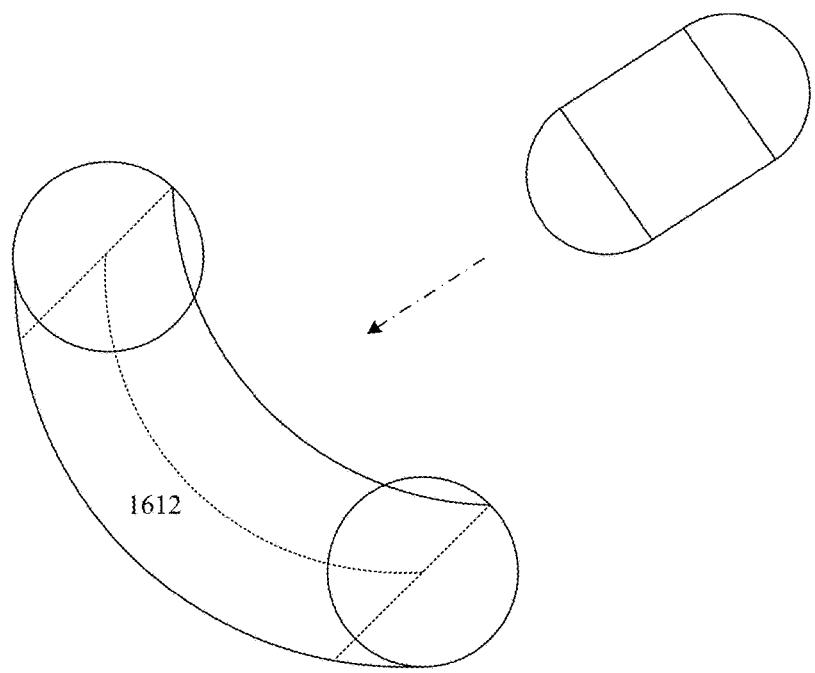

In an implementation, the observed can include components reflecting portions of the control object which are occluded from view of the device ("occlusions" or "occluded components"). In one implementation, the predictive information can be "fit" to the observed as described herein above with the additional constraint(s) that some total property of the predictive information (e.g., potential energy) be minimized or maximized (or driven to lower or higher value(s) through iteration or solution). Properties can be derived from nature, properties of the control object being viewed, others, and/or combinations thereof. In another implementation, as shown by FIGS. 16A and 16B, a deformation 1600A, 1600B of the predictive information subcomponents 1602 and 1612 can be allowed subject to an overall permitted value of compression, deformation, flexibility, others, and/or combinations thereof.

In an implementation, a "friction constraint" is applied on the model 197B-1. For example, if fingers of a hand being modeled are close together (in position or orientation), corresponding portions of the model will have more "friction". The more friction a model subcomponent has in the model, the less the subcomponent moves in response to new observed information. Accordingly the model is enabled to mimic the way portions of the hand that are physically close together move together, and move less overall.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Again with reference to FIG. 20, an interaction system 90C includes an interaction interpretation module 198 that provides functionality to recognize command and other information from object, position, motion and attribute information obtained from variation system 90B. An interaction interpretation module 198 implementation comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 23A, 23B: 198B-1, 198B-2) to recognize variations in control object presence or motion indicating command information, related information, environmental information and other information discernable from the object, position, motion and attribute information that might be useful in controlling a machine. With reference to FIG. 23A, 23B virtual construct 198B-1, 198B-2 implement an engagement target with which a control object 99 interacts enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B (see FIGS. 23A, 23B). In some implementations, virtual constructs (e.g., a virtual object defined in space; such that variations in real objects relative to the virtual construct, when detected, can be interpreted for control or other purposes (see FIGS. 23A, 23B)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

Further with reference to FIG. 20, an application control system 90D includes a control module 199 that provides functionality to determine and authorize commands based upon the command and other information obtained from interaction system 90C.

A control module 199 implementation comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In implementations, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various implementations and with reference to FIG. 23A, 23B, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 23A: 189-2, 189-3, FIG. 23B: 189B) or combinations thereof.

Figure 24:
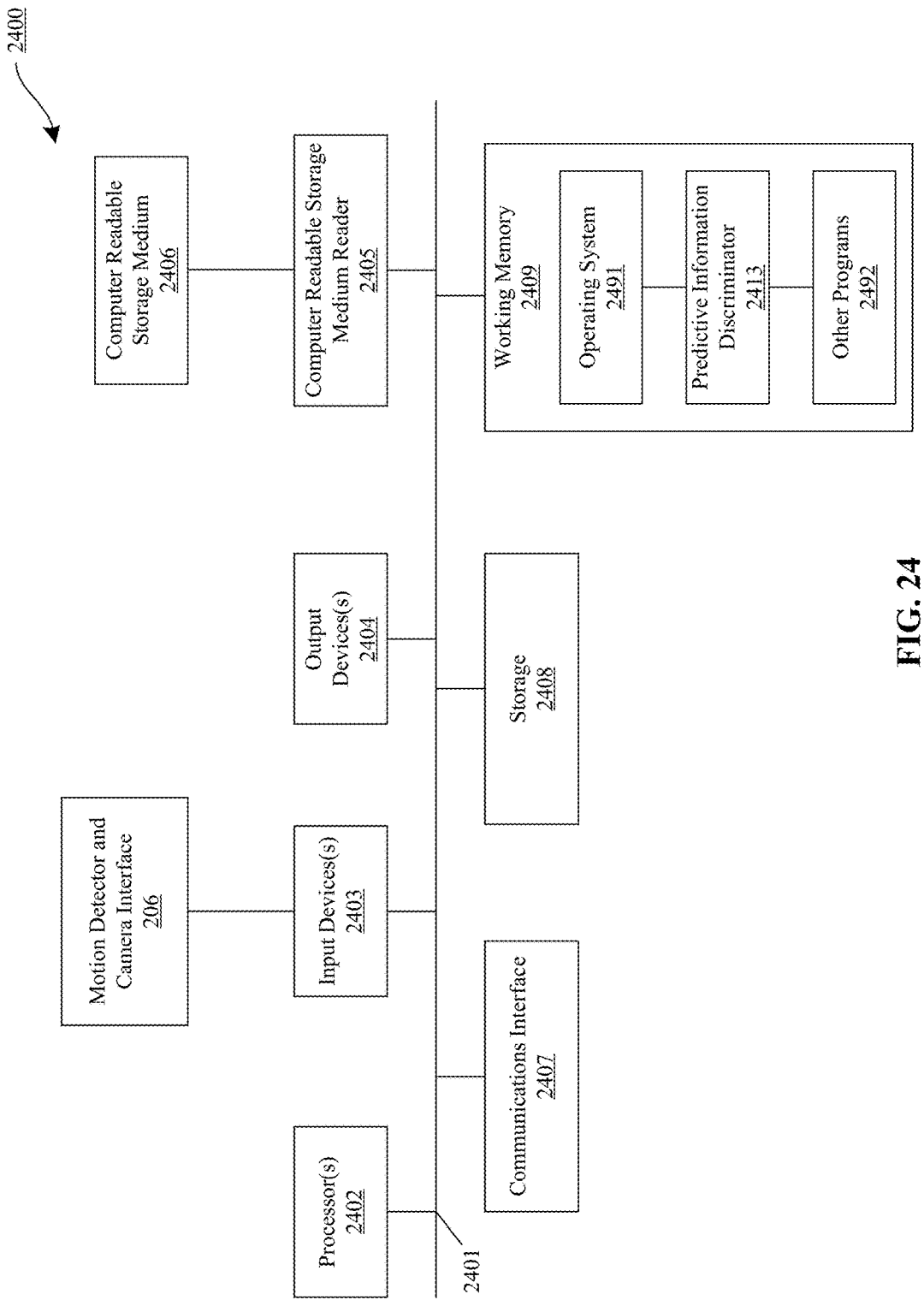
FIG. 24 is an exemplary computing system according to an embodiment.

FIG. 24 illustrates an example computing system that can comprise one or more of the elements shown in FIGS. 16A and 16B. In particular, FIG. 24 illustrates an exemplary computing system 2400, such as a PC (or other suitable "processing" system), that can comprise one or more of the MSCS elements shown in FIGS. 17-20 according to an implementation. While other application-specific device/process alternatives might be utilized, such as those already noted, it will be presumed for clarity sake that systems 90A-90D elements (FIGS. 17-20) are implemented by one or more processing systems consistent therewith, unless otherwise indicated.

As shown, computer system 2400 comprises elements coupled via communication channels (e.g. bus 2401) including one or more general or special purpose processors 2402, such as a Pentium® or Power PC®, digital signal processor ("DSP"), or other processing. System 2400 elements also include one or more input devices 2403 (such as a mouse, keyboard, joystick, microphone, remote control unit, tactile, biometric or other sensors 93 of FIG. 17, and so on), and one or more output devices 2404, such as a suitable display, joystick feedback components, speakers, biometric or other actuators, and so on, in accordance with a particular application.

System 2400 elements also include a computer readable storage media reader 2405 coupled to a computer readable storage medium 2406, such as a storage/memory device or hard or removable storage/memory media; examples are further indicated separately as storage device 2408 and non-transitory memory 2409, which can include hard disk variants, floppy/compact disk variants, digital versatile disk ("DVD") variants, smart cards, read only memory, random access memory, cache memory or others, in accordance with a particular application (e.g. see data store(s) 197A, 198A, 199A and 199B of FIG. 20). One or more suitable communication devices 2407 can also be included, such as a modem, DSL, infrared, etc. for providing inter-device communication directly or via suitable private or public networks, such as the Internet. Working memory 2409 is further indicated as including an operating system ("OS") 2491, predictive discrepancy determiner 2413 and other programs 2492, such as application programs, mobile code, data, or other information for implementing systems 90A-90D elements, which might be stored or loaded therein during use.

System 2400 element implementations can include hardware, software, firmware or a suitable combination. When implemented in software (e.g. as an application program, object, downloadable, servlet, and so on, in whole or part), a system 900 element can be communicated transitionally or more persistently from local or remote storage to memory for execution, or another suitable mechanism can be utilized, and elements can be implemented in compiled, simulated, interpretive or other suitable forms. Input, intermediate or resulting data or functional elements can further reside more transitionally or more persistently in a storage media or memory, (e.g. storage device 2408 or memory 2409) in accordance with a particular application.

Certain potential interaction determination, virtual object selection, authorization issuances and other aspects enabled by input/output processors and other element implementations disclosed herein can also be provided in a manner that enables a high degree of broad or even global applicability; these can also be suitably implemented at a lower hardware/software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Figure 25:
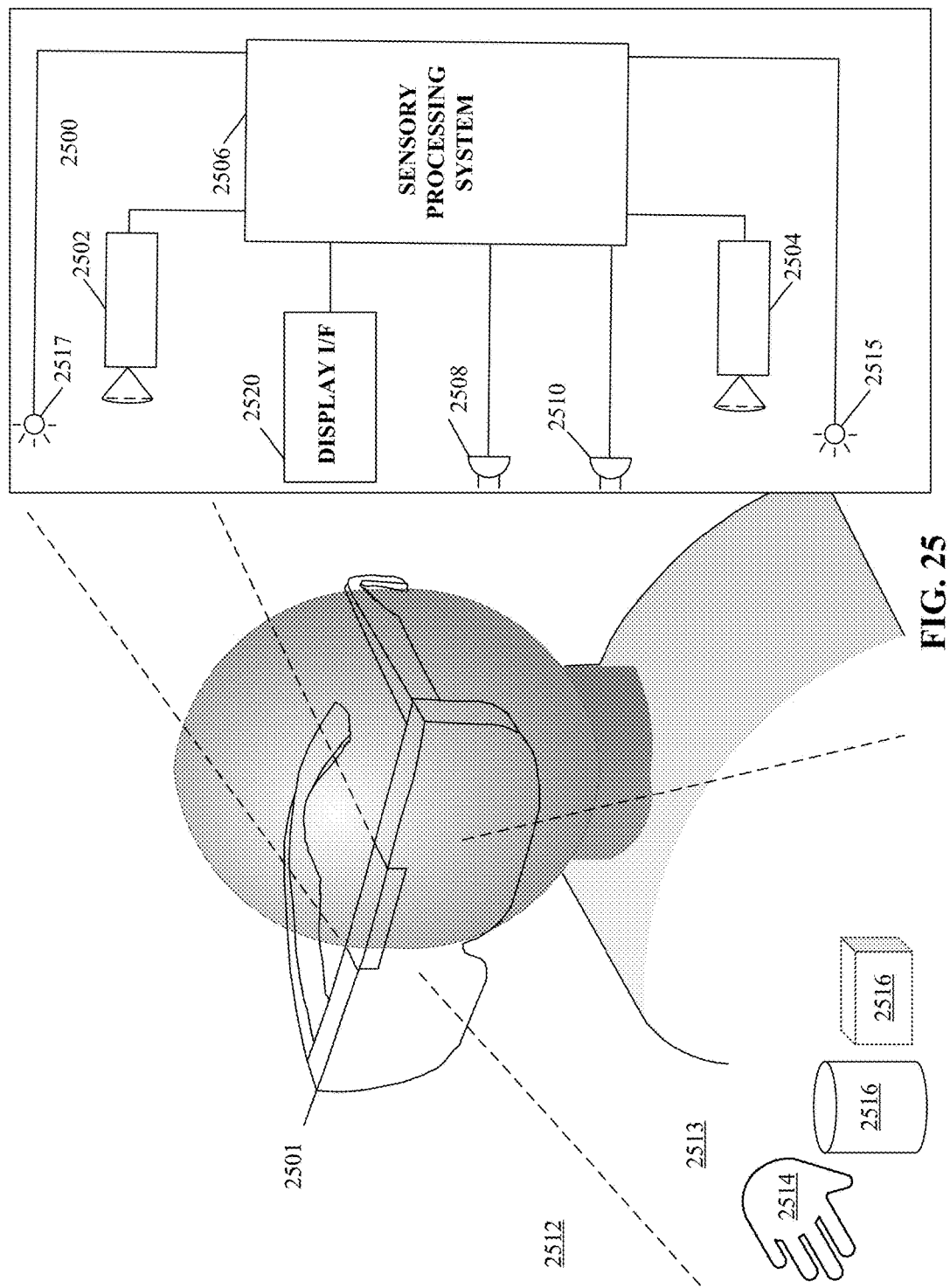
FIG. 25 illustrates a system for capturing image and other sensory data according to an implementation of the technology disclosed.

Referring to FIG. 25, which illustrates a system for capturing image data according to one implementation of the technology disclosed. System 2500 is preferably coupled to a wearable device 2501 that can be a personal head mounted display (HMD) having a goggle form factor such as shown in FIG. 25, a helmet form factor, or can be incorporated into or coupled with a watch, smartphone, or other type of portable device.

In various implementations, the system and method for capturing 3D motion of an object as described herein can be integrated with other applications, such as a head-mounted device or a mobile device. Referring again to FIG. 25, a head-mounted device 2501 can include an optical assembly that displays a surrounding environment or a virtual environment 2513 to the user; incorporation of the motion-capture system 2500 in the head-mounted device 2501 allows the user to interactively control the displayed environment. For example, a virtual environment 2513 can include virtual objects 2516 that can be manipulated by the user's hand gestures, which are tracked by the motion-capture system 2500 and reflected in virtual environment 2513 as an image hand 2514. In one implementation, the motion-capture system 2500 integrated with the head-mounted device 2501 detects a position and shape of user's hand and projects it on the display of the head-mounted device 2500 such that the user can see her gestures and interactively control the objects in the virtual environment. This can be applied in, for example, gaming or internet browsing.

In one embodiment, information about the interaction with a virtual object can be shared by a first HMD user with a HMD of a second user. For instance, a team of surgeons can collaborate by sharing with each other virtual incisions to be performed on a patient. In some embodiments, this is achieved by sending to the second user the information about the virtual object, including primitive(s) indicating at least one of a type, size, and/or features and other information about the calculation point(s) used to detect the interaction. In other embodiments, this is achieved by sending to the second user information about the predictive model used to track the interaction.

System 2500 includes any number of cameras 2502, 2504 coupled to sensory processing system 2506. Cameras 2502, 2504 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 2502, 2504 are preferably capable of capturing video images (i.e., successive image frames at a constant rate of at least 15 frames per second); although no particular frame rate is required. The capabilities of cameras 2502, 2504 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 2502, 2504 can be oriented toward portions of a region of interest 2512 by motion of the device 2501, in order to view a virtually rendered or virtually augmented view of the region of interest 2512 that can include a variety of virtual objects 2516 as well as contain an object of interest 2514 (in this example, one or more hands) moves within the region of interest 2512. One or more sensors 2508, 2510 capture motions of the device 2501. In some implementations, one or more light sources 2515, 2517 are arranged to illuminate the region of interest 2512. In some implementations, one or more of the cameras 2502, 2504 are disposed opposite the motion to be detected, e.g., where the hand 2514 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 2506, which can be, e.g., a computer system, can control the operation of cameras 2502, 2504 to capture images of the region of interest 2512 and sensors 2508, 2510 to capture motions of the device 2501. Information from sensors 2508, 2510 can be applied to models of images taken by cameras 2502, 2504 to cancel out the effects of motions of the device 2501, providing greater accuracy to the virtual experience rendered by device 2501. Based on the captured images and motions of the device 2501, sensory processing system 2506 determines the position and/or motion of object 2514.

For example, as an action in determining the motion of object 2514, sensory processing system 2506 can determine which pixels of various images captured by cameras 2502, 2504 contain portions of object 2514. In some implementations, any pixel in an image can be classified as an "object" pixel or a "background" pixel depending on whether that pixel contains a portion of object 2514 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 2502, 2504 and cancelling out captured motions of the device 2501 from sensors 2508, 2510 allows sensory processing system 2506 to determine the location in 3D space of object 2514, and analyzing sequences of images allows sensory processing system 2506 to reconstruct 3D motion of object 2514 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 2520 employs projection techniques in conjunction with the sensory based tracking in order to present virtual (or virtualized real) objects (visual, audio, haptic, and so forth) created by applications loadable to, or in cooperative implementation with, the device 2501 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging 2502, 2504 or acoustic or other sensory devices. Control information is communicated to a system based in part on a combination of the motion of the portable device 2501 and the detected motion of the user determined from the sensory information received from imaging 2502, 2504 or acoustic or other sensory devices. The virtual device experience can be augmented in some implementations by the addition of haptic, audio and/or other sensory information projectors. For example, an optional video projector 2520 can project an image of a page (e.g., virtual device) from a virtual book object superimposed upon a real world object, e.g., desk 2516 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 2514 is projected to the user, so that the scene looks to the user as if the user is looking at the user's own hand(s).

A plurality of sensors 2508, 2510 coupled to the sensory processing system 2506 to capture motions of the device 2501. Sensors 2508, 2510 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 2500 can include any of various other sensors not shown in FIG. 25 for clarity, alone or in various combinations, to enhance the virtual experience provided to the user of device 2501. For example, in low-light situations where free-form gestures cannot be recognized optically with a sufficient degree of reliability, system 2506 may switch to a touch mode in which touch gestures are recognized based on acoustic or vibrational sensors. Alternatively, system 2506 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 2506 from a standby mode to an operational mode. For example, the system 2506 may enter the standby mode if optical signals from the cameras 2502, 2501 are absent for longer than a threshold interval.

It will be appreciated that the figures shown in FIG. 25 are illustrative. In some implementations, it may be desirable to house the system 2500 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 28:
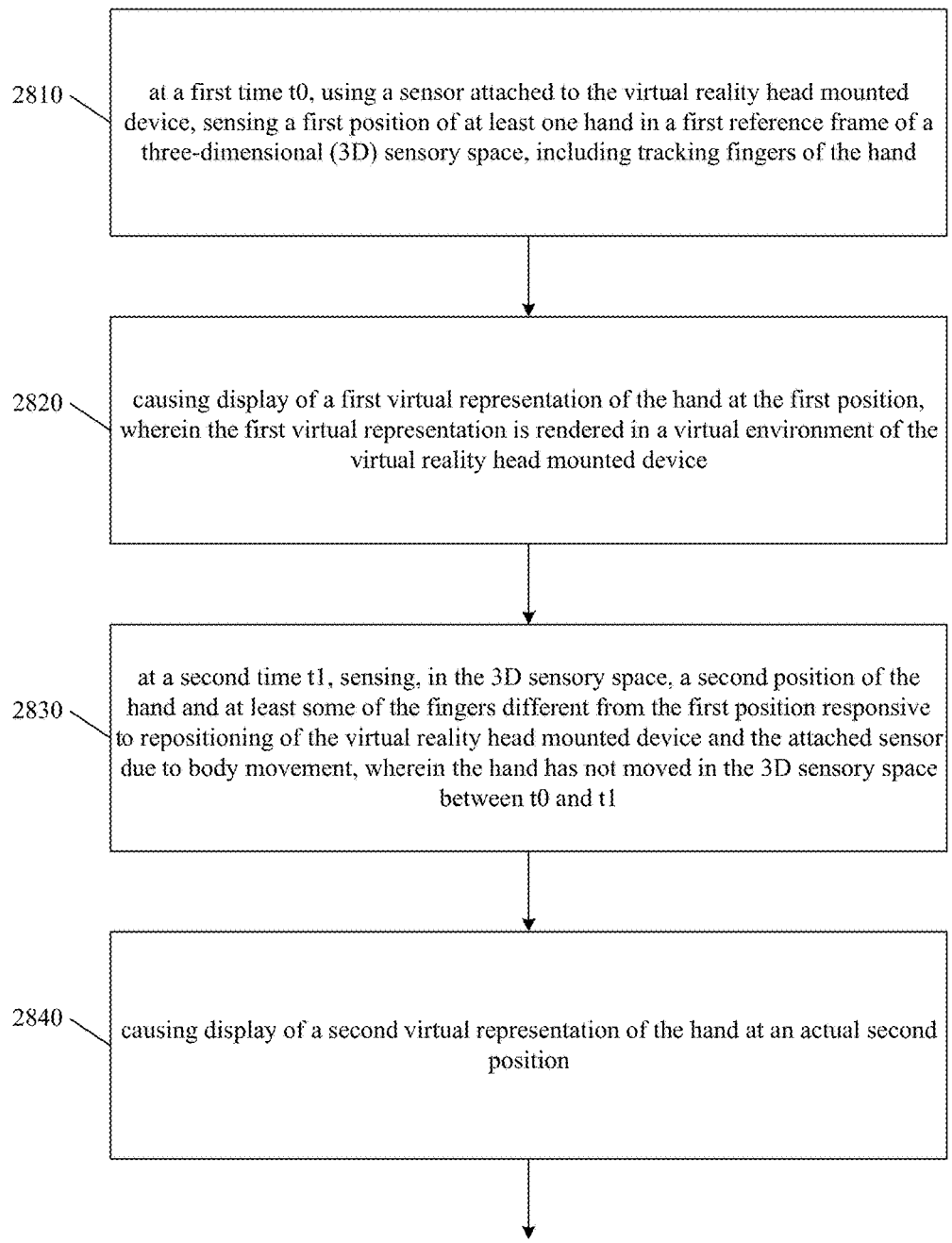
FIG. 28 is a representative method of integrating real three-dimensional (3D) space sensing with a virtual reality head mounted device.

FIG. 28 is a representative method 2800 of integrating real three-dimensional (3D) space sensing with a virtual reality head mounted device. Flowchart shown in FIG. 28 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 28. Multiple actions can be combined in some implementations. For convenience, this flowchart is described with reference to the system that carries out a method. The system is not necessarily part of the method.

At action 2810, a sensor attached to a virtual reality head mounted device is used to sense a first position of at least one hand in a first reference frame of a three-dimensional (3D) sensory space at a first time t0. In some implementations, the tracking of the hand includes tracking fingers of the hand.

At action 2820, display of a first virtual representation of the hand at the first position is caused. In one implementation, the first virtual representation is rendered in a virtual environment of the virtual reality head mounted device.

At action 2830, a second position of the hand and at least some of the fingers is sensed in the 3D sensory space at a second time t1 that is different from the first position. This occurs in response to repositioning of the virtual reality head mounted device and the attached sensor due to body movement. In one implementation, the hand does not move in the 3D sensory space between t0 and t1.

At action 2840, display of a second virtual representation of the hand at an actual second position is caused by sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the hand into the common reference frame. In one implementation, the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

The method further includes transforming the first and second positions of the hand into the common reference frame further includes applying an affine transformation. It also includes determining the orientation of the hand at the first position with respect to the first reference frame and causing the display of the hand accordingly. In yet another implementation, the method includes, determining the orientation of the hand at the second position with respect to the second reference frame and causing the display of the hand accordingly.

In one implementation, the determining the position of the hand at the first position further includes calculating a translation of the hand with respect to the common reference frame and causing the display of the hand accordingly. In another implementation, the determining the position of the hand at the second position further includes calculating a translation of the hand with respect to the common reference frame and causing the display of the hand accordingly.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 29:
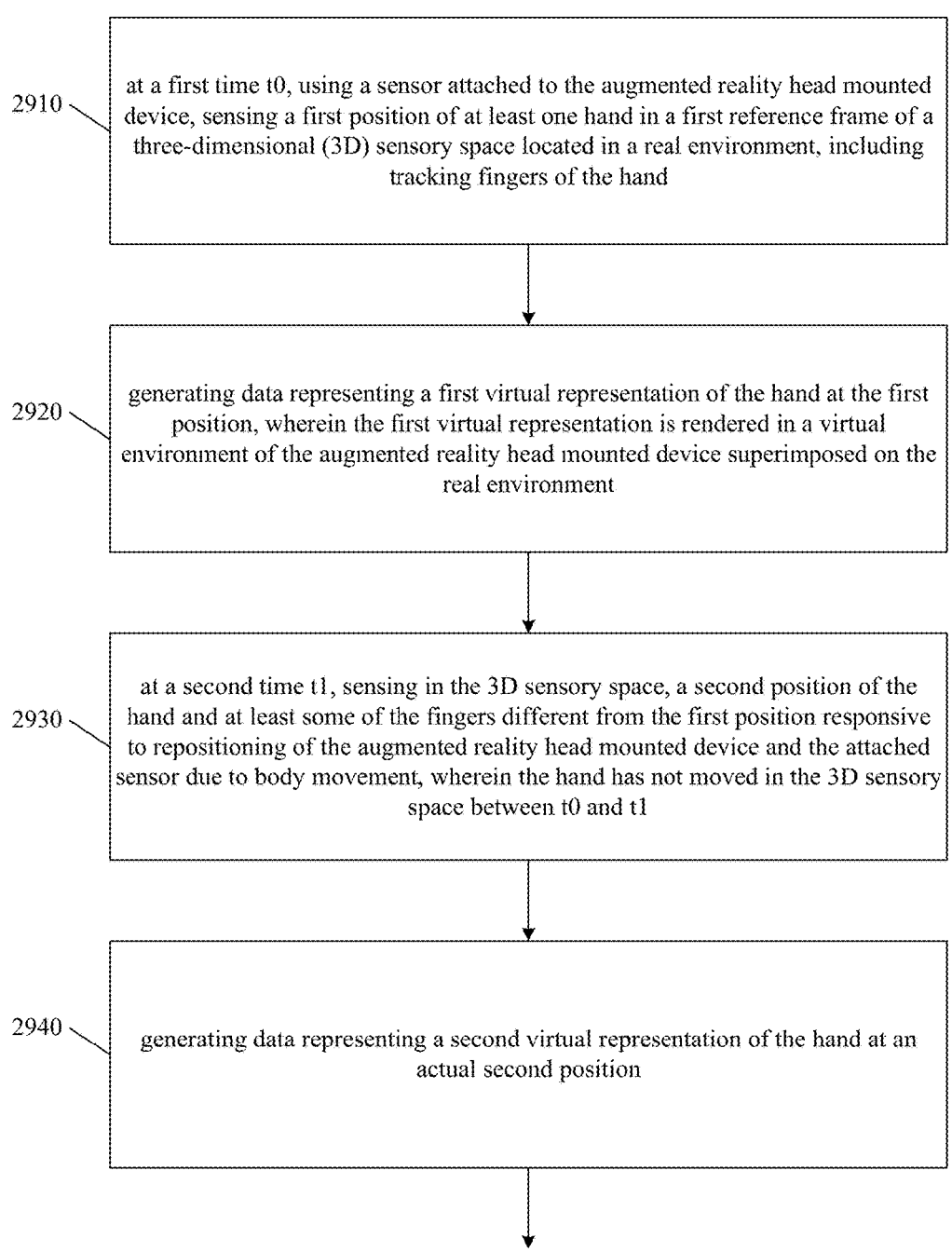
FIG. 29 depicts a flowchart of integrating real three-dimensional (3D) space sensing with an augmented reality head mounted device.

FIG. 29 depicts a flowchart 2900 of integrating real three-dimensional (3D) space sensing with an augmented reality head mounted device. Flowchart shown in FIG. 29 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 29. Multiple actions can be combined in some implementations. For convenience, this flowchart is described with reference to the system that carries out a method. The system is not necessarily part of the method.

At action 2910, a sensor attached to the augmented reality head mounted device is used to sense a first position of at least one hand, at a first time t0, in a first reference frame of a three-dimensional (3D) sensory space located in a real environment. In one implementation, tracking the hand includes tracking fingers of the hand.

At action 2920, data representing a first virtual representation of the hand at the first position is generated. In one implementation, the first virtual representation is rendered in a virtual environment of the augmented reality head mounted device superimposed on the real environment.

At action 2930, a second position of the hand and at least some of the fingers is sensed in the 3D sensory space at a second time t1. In one implementation, the second position is different from the first position. This occurs in response to repositioning of the augmented reality head mounted device and the attached sensor due to body movement. In one implementation, the hand does not move in the 3D sensory space between t0 and t1.

At action 2940, data representing a second virtual representation of the hand at an actual second position is generated by sensing motion of the attached sensor and calculating a second reference frame that accounts for repositioning of the attached sensor, calculating a transformation that renders the first position in the first reference frame and the second position in the second reference frame into a common reference frame, and transforming the first and second positions of the hand into the common reference frame. In one implementation, the common reference frame has a fixed point of reference and an initial orientation of axes, whereby the sensed second position is transformed to the actual second position.

In one implementation, the common reference frame is a world reference frame that does not change as the attached sensor is repositioned. In another implementation, the common reference frame is the second reference frame.

In some implementations, the transforming the first and second positions of the hand into the common reference frame further includes applying an affine transformation. In other implementations, the method further includes determining the orientation of the hand at the first position with respect to the first reference frame and causing interaction between the hand and the augmented reality accordingly. In yet other implementations, the method includes determining the orientation of the hand at the second position with respect to the second reference frame and causing interaction between the hand and the augmented reality accordingly.

In one implementation, the determining the position of the hand at the first position further includes calculating a translation of the hand with respect to the common reference frame and causing interaction between the hand and the augmented reality accordingly. In another implementation, the determining the position of the hand at the second position further includes calculating a translation of the hand with respect to the common reference frame and causing interaction between the hand and the augmented reality accordingly.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 30:
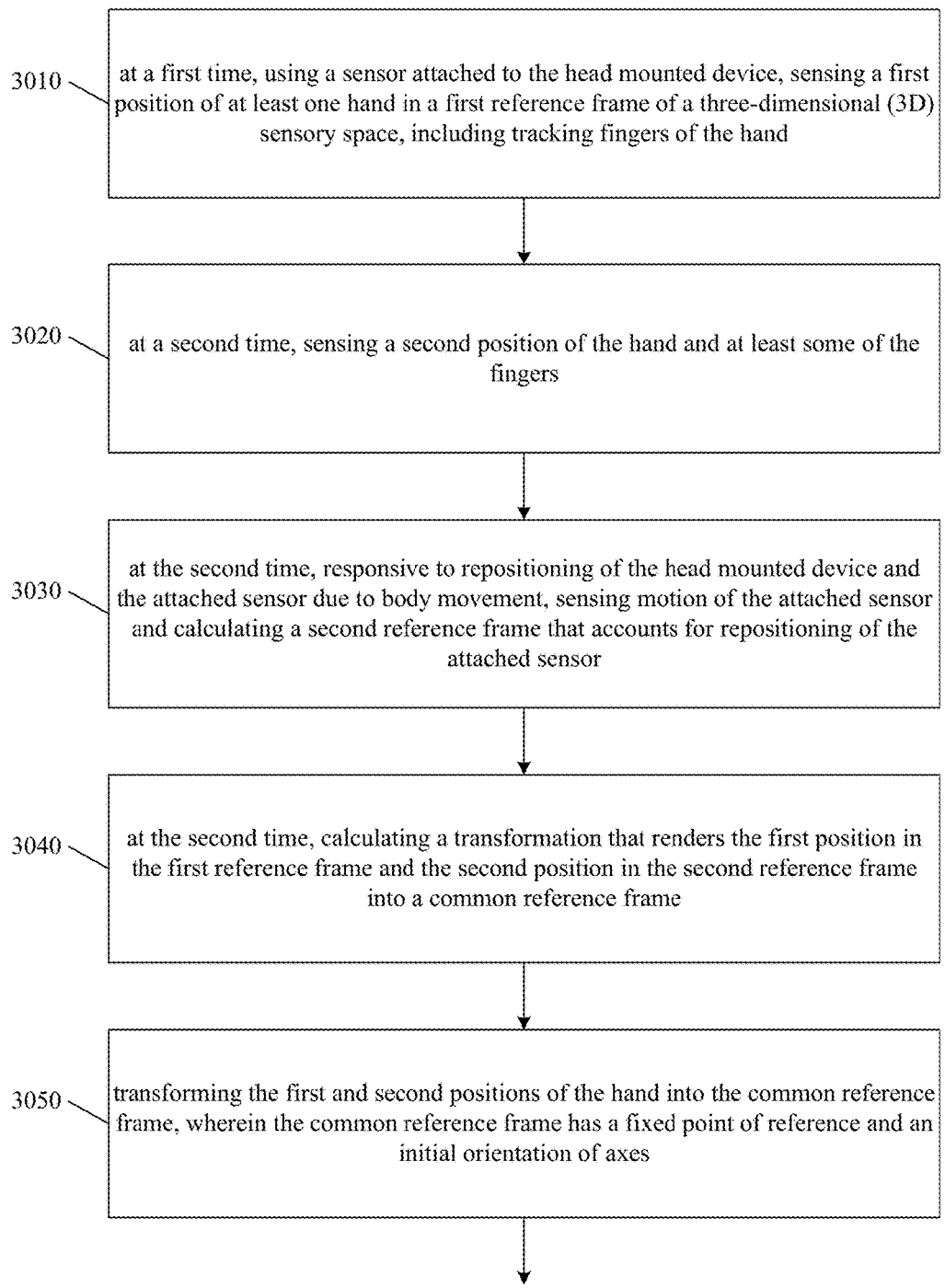
FIG. 30 illustrates a flowchart of a representative method of integrating real three-dimensional (3D) space sensing with a head mounted device that renders a virtual background and one or more virtual objects is described.
Figure 31:
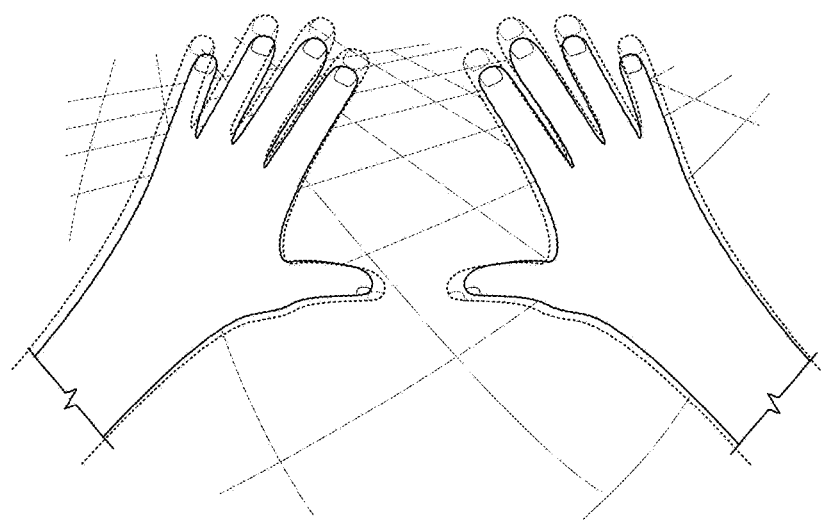
FIGS. 31, 32, 33, 34, 35, 36, 37, 38, 39, 40, 41, 42, 43, and 44 shows various implementations of manipulating virtual objects using real motions of one or more hands in a three-dimensional (3D) sensory space.
Figure 32:
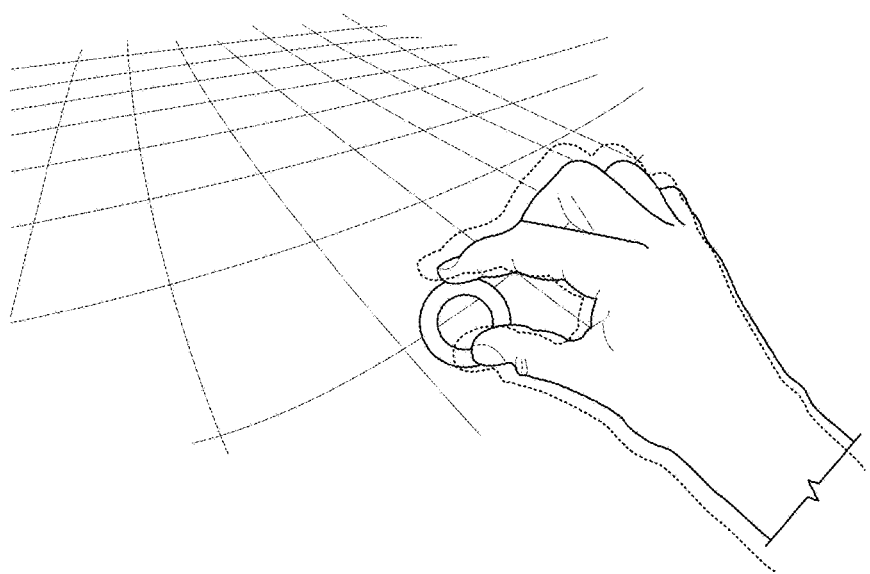
Figure 33:
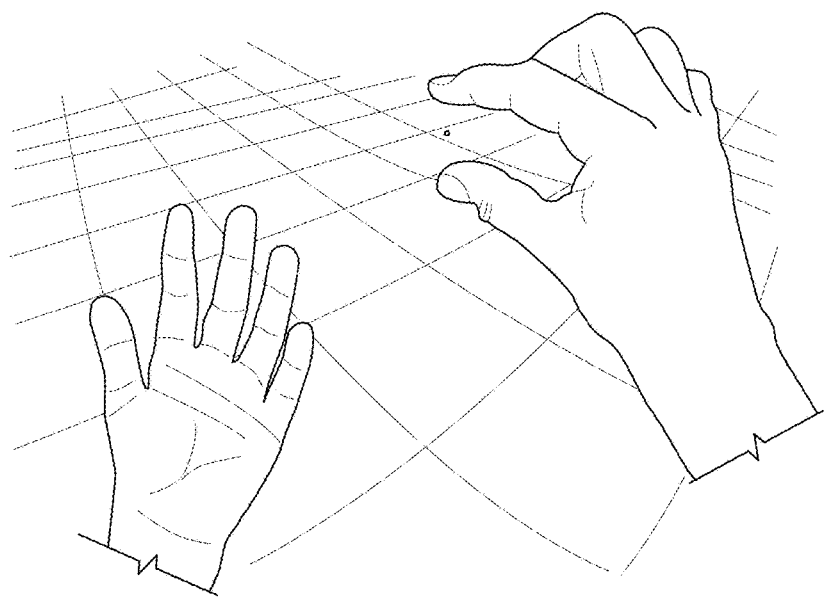
Figure 34:
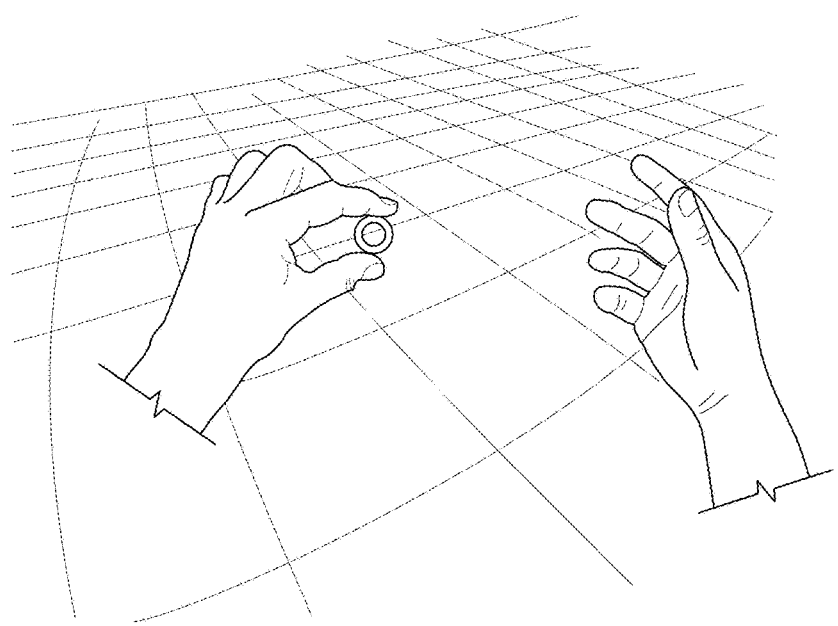
Figure 35:
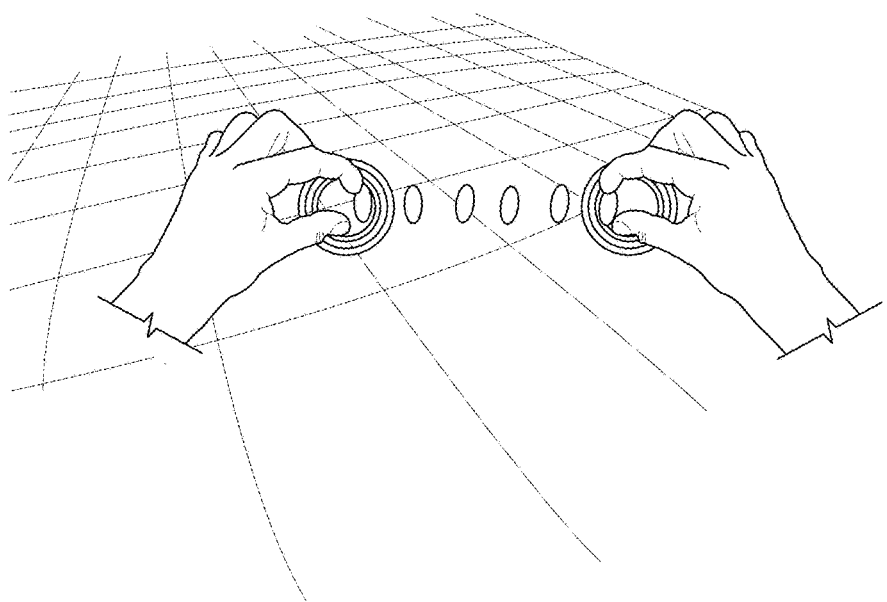
Figure 36:
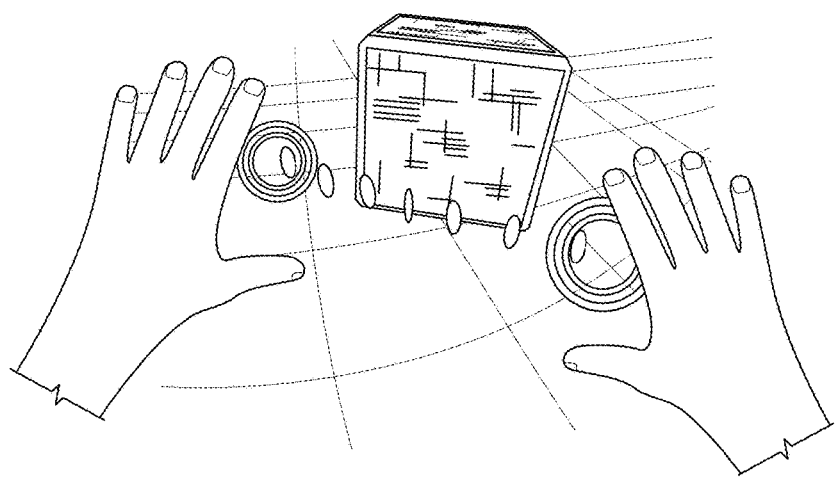
Figure 37:
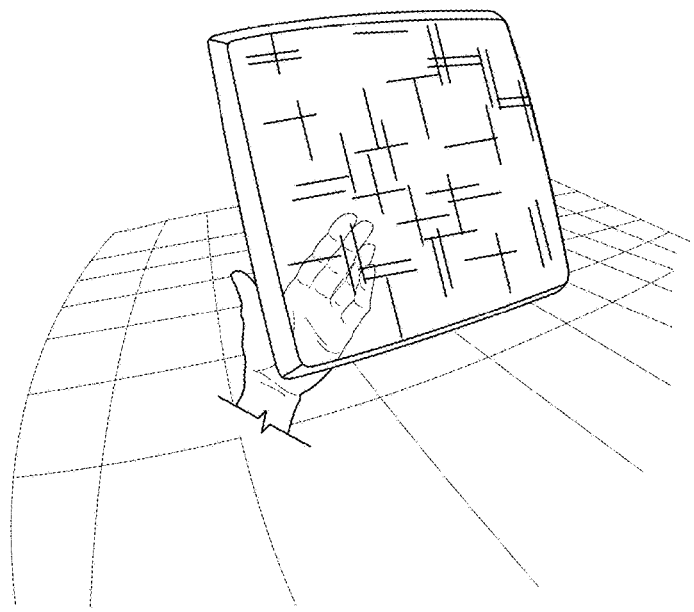
Figure 38:
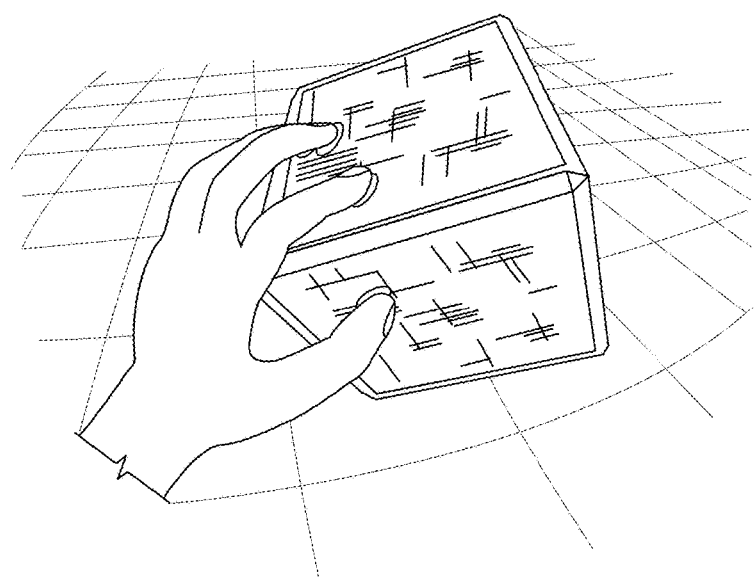
Figure 39:
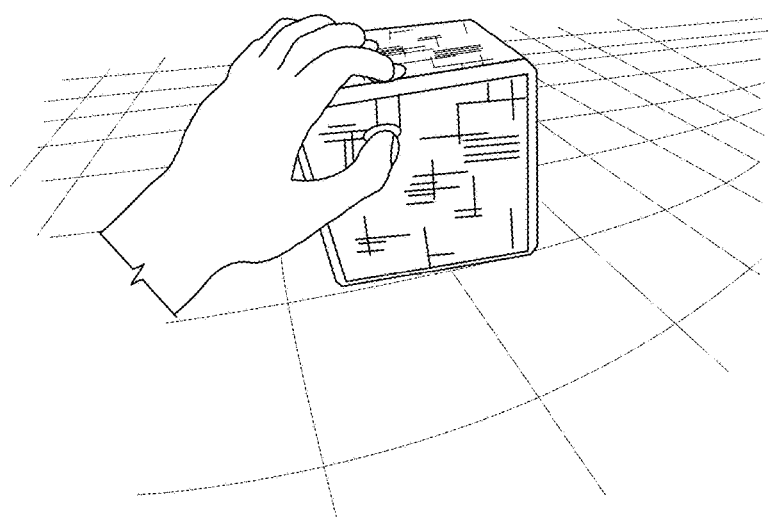
Figure 40:
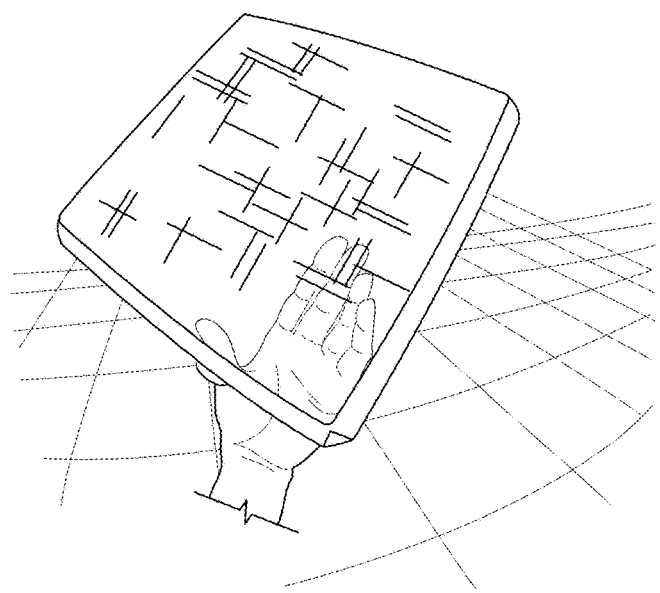
Figure 41:
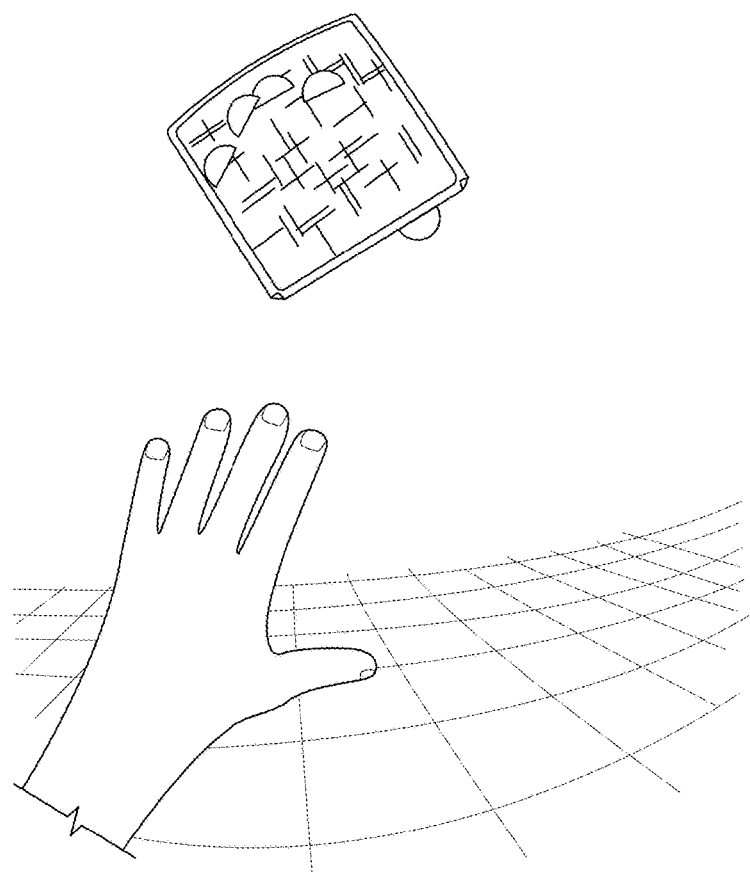
Figure 42:
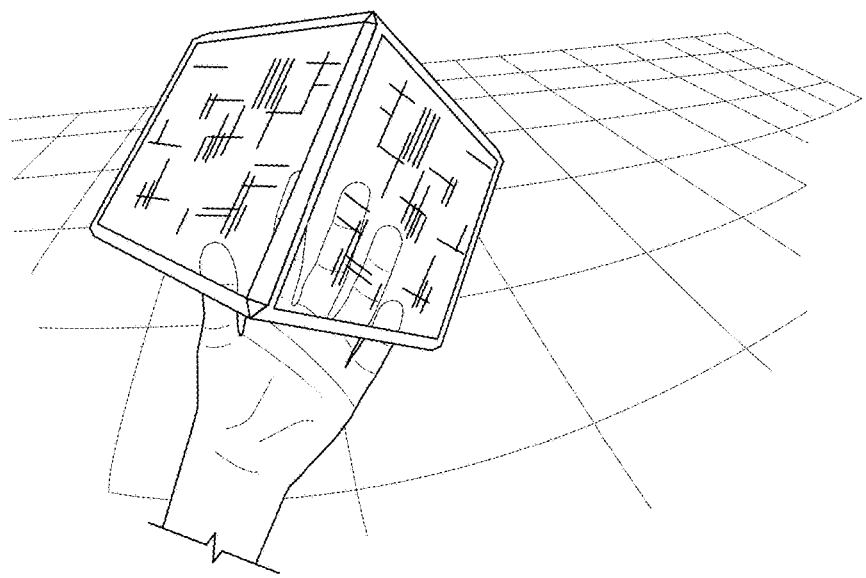
Figure 43:
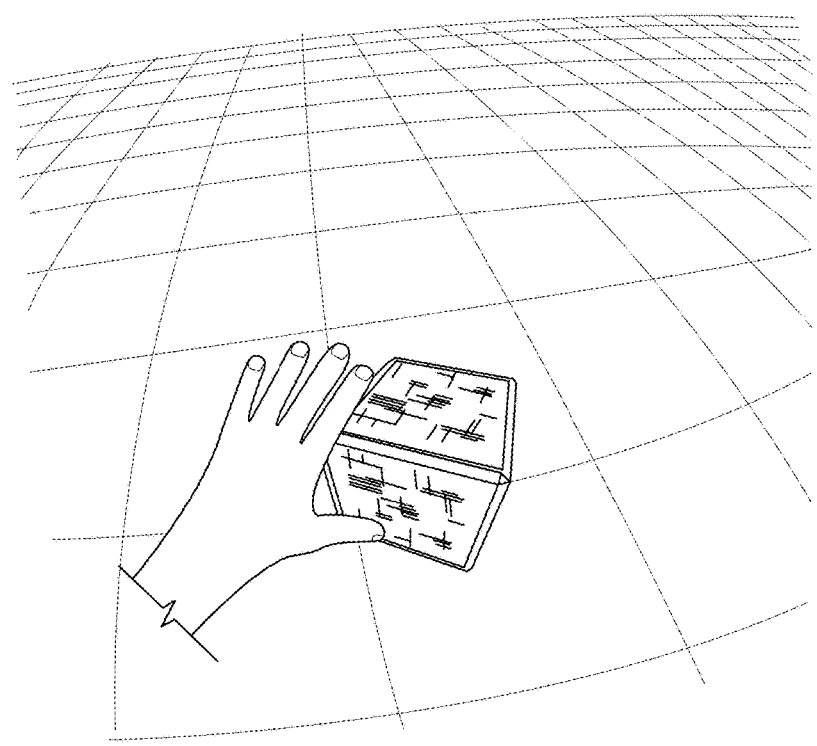
Figure 44:
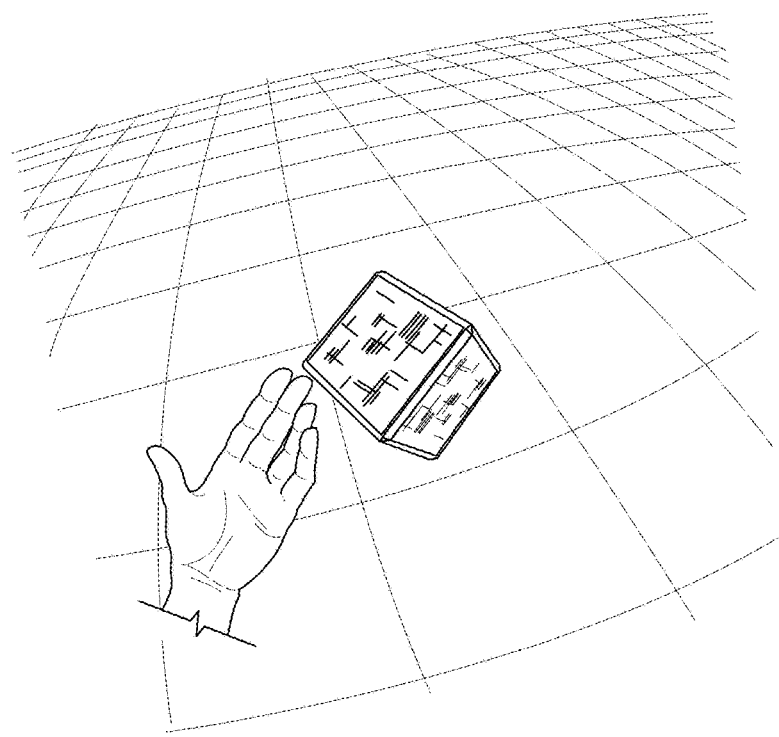

FIG. 30 illustrates a flowchart 3000 of a representative method of integrating real three-dimensional (3D) space sensing with a head mounted device that renders a virtual background and one or more virtual objects is described. Flowchart shown in FIG. 30 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 30. Multiple actions can be combined in some implementations. For convenience, this flowchart is described with reference to the system that carries out a method. The system is not necessarily part of the method.

At action 3010, a sensor attached to the head mounted device is used to sense a first position of at least one hand, at a first time, in a first reference frame of a three-dimensional (3D) sensory space. In one implementation, tracking the hand includes tracking fingers of the hand.

At action 3020, a second position of the hand and at least some of the fingers is sensed at a second time.

At action 3030, responsive to repositioning of the head mounted device and the attached sensor due to body movement, motion of the attached sensor is sensed and a second reference frame that accounts for repositioning of the attached sensor is calculated.

At action 3040, a transformation is calculated, which renders the first position in the first reference frame and the second position in the second reference frame into a common reference frame.

At action 3050, the first and second positions of the hand are transformed into the common reference frame. In one implementation, the common reference frame has a fixed point of reference and an initial orientation of axes.

In one implementation, the common reference frame is a world reference frame that does not change as the attached sensor is repositioned. In another implementation, the common reference frame is the second reference frame.

In some implementations, the attached sensor is integrated into a unit with the virtual reality head mounted device. In other implementations, the transforming the first and second positions of the hand into the common reference frame further includes applying at least one affine transformation.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

While the disclosed technology has been described with respect to specific implementations, one skilled in the art will recognize that numerous modifications are possible.

The number, types and arrangement of cameras and sensors can be varied. The cameras' capabilities, including frame rate, spatial resolution, and intensity resolution, can also be varied as desired. The sensors' capabilities, including sensitively levels and calibration, can also be varied as desired. Light sources are optional and can be operated in continuous or pulsed mode. The systems described herein provide images and audio signals to facilitate tracking movement of an object, and this information can be used for numerous purposes, of which position and/or motion detection is just one among many possibilities.

Threshold cutoffs and other specific criteria for distinguishing object from background can be adapted for particular hardware and particular environments. Frequency filters and other specific criteria for distinguishing visual or audio signals from background noise can be adapted for particular cameras or sensors and particular devices. In some implementations, the system can be calibrated for a particular environment or application, e.g., by adjusting frequency filters, threshold criteria, and so on.

Any type of object can be the subject of motion capture using these techniques, and various aspects of the implementation can be optimized for a particular object. For example, the type and positions of cameras and/or other sensors can be selected based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the disclosed technology has been described with respect to specific implementations, it will be appreciated that the disclosed technology is intended to cover all modifications and equivalents within the scope of the following claims.

Figure 1A:
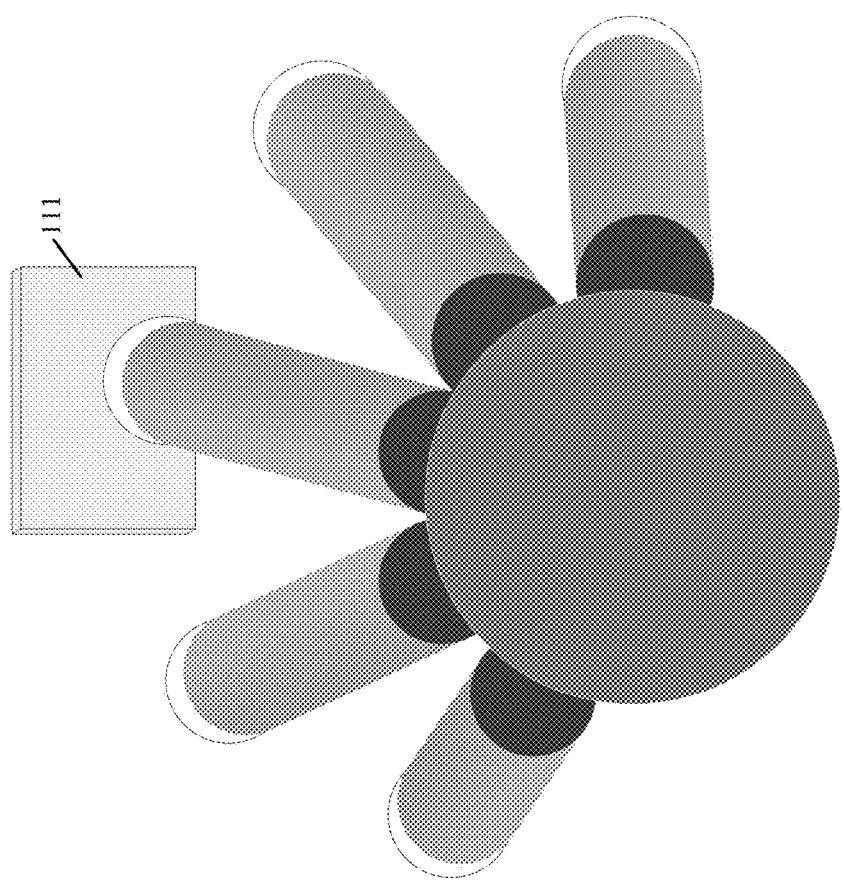
FIG. 1A illustrates one implementation of a one subcomponent virtual contact of a control object causing a virtual displacement of a virtual object.

FIG. 1A illustrates one implementation 100A of a one sub-component virtual contact of a control object causing a virtual displacement of a virtual object 111.

Figure 1B:
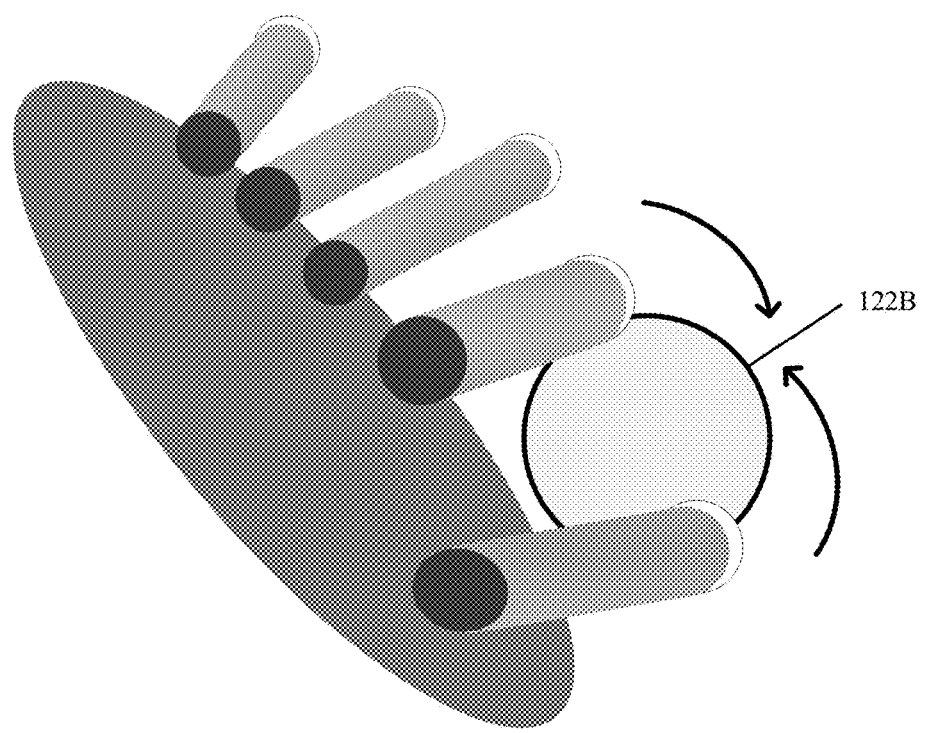
FIG. 1B illustrates one implementation of a two subcomponent virtual contact of a control object causing a virtual rotation of a virtual object.

FIG. 1B illustrates one implementation 100B of a two sub-component virtual contact of a control object causing a virtual rotation of a virtual object 122B.

Figure 1C:
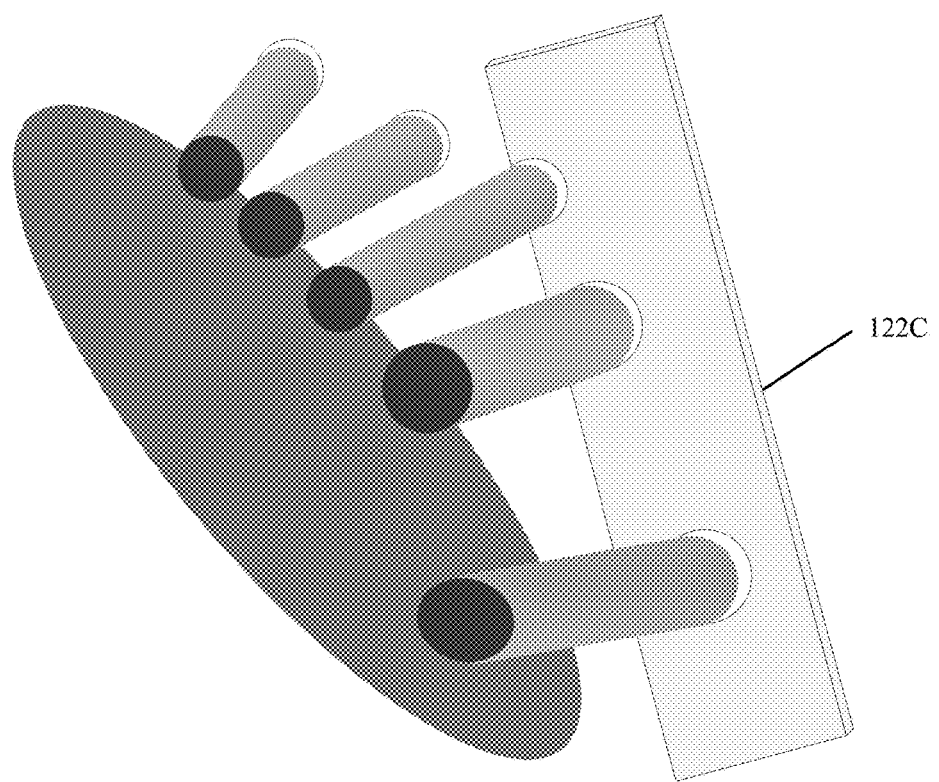
FIG. 1C illustrates one implementation of a three subcomponent virtual contact of a control object causing a virtual grasping of a virtual object.

FIG. 1C illustrates one implementation 100B of a three sub-component virtual contact of a control object causing a virtual grasping of a virtual object 122C.

FIGS. 31, 32, 33, 34, 35, 36, 37, 38, 39, 40, 41, 42, 43, and 44 shows various implementations 3100, 3200, 3300, 3400, 3500, 3600, 3700, 3800, 3900, 4000, 4100, 4200, 4200, and 4400 of manipulating virtual objects using real motions of one or more hands in a three-dimensional (3D) sensory space.

Particular Implementations

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as pervasive computing environment, handheld mode, wide-area mode, augmented reality, embedding architectures, rigged hand, biometrics, etc.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods is described with reference to the system that carries out a method. The system is not necessarily part of the method.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

Some example implementations are listed below with certain implementations dependent upon the implementation to which they refer to:

1. A method of realistic displacement of a virtual object for an interaction between a hand in a three-dimensional (3D) sensory space and the virtual object in a virtual space that the hand interacts with, the method including:

detecting free-form gestures of a hand in a three-dimensional (3D) sensory space and generating for display a 3D solid hand model for the hand during the free-form gestures, including fingers and thumb of the hand; and in response to detecting a one finger or one thumb free-form gesture of the hand in the 3D sensory space in virtual contact with the virtual object, depicting, in the generated display, the virtual contact and resulting displacement of the virtual object by the 3D solid hand model.

2. A method of realistic rotation of a virtual object for an interaction between a hand in a three-dimensional (3D) sensory space and the virtual object in a virtual space that the hand interacts with, the method including, comprising:

detecting free-form gestures of a hand in a three-dimensional (3D) sensory space and generating for display a 3D solid hand model for the hand during the free-form gestures, including fingers and thumb of the hand; and in response to detecting a two finger or one finger and one thumb free-form gesture of the hand in the 3D sensory space in virtual contact with the virtual object, depicting, in the generated display, the virtual contact and resulting rotation of the virtual object by the 3D solid hand model.

3. A method of realistic rotation of a virtual object for an interaction between a hand in a three-dimensional (3D)

sensory space and the virtual object in a virtual space that the hand interacts with, the method including, comprising:

detecting free-form gestures of a hand in a three-dimensional (3D) sensory space and generating for display a 3D solid hand model for the hand during the free-form gestures, including fingers and thumb of the hand; and in response to detecting a three finger or two finger and one thumb free-form gesture of the hand in the 3D sensory space in virtual contact with the virtual object, depicting, in the generated display, the virtual contact and resulting grasping of the virtual object by the 3D solid hand model.

4. A method of realistic displacement of a virtual object for an interaction between a control object in a three-dimensional (3D) sensory space and the virtual object in a virtual space that the control object interacts with, the method including:

detecting free-form gestures of a control object in a three-dimensional (3D) sensory space and generating for display a 3D solid control object model for the control object during the free-form gestures, including sub-components of the control object; and in response to detecting a one sub-component gesture of the control object in the 3D sensory space in virtual contact with the virtual object, depicting, in the generated display, the virtual contact and resulting displacement of the virtual object by the 3D solid control object model.

5. A method of realistic rotation of a virtual object for an interaction between a control object in a three-dimensional (3D) sensory space and the virtual object in a virtual space that the control object interacts with, the method including:

detecting free-form gestures of a control object in a three-dimensional (3D) sensory space and generating for display a 3D solid control object model for the control object during the free-form gestures, including sub-components of the control object; and in response to detecting a two e sub-component free-form gesture of the control object in the 3D sensory space in virtual contact with the virtual object, depicting, in the generated display, the virtual contact and resulting rotation of the virtual object by the 3D solid control object model.

6. The method of implementation 5, further including depicting, in the generated display, persisted virtual contact of the sub-component until the two sub-component free-form gesture is detected.

7. A method of realistic grasping of a virtual object for an interaction between a control object in a three-dimensional (3D) sensory space and the virtual object in a virtual space that the control object interacts with, the method including:

detecting free-form gestures of a control object in a three-dimensional (3D) sensory space and generating for display a 3D solid control object model for the control object during the free-form gestures, including sub-components of the control object; and in response to detecting a three sub-component free-form gesture of the control object in the 3D sensory space in virtual contact with the virtual object, depicting, in the generated display, the virtual contact and resulting grasping of the virtual object by the 3D solid control object model.

8. The method of implementation 7, further including depicting, in the generated display, persisted virtual contact of the sub-component until the three sub-component free-form gesture is detected.

9. A method of realistic grasping of a virtual object for an interaction between a control object in a three-dimensional (3D) sensory space and the virtual object in a virtual space that the control object interacts with, the method including:

detecting free-form gestures of one or more control objects in a three-dimensional (3D) sensory space and generating for display 3D solid control object models for the control objects during the free-form gestures, including sub-components of the control objects;

in response to detecting a multi sub-component free-form gesture of the control objects in the 3D sensory space in virtual contact with the virtual object, depicting, in the generated display, the multi sub-component virtual contact and resulting grasping of the virtual object by the 3D solid control object models of the one or more control objects.

10. A method of realistic grasping of a virtual object for an interaction between a control object in a three-dimensional (3D) sensory space and the virtual object in a virtual space that the control object interacts with, the method including:

detecting free-form gestures of at least two control objects in a three-dimensional (3D) sensory space and generating for display 3D solid control object models for the control objects during the free-form gestures, including sub-components of the control objects;

determining a dominant control object from the two control objects based on an earliest detection of a three sub-component free-form gesture in the 3D sensory space in virtual contact with the virtual object; and depicting, in the generated display, the virtual contact and resulting grasping of the virtual object by the 3D solid control object model of the dominant control object.

11. The method of implementation 9, further including:

responsive to detecting persistence of the multi sub-component virtual contact and decreased proximity between the control objects in the 3D sensory space, depicting, in the generated display, the multi sub-component virtual contact and resulting stretching of the virtual object by the 3D solid control object models of the one or more control objects.

12. The method of implementation 11, further including:

responsive to stretching of the virtual object beyond a predetermined threshold, depicting, in the generated display, a modification of the virtual object.

13. The method of implementation 11, further including:

responsive to stretching of the virtual object beyond a predetermined threshold, depicting, in the generated display, another virtual object.

14. The method of implementations 4, 5, 7, 9, and 10, further including depicting, in the generated display, proportional penetration of the control object in the virtual object responsive to position of the virtual object relative to the one or more sub-components.

15. The method of implementations 4, 5, 7, 9, and 10, wherein the control object is a hand and the sub-components include fingers and a thumb.

16. The method of implementations 4, 5, 7, 9, and 10, wherein the control object is tool including at least one of a pen and a stylus.

17. The method of implementations 4, 5, 7, 9, and 10, wherein the control object is tool including at least one of a hammer and a screwdriver.

18. The method of implementations 4, 5, 7, 9, and 10, wherein the control object is a custom tool including a joyful.

19. A system of realistic displacement of a virtual object for an interaction between a hand in a three-dimensional (3D) sensory space and the virtual object in a virtual space that the hand interacts with, the system including:
a processor and a computer readable storage medium storing computer instructions configured for performing:
detecting free-form gestures of a hand in a three-dimensional (3D) sensory space and generating for display a 3D solid hand model for the hand during the free-form gestures, including fingers and thumb of the hand; and
in response to detecting a one finger or one thumb free-form gesture of the hand in the 3D sensory space in virtual contact with the virtual object, depicting, in the generated display, the virtual contact and resulting displacement of the virtual object by the 3D solid hand model.

20. A system of realistic rotation of a virtual object for an interaction between a hand in a three-dimensional (3D) sensory space and the virtual object in a virtual space that the hand interacts with, the system including:
a processor and a computer readable storage medium storing computer instructions configured for performing:
detecting free-form gestures of a hand in a three-dimensional (3D) sensory space and generating for display a 3D solid hand model for the hand during the free-form gestures, including fingers and thumb of the hand; and
in response to detecting a two finger or one finger and one thumb free-form gesture of the hand in the 3D sensory space in virtual contact with the virtual object, depicting, in the generated display, the virtual contact and resulting rotation of the virtual object by the 3D solid hand model.

21. A system of realistic rotation of a virtual object for an interaction between a hand in a three-dimensional (3D) sensory space and the virtual object in a virtual space that the hand interacts with, the system including:
a processor and a computer readable storage medium storing computer instructions configured for performing:
detecting free-form gestures of a hand in a three-dimensional (3D) sensory space and generating for display a 3D solid hand model for the hand during the free-form gestures, including fingers and thumb of the hand; and
in response to detecting a three finger or two finger and one thumb free-form gesture of the hand in the 3D sensory space in virtual contact with the virtual object, depicting, in the generated display, the virtual contact and resulting grasping of the virtual object by the 3D solid hand model.

22. A system of realistic displacement of a virtual object for an interaction between a control object in a three-dimensional (3D) sensory space and the virtual object in a virtual space that the control object interacts with, the system including: a processor and a computer readable storage medium storing computer instructions configured for performing:
detecting free-form gestures of a control object in a three-dimensional (3D) sensory space and generating for display a 3D solid control object model for the control object during the free-form gestures, including sub-components of the control object; and
in response to detecting a one sub-component gesture of the control object in the 3D sensory space in virtual contact with the virtual object, depicting, in the generated display, the virtual contact and resulting displacement of the virtual object by the 3D solid control object model.

23. A system of realistic rotation of a virtual object for an interaction between a control object in a three-dimensional (3D) sensory space and the virtual object in a virtual space that the control object interacts with, the system including:
a processor and a computer readable storage medium storing computer instructions configured for performing:
detecting free-form gestures of a control object in a three-dimensional (3D) sensory space and generating for display a 3D solid control object model for the control object during the free-form gestures, including sub-components of the control object; and
in response to detecting a two e sub-component free-form gesture of the control object in the 3D sensory space in virtual contact with the virtual object, depicting, in the generated display, the virtual contact and resulting rotation of the virtual object by the 3D solid control object model.

24. A system of realistic grasping of a virtual object for an interaction between a control object in a three-dimensional (3D) sensory space and the virtual object in a virtual space that the control object interacts with, the system including:
a processor and a computer readable storage medium storing computer instructions configured for performing:
detecting free-form gestures of one or more control objects in a three-dimensional (3D) sensory space and generating for display 3D solid control object models for the control objects during the free-form gestures, including sub-components of the control objects;
in response to detecting a multi sub-component free-form gesture of the control objects in the 3D sensory space in virtual contact with the virtual object, depicting, in the generated display, the multi sub-component virtual contact and resulting grasping of the virtual object by the 3D solid control object models of the one or more control objects.

25. A system of realistic grasping of a virtual object for an interaction between a control object in a three-dimensional (3D) sensory space and the virtual object in a virtual space that the control object interacts with, the system including:
a processor and a computer readable storage medium storing computer instructions configured for performing:
detecting free-form gestures of at least two control objects in a three-dimensional (3D) sensory space and generating for display 3D solid control object models for the control objects during the free-form gestures, including sub-components of the control objects;
determining a dominant control object from the two control objects based on an earliest detection of a three sub-component free-form gesture in the 3D sensory space in virtual contact with the virtual object; and
depicting, in the generated display, the virtual contact and resulting grasping of the virtual object by the 3D solid control object model of the dominant control object.

26. One or more non-transitory computer readable media having instructions stored thereon for performing a method of realistic displacement of a virtual object for an interaction between a hand in a three-dimensional (3D) sensory space and the virtual object in a virtual space that the hand interacts with, the method including: detecting free-form gestures of a hand in a three-dimensional (3D) sensory space and generating for display a 3D solid hand model for the hand during the free-form gestures, including fingers and thumb of the hand; and in response to detecting a one finger or one thumb free-form gesture of the hand in the 3D sensory space in virtual contact with the virtual object, depicting, in the generated display, the virtual contact and resulting displacement of the virtual object by the 3D solid hand model.

27. One or more non-transitory computer readable media having instructions stored thereon for performing a method of realistic rotation of a virtual object for an interaction between a hand in a three-dimensional (3D) sensory space and the virtual object in a virtual space that the hand interacts with, the method including:

detecting free-form gestures of a hand in a three-dimensional (3D) sensory space and generating for display a 3D solid hand model for the hand during the free-form gestures, including fingers and thumb of the hand; and in response to detecting a two finger or one finger and one thumb free-form gesture of the hand in the 3D sensory space in virtual contact with the virtual object, depicting, in the generated display, the virtual contact and resulting rotation of the virtual object by the 3D solid hand model.

28. One or more non-transitory computer readable media having instructions stored thereon for performing a method of realistic rotation of a virtual object for an interaction between a hand in a three-dimensional (3D) sensory space and the virtual object in a virtual space that the hand interacts with, the method including:

detecting free-form gestures of a hand in a three-dimensional (3D) sensory space and generating for display a 3D solid hand model for the hand during the free-form gestures, including fingers and thumb of the hand; and in response to detecting a three finger or two finger and one thumb free-form gesture of the hand in the 3D sensory space in virtual contact with the virtual object, depicting, in the generated display, the virtual contact and resulting grasping of the virtual object by the 3D solid hand model.

29. One or more non-transitory computer readable media having instructions stored thereon for performing a method of realistic displacement of a virtual object for an interaction between a control object in a three-dimensional (3D) sensory space and the virtual object in a virtual space that the control object interacts with, the method including:

detecting free-form gestures of a control object in a three-dimensional (3D) sensory space and generating for display a 3D solid control object model for the control object during the free-form gestures, including sub-components of the control object; and in response to detecting a one sub-component gesture of the control object in the 3D sensory space in virtual contact with the virtual object, depicting, in the generated display, the virtual contact and resulting displacement of the virtual object by the 3D solid control object model.

30. One or more non-transitory computer readable media having instructions stored thereon for performing a method of realistic rotation of a virtual object for an interaction between a control object in a three-dimensional (3D) sensory space and the virtual object in a virtual space that the control object interacts with, the method including:

detecting free-form gestures of a control object in a three-dimensional (3D) sensory space and generating for display a 3D solid control object model for the control object during the free-form gestures, including sub-components of the control object; and in response to detecting a two e sub-component free-form gesture of the control object in the 3D sensory space in virtual contact with the virtual object, depicting, in the generated display, the virtual contact and resulting rotation of the virtual object by the 3D solid control object model.

31. One or more non-transitory computer readable media having instructions stored thereon for performing a method of realistic grasping of a virtual object for an interaction between a control object in a three-dimensional (3D) sensory space and the virtual object in a virtual space that the control object interacts with, the method including:

detecting free-form gestures of one or more control objects in a three-dimensional (3D) sensory space and generating for display 3D solid control object models for the control objects during the free-form gestures, including sub-components of the control objects;

in response to detecting a multi sub-component free-form gesture of the control objects in the 3D sensory space in virtual contact with the virtual object, depicting, in the generated display, the multi sub-component virtual contact and resulting grasping of the virtual object by the 3D solid control object models of the one or more control objects.

32. One or more non-transitory computer readable media having instructions stored thereon for performing a method of realistic grasping of a virtual object for an interaction between a control object in a three-dimensional (3D) sensory space and the virtual object in a virtual space that the control object interacts with, the method including:

detecting free-form gestures of at least two control objects in a three-dimensional (3D) sensory space and generating for display 3D solid control object models for the control objects during the free-form gestures, including sub-components of the control objects;

determining a dominant control object from the two control objects based on an earliest detection of a three sub-component free-form gesture in the 3D sensory space in virtual contact with the virtual object; and depicting, in the generated display, the virtual contact and resulting grasping of the virtual object by the 3D solid control object model of the dominant control object.

What is claimed is:

1. A method of manipulating virtual objects using real motions of one or more hands in a three-dimensional (3D) sensory space, the method including:
   capturing an image of the hands in the a three-dimensional (3D) sensory space and sensing a location of the hands;
   incorporating the image of the hands into a virtual reality scene; and
   outlining in a contrasting color a modeled position of the location of the hands and incorporating the outline into the virtual reality scene.

2. The method of claim 1, further including changing an appearance of the outline of the hands in the virtual reality scene upon detection of a discrepancy between the image of the hands and the outline.

3. The method of claim 1, further including changing an appearance of the image of the hands in the virtual reality scene upon detection of a discrepancy between the image of the hands and the outline.

4. A system implementing the method of claim 1, the system including:
 a processor and a non-transitory computer readable storage medium storing computer instructions configured to cause the processor to:
  capture an image of the hands in the a three-dimensional (3D) sensory space and sense a location of the hands;
  incorporate the image of the hands into a virtual reality scene; and
  outline in a contrasting color a modeled position of the location of the hands and incorporate the outline into the virtual reality scene.

5. One or more non-transitory computer readable media having instructions stored thereon for performing the method of claim 1, the method including:
 capturing an image of the hands in the a three-dimensional (3D) sensory space and sensing a location of the hands;
 incorporating the image of the hands into a virtual reality scene; and
 outlining in a contrasting color a modeled position of the location of the hands and incorporating the outline into the virtual reality scene.

6. A method of manipulating virtual objects using real motions of at least one hand in a three-dimensional (3D) sensory space, the method including:
 capturing an image of at least one hand in a three-dimensional (3D) sensory space and sensing a location of a first hand;
 incorporating the image of the first hand into a virtual reality scene; and
 sensing a pinch action between a thumb and first finger of the first hand and rendering a first virtual pinch force image positioned between the thumb and the first finger while the pinch action continues.

7. The method of claim 6, further including:
 sensing a pinch action between a thumb and first finger of a second hand and rendering a second virtual pinch force image positioned between the thumb and the first finger of the second hand while the pinch action continues;
 sensing a movement of at least one of the first and second hands that increases a separation distance between the first and second hands, while sensing continuing pinching actions of both the first and second hands; and
 rendering a new virtual object between the first and second pinch force images, responsive to the increased separation distance, wherein at least a size of the new virtual object is responsive to the separation distance.

8. The method of claim 7, wherein an orientation of the new virtual object is responsive to positions of the first and second hands.

9. A system implementing the method of claim 6, the system including:
 a processor and a non-transitory computer readable storage medium storing computer instructions configured to cause the processor to:
  capture an image of at least one hand in a three-dimensional (3D) sensory space and sense a location of a first hand;
  incorporate the image of the first hand into a virtual reality scene; and
  sense a pinch action between a thumb and first finger of the first hand and render a first virtual pinch force image positioned between the thumb and the first finger while the pinch action continues.

10. One or more non-transitory computer readable media having instructions stored thereon for performing the method of claim 6, the method including:
 capturing an image of at least one hand in a three-dimensional (3D) sensory space and sensing a location of a first hand;
 incorporating the image of the first hand into a virtual reality scene; and
 sensing a pinch action between a thumb and first finger of the first hand and rendering a first virtual pinch force image positioned between the thumb and the first finger while the pinch action continues.

11. A method of manipulating virtual objects using real motions of at least one hand in a three-dimensional (3D) sensory space, the method including:
 capturing an image of the hands in a three-dimensional (3D) sensory space and sensing a location of a first hand;
 incorporating the image of the first hand into a virtual reality scene that includes a grabable virtual object;
 sensing a gesture of the first hand, the gesture made by unconstrained movement of the first hand in the three-dimensional (3D) sensory space and determining whether the gesture is intended to interact with the grabable virtual object by grabbing the virtual object, the determining further including taking into account at least:
  an angular relationship of a normal to a palm of the first hand to a proximate surface of the virtual object;
  fingertip separations between the fingertips of the first hand and the proximate surface;
  a gesture rate at which the first hand closes on the virtual object;
  a hand posture, whether suitable for grasping the virtual object or incompatible with grasping; and
  linear velocity of the palm of the first hand relative to the virtual object; and
 responsive to determining that a gesture of the first hand is intended to grab the virtual object, linking motion of the first hand to manipulation of the virtual object.

12. The method of claim 11, further including taking into account when determining whether the gesture is intended to interact with the grabable virtual object a maximum separation between any of the fingertips of the first hand and the proximate surface.

13. The method of claim 11, further including taking into account when determining whether the gesture is intended to interact with the grabable virtual object a rotational velocity of the palm of the first hand in the 3D sensory space.

14. A system implementing the method of claim 11, the system including:
 a processor and a non-transitory computer readable storage medium storing computer instructions configured to cause the processor to:
  capture an image of the hands in a three-dimensional (3D) sensory space and sense a location of a first hand;

incorporate the image of the first hand into a virtual reality scene that includes a grab able virtual object;

sense a gesture of the first hand, the gesture made by unconstrained movement of the first hand in the three-dimensional (3D) sensory space and determine whether the gesture is intended to interact with the grabable virtual object by grabbing the virtual object, the determination further including taking into account at least:

an angular relationship of a normal to a palm of the first hand to a proximate surface of the virtual object;

fingertip separations between the fingertips of the first hand and the proximate surface;

a gesture rate at which the first hand closes on the virtual object;

a hand posture, whether suitable for grasping the virtual object or incompatible with grasping; and linear velocity of the palm of the first hand relative to the virtual object; and responsive to the determination that a gesture of the first hand is intended to grab the virtual object, link motion of the first hand to manipulation of the virtual object.

15. One or more non-transitory computer readable media having instructions stored thereon for performing the method of claim 11, the method including:

capturing an image of the hands in a three-dimensional (3D) sensory space and sensing a location of a first hand;

incorporating the image of the first hand into a virtual reality scene that includes a grabable virtual object;

sensing a gesture of the first hand, the gesture made by unconstrained movement of the first hand in the three-dimensional (3D) sensory space and determining whether the gesture is intended to interact with the grabable virtual object by grabbing the virtual object, the determining further including taking into account at least:

an angular relationship of a normal to a palm of the first hand to a proximate surface of the virtual object;

fingertip separations between the fingertips of the first hand and the proximate surface;

a gesture rate at which the first hand closes on the virtual object;

a hand posture, whether suitable for grasping the virtual object or incompatible with grasping; and linear velocity of the palm of the first hand relative to the virtual object; and responsive to determining that a gesture of the first hand is intended to grab the virtual object, linking motion of the first hand to manipulation of the virtual object.

16. A method of manipulating virtual objects using real motions of at least one hand in a three-dimensional (3D) sensory space, the method including:

capturing an image of the hands in a three-dimensional (3D) sensory space and sensing a location of a first hand;

incorporating the image of the first hand into a virtual reality scene that includes a pushable virtual object;

sensing a gesture of the first hand, the gesture made by unconstrained movement of the first hand in the three-dimensional (3D) sensory space and determining whether the gesture is intended to interact with the pushable virtual object by pushing the virtual object, the determining further including taking into account at least:

an angular relationship of a normal to a palm of the first hand to a proximate surface of the virtual object;

fingertip separations between the fingertips of the first hand and the proximate surface;

a hand posture, whether suitable for pushing the virtual object or incompatible with pushing; and linear velocity of the palm of the first hand relative to the virtual object; and responsive to determining that a gesture of the first hand is intended to push the virtual object, linking motion of the first hand to manipulation of the virtual object resulting in a displacement of the virtual object in the virtual space.

17. The method of claim 16, further including taking into account when determining whether the gesture is intended to interact with the pushable virtual object a gesture rate at which the first hand closes on the virtual object.

18. The method of claim 16, further including taking into account when determining whether the gesture is intended to interact with the pushable virtual object a maximum separation between any of the fingertips of the first hand and the proximate surface.

19. The method of claim 16, further including taking into account when determining whether the gesture is intended to interact with the pushable virtual object a rotational velocity of the palm of the first hand in the 3D sensory space.

20. A system implementing the method of claim 16, the system including:

a processor and a non-transitory computer readable storage medium storing computer instructions configured to cause the processor to:

capture an image of the hands in a three-dimensional (3D) sensory space and sense a location of a first hand;

incorporate the image of the first hand into a virtual reality scene that includes a pushable virtual object;

sense a gesture of the first hand, the gesture made by unconstrained movement of the first hand in the three-dimensional (3D) sensory space and determine whether the gesture is intended to interact with the pushable virtual object by pushing the virtual object, the determination further including taking into account at least:

an angular relationship of a normal to a palm of the first hand to a proximate surface of the virtual object;

fingertip separations between the fingertips of the first hand and the proximate surface;

a hand posture, whether suitable for pushing the virtual object or incompatible with pushing; and linear velocity of the palm of the first hand relative to the virtual object; and responsive to the determination that a gesture of the first hand is intended to push the virtual object, link motion of the first hand to manipulation of the virtual object resulting in a displacement of the virtual object in the virtual space.

21. One or more non-transitory computer readable media having instructions stored thereon for performing the method of claim 16, the method including:

capturing an image of the hands in a three-dimensional (3D) sensory space and sensing a location of a first hand;

incorporating the image of the first hand into a virtual reality scene that includes a pushable virtual object;

sensing a gesture of the first hand, the gesture made by unconstrained movement of the first hand in the three-dimensional (3D) sensory space and determining whether the gesture is intended to interact with the pushable virtual object by pushing the virtual object, the determining further including taking into account at least:
an angular relationship of a normal to a palm of the first hand to a proximate surface of the virtual object;
fingertip separations between the fingertips of the first hand and the proximate surface;
a hand posture, whether suitable for pushing the virtual object or incompatible with pushing; and
linear velocity of the palm of the first hand relative to the virtual object; and
responsive to determining that a gesture of the first hand is intended to push the virtual object, linking motion of the first hand to manipulation of the virtual object resulting in a displacement of the virtual object in the virtual space.

22. A method of manipulating virtual objects using real motions of one or more hands in a three-dimensional (3D) sensory space, the method including:
capturing an image of the hands in a three-dimensional (3D) sensory space and sensing a location of the hands;
incorporating at least part of the image of the hands into a virtual reality scene;
outlining using a separate outline having an appearance contrasting the image of the hands in the virtual reality scene, a modeled position of the location of the hands and incorporating the outline into the virtual reality scene;
detecting that at least part of the hands is obscured by a virtual object in virtual reality scene; and
rendering one of the outline and the image but not both where the hands are obscured.

23. The method of claim 22, further including changing an appearance of the outline as the part of the hands obscured changes.

24. The method of claim 22, further including changing an appearance of the image of the hands as the part of the hands obscured changes.

25. A system implementing the method of claim 22, the system including:
a processor and a non-transitory computer readable storage medium storing computer instructions configured to cause the processor to:
capture an image of the hands in a three-dimensional (3D) sensory space and sense a location of the hands;
incorporate at least part of the image of the hands into a virtual reality scene;
outline in a contrasting color a modeled position of the location of the hands and incorporate the outline into the virtual reality scene;
detect that at least part of the hands is obscured by a virtual object in virtual reality scene; and
render one of the outline and the image but not both where the hands are obscured.

26. One or more non-transitory computer readable media having instructions stored thereon for performing the method of claim 22, the method including:
capturing an image of the hands in a three-dimensional (3D) sensory space and sensing a location of the hands;
incorporating at least part of the image of the hands into a virtual reality scene;
outlining in a contrasting color a modeled position of the location of the hands and incorporating the outline into the virtual reality scene;
detecting that at least part of the hands is obscured by a virtual object in virtual reality scene; and
rendering one of the outline and the image but not both where the hands are obscured.

* * * * *